US009786052B2

(12) United States Patent
Kunihiro et al.

(10) Patent No.: US 9,786,052 B2
(45) Date of Patent: Oct. 10, 2017

(54) IMAGE PROCESSING APPARATUS AND METHOD FOR EVALUATING OBJECTS IN AN IMAGE

(75) Inventors: Takeshi Kunihiro, Kanagawa (JP); Masashi Uchida, Tokyo (JP); Eriko Matsui, Tokyo (JP); Tomohiro Hayakawa, Saitama (JP)

(73) Assignee: Sony Corporation, Tokyo (JP)

( * ) Notice: Subject to any disclaimer, the term of this patent is extended or adjusted under 35 U.S.C. 154(b) by 545 days.

(21) Appl. No.: 13/637,233

(22) PCT Filed: Feb. 28, 2011

(86) PCT No.: PCT/JP2011/054557
§ 371 (c)(1),
(2), (4) Date: Dec. 3, 2012

(87) PCT Pub. No.: WO2011/122200
PCT Pub. Date: Oct. 6, 2011

(65) Prior Publication Data
US 2013/0070971 A1    Mar. 21, 2013

(30) Foreign Application Priority Data

Mar. 29, 2010  (JP) ................................ 2010-074306
Oct. 19, 2010  (JP) ................................ 2010-234504

(51) Int. Cl.
*G06K 9/46* (2006.01)
*G06T 7/00* (2017.01)
(Continued)

(52) U.S. Cl.
CPC ............ *G06T 7/0016* (2013.01); *G06T 7/223* (2017.01); *G06K 9/0014* (2013.01);
(Continued)

(58) Field of Classification Search
CPC ..... G06K 9/00724; G06T 7/20; G06T 7/0012; G06T 7/0071; G06T 2207/30024;
(Continued)

(56) References Cited

U.S. PATENT DOCUMENTS 5,081,531 A * 1/1992 Parker .................... H04N 7/125
348/E7.006
6,095,976 A * 8/2000 Nachtomy ............. A61B 8/463
600/443
(Continued)

FOREIGN PATENT DOCUMENTS

CN         1539379 A      10/2004
CN         101224110 A     7/2008
(Continued)

OTHER PUBLICATIONS

Yamauchi, Yoshiko, Akihiko Harada, and Koichi Kawahara. "Changes in the fluctuation of interbeat intervals in spontaneously beating cultured cardiac myocytes: experimental and modeling studies." Biological cybernetics 86, No. 2 (2002): 147-154.*

(Continued)

*Primary Examiner* — Sumati Lefkowitz
*Assistant Examiner* — Carol Wang
(74) *Attorney, Agent, or Firm* — Wolf, Greenfield & Sacks, P.C.

(57) ABSTRACT

Apparatus and methods for image processing capable of generating evaluation index data for performing accurate and detailed evaluation of cultured cardiomyocytes are described. A motion detecting unit divides frame image data obtained by photographing the cultured cardiomyocytes for a predetermined time into blocks and obtains motion detection data in units of blocks per each frame period. A feature amount calculating unit calculates a feature amount for each block at the same position in a frame image using the motion (Continued)

detection data. A classification processing unit classifies each of the blocks into any one of a plurality of classification categories using the calculated feature amount. On the basis of the classification result, evaluation index data made of individual classification result data that represent correspondences between the blocks and the classification categories is generated.

16 Claims, 32 Drawing Sheets

(51) Int. Cl.
    *G06T 7/223*     (2017.01)
    *G06K 9/00*     (2006.01)

(52) U.S. Cl.
    CPC ....... *G06K 9/00335* (2013.01); *G06K 9/4642* (2013.01); *G06T 2207/20021* (2013.01); *G06T 2207/30024* (2013.01); *G06T 2207/30048* (2013.01); *G06T 2207/30241* (2013.01)

(58) Field of Classification Search
    CPC . G06T 2207/30004; G06T 2207/10061; G06T 2207/30048; G06T 2207/30061; G06T 2207/10056; G06T 2207/10081; G06T 2207/20021; G06T 2207/30232; G06T 2207/30196; G06T 2207/10132; G06T 2207/30096; G06T 2207/30221; A61B 6/503; A61B 8/0883; A61B 5/742; A61B 5/743; A61B 5/02405; A61B 2018/00351
    See application file for complete search history.

(56) References Cited

U.S. PATENT DOCUMENTS

| | | | | |
|---|---|---|---|---|
| 6,597,738 | B1* | 7/2003 | Park | G06T 7/2013 375/240.16 |
| 6,678,389 | B1* | 1/2004 | Sun et al. | 382/100 |
| 2002/0080425 | A1* | 6/2002 | Itokawa | G06K 9/6207 358/496 |
| 2005/0275727 | A1* | 12/2005 | Lai et al. | 348/208.1 |
| 2005/0286802 | A1* | 12/2005 | Clark | H04N 5/232 382/286 |
| 2007/0014460 | A1* | 1/2007 | Kuziela et al. | 382/128 |
| 2008/0094498 | A1* | 4/2008 | Mori | G03B 5/02 348/352 |
| 2008/0247628 | A1* | 10/2008 | Ramsing et al. | 382/133 |
| 2008/0304732 | A1* | 12/2008 | Rittscher et al. | 382/133 |
| 2010/0027662 | A1* | 2/2010 | Pigeon | 375/240.16 |
| 2010/0202685 | A1* | 8/2010 | Naito | 382/164 |
| 2010/0271494 | A1* | 10/2010 | Miyasako | G06K 9/00261 348/208.1 |
| 2011/0082371 | A1* | 4/2011 | Chono | A61B 6/5217 600/443 |
| 2013/0294675 | A1* | 11/2013 | Liu | G06K 9/0014 382/133 |
| 2013/0321459 | A1 | 12/2013 | Hayakawa et al. | |

FOREIGN PATENT DOCUMENTS

| | | | |
|---|---|---|---|
| JP | 2000092454 A | * | 3/2000 |
| JP | 2002-245462 A | | 8/2002 |
| JP | 2003-169319 A | | 6/2003 |
| JP | 2006-079594 A | | 3/2006 |
| JP | 2008-017040 A | | 1/2008 |
| JP | 2009-157581 A | | 7/2009 |
| JP | 2009-177332 A | | 8/2009 |
| JP | 2010-004261 A | | 1/2010 |
| JP | 2010-538603 A | | 12/2010 |
| WO | WO 2008/149055 A1 | | 12/2008 |

OTHER PUBLICATIONS

Translated Version of JP 2000-092454.*
Yang et al., Weighted structural similarity based on block classification of image. J South China Univ Tech. 2009;37(1):42-47.
Sihua et al., An automatic analysis system for the pulsation video images of myocardial cells. Journal of Experimental Mechanics. v18(1); Mar. 2003. ps.: 67-72.

* cited by examiner

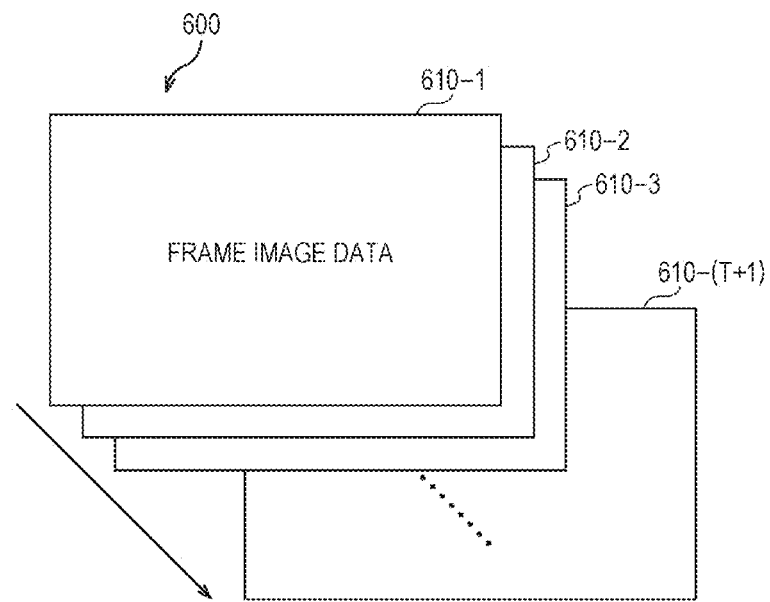
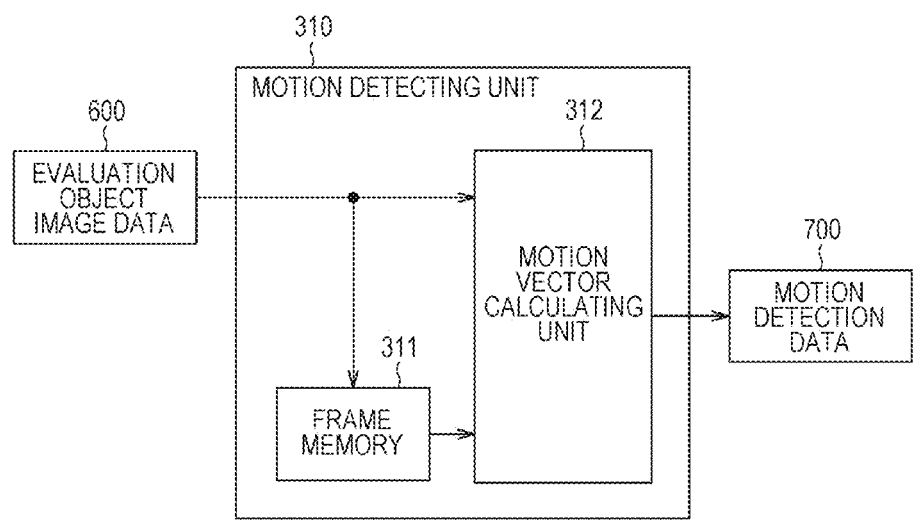

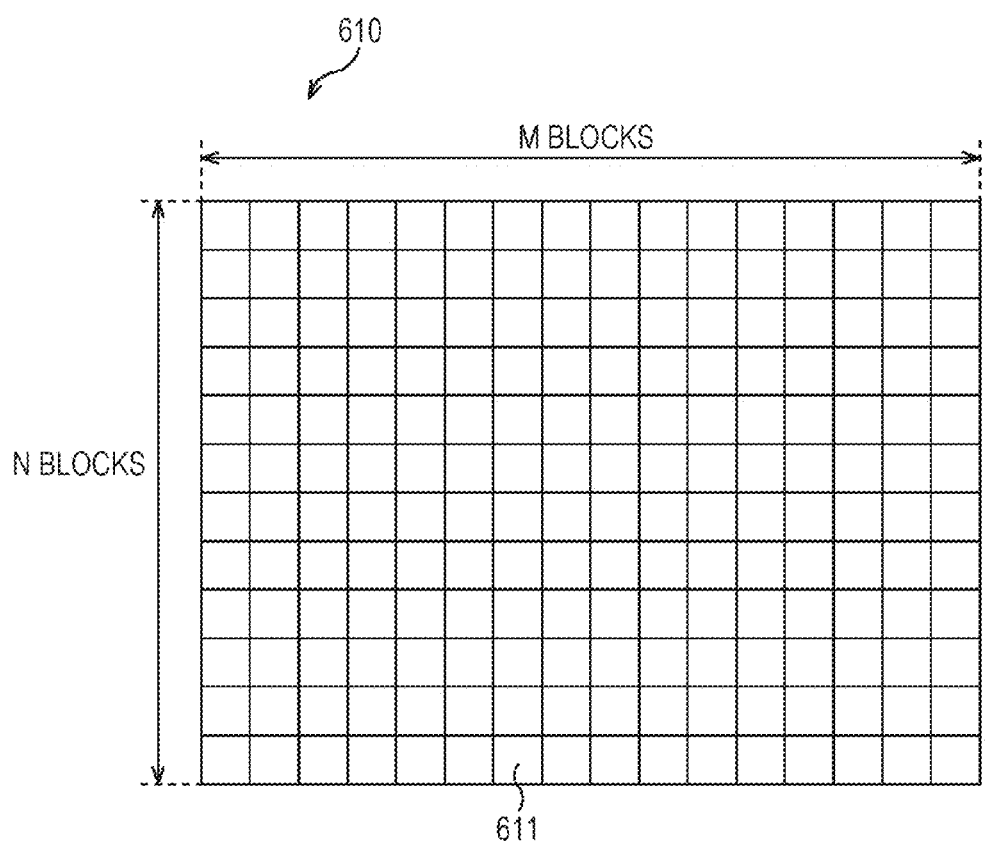

IMAGE PROCESSING APPARATUS AND METHOD FOR EVALUATING OBJECTS IN AN IMAGE

RELATED APPLICATIONS

The present application is a national stage entry filed under 35 U.S.C. §371 of PCT Application No. PCT/JP2011/054557 filed Feb. 28, 2011, which claims priority to Japanese Patent Applications JP-2010-234504 filed in the Japan Patent Office on Oct. 19, 2010 and JP-2010-074306 filed in the Japan Patent Office on Mar. 29, 2010.

TECHNICAL FIELD

The present disclosure relates to a data processing apparatus, a data processing method, an image processing apparatus and a method, and a program, and more particularly, to a data processing apparatus which generates data that becomes an index when evaluation is performed on an object which performs a motion having periodicity, a method thereof, an image processing apparatus and a method, and a program.

BACKGROUND ART

In the field of regenerative medicine, using cultured cells manufactured by culturing cells, regeneration of cells, tissues, organs, and the like of a body that are lost due to accidents, disease, and the like and restoration of functions have been achieved. Cell tissues that may be manufactured as such cultured cells range over many fields, and cardiomyocytes in one of the fields are used for heart treatment. Cultured cardiomyocytes themselves have motions corresponding to pulsations. Here, in a manufacturing stage of cultured cardiomyocytes, for example, it is necessary to perform quality evaluation of whether or not the motions are favorable.

When such quality evaluation of the cultured cardiomyocytes is performed, for example, in current situations, visual observation is performed. In addition, measuring a potential by piercing cultured cardiomyocytes with an electrode has been performed. However, visual observation is significantly dependent on observer's opinions, and it is difficult to obtain objective and accurate evaluation results. In addition, in the case of measuring a potential, the cultured cardiomyocytes come into contact with the electrode, and thus there is a problem of not being noninvasive. In addition, information that may be quantified on the basis of the measurement of the potential is limited only to, for example, pulsation time.

Here, as a technique according to the related art, a configuration in which measurement points are set from an imaged screen obtained by photographing a cardiomyocyte, the luminances of the measurement points are automatically measured, and the deformation period of the cardiomyocyte is measured from the measured values is known (for example, refer to PTL 1).

CITATION LIST

Patent Literature

PTL 1: Japanese Unexamined Patent Application Publication No. 63-233392 (FIG. 1)

SUMMARY OF INVENTION

Technical Problem

However, in the technique according to the related art described above, since a periodic change in luminance is an object of measurement, objects that are able to be measured are limited to the time interval of a pulsation period. That is, though the fact that the information that may be quantified is limited to the period of pulsations although the technique is noninvasive, there are the same problems as in the case of measuring the potential, and it is still difficult to obtain accurate evaluation results.

The present disclosure has been made taking the foregoing circumstances into consideration, and an object thereof is to perform an accurate evaluation with higher accuracy than has been carried out on the motion of an object which performs a periodic motion and is represented by a cultured cardiomyocyte and the like.

Solution to Problem

The present disclosure is made to solve the problems. According to a first aspect, a data processing apparatus includes: a motion detecting unit which divides a plurality of frame image data that form moving image data having an image content of an object that performs a periodic motion into blocks according to an arrangement of a predetermined pixel count and detects time-series data of motions for each of the corresponding blocks; a feature amount calculating unit which calculates at least one kind of feature amount for each of the blocks on the basis of the time-series data of the motions for each of the detected blocks; and a classification processing unit which generates classification data that represents a result of classifying each of the blocks that form any one of the plurality of frame image data into any one of a predetermined number of classification categories on the basis of the calculated feature amount. Accordingly, there is an effect of classifying an image of an object that performs a periodic motion according to the classification categories set on the basis of the feature amounts.

In addition, in the first aspect, the feature amount calculating unit may calculate a plurality of kinds of the feature amounts for each of the blocks, and the classification unit may generate the classification data on the basis of the plurality of kinds of the feature amounts calculated. Accordingly, there is an effect of classifying an image of an object that performs a periodic motion according to the classification categories set on the basis of a combination of the plurality of feature amounts.

In addition, in the first aspect, the feature amount calculating unit may calculate an average motion direction which is an average value of motion directions per unit time within a predetermined time as one kind of the feature amounts. Accordingly, there is an effect of classifying an image of an object that performs a periodic motion according to the classification categories set on the basis of at least the average motion direction.

In addition, in the first aspect, the feature amount calculating unit may calculate an average motion amount which is an average value of motion amounts per unit time within a predetermined time as one kind of the feature amounts. Accordingly, there is an effect of classifying an image of an object that performs a periodic motion according to the classification categories set on the basis of at least the average motion amount.

In addition, in the first aspect, the feature amount calculating unit may calculate an average amplitude which is an average value of amplitudes with a predetermined or higher motion amount obtained within a predetermined time as one kind of the feature amounts. Accordingly, there is an effect of classifying an image of an object that performs a periodic motion according to the classification categories set on the basis of at least the average amplitude.

In addition, in the first aspect, the feature amount calculating unit may calculate an average acceleration which is an average value of accelerations of motions per unit time within a predetermined time as one kind of the feature amounts. Accordingly, there is an effect of classifying an image of an object that performs a periodic motion according to the classification categories set on the basis of at least the average acceleration.

In addition, in the first aspect, the feature amount calculating unit may calculate an average motion interval which is an average value of time intervals at which an amplitude with a predetermined or higher motion amount is obtained within a predetermined time as one kind of the feature amounts. Accordingly, there is an effect of classifying an image of an object that performs a periodic motion according to the classification categories set on the basis of at least the average motion interval.

In addition, in the first aspect, the feature amount calculating unit may calculate a motion starting time which is a time from a predetermined timing to a timing at which an amplitude with a predetermined or higher motion amount is obtained as one kind of the feature amounts. Accordingly, there is an effect of classifying an image of an object that performs a periodic motion according to the classification categories set on the basis of at least the motion starting time.

In addition, in the first aspect, the classification unit may perform a process of calculating a distance between each of the plurality of templates having a combination of other feature amounts and the block in correspondence to a plurality of the classification categories, and classifying the block into any one of the plurality of the classification categories on the basis of the calculated distance, on each of the blocks. Accordingly, there is an effect of obtaining the classification results on the basis of the distance between each of the plurality of templates and the block.

The classification unit may classify each of the blocks into any one of a predetermined number of classification categories by performing clustering according to a k-means method on the basis of the feature amounts calculated corresponding to each of the blocks. Accordingly, there is an effect of obtaining the classification result by the k-means method.

According to another aspect of the present disclosure, an image processing apparatus includes: a motion detecting unit which detects a motion of an object of evaluation using an image of the object of evaluation; an index data generating unit which, by using a motion vector that represents the motion of the object of evaluation detected by the motion detecting unit, generates index data that represents a feature of the motion of the object of evaluation and is used as an index for evaluating the object of evaluation; and an evaluation value calculating unit which evaluates the index data generated by the index data generating unit and calculates an evaluation value.

The index data generating unit may generate index data regarding a magnitude of an amplitude of the motion of the object of evaluation and index data regarding a frequency per unit time of a peak of the motion of the object of evaluation, and the evaluation value calculating unit may calculate an evaluation value that evaluates the magnitude of the amplitude of the motion of the object of evaluation using the index data regarding the magnitude of the amplitude of the motion of the object of evaluation generated by the index data generating unit, and may further calculate an evaluation value that evaluates the frequency per unit time of the peak of the motion of the object of evaluation using the index data regarding the frequency per unit time of the peak of the motion of the object of evaluation generated by the index data generating unit.

The index data regarding the magnitude of the amplitude of the motion of the object of evaluation may be an average value of products of a normalized amplitude and a normalized dispersion of the amplitudes over an entire image of the object of evaluation.

The index data regarding the magnitude of the amplitude of the motion of the object of evaluation may be a proportion of a region in which a value of a product of a normalized amplitude and a normalized dispersion of the amplitudes is higher than or equal to a predetermined threshold with respect to an entire image of the object of evaluation.

The index data regarding the frequency per unit time of the peak of the motion of the object of evaluation may be an average value of products of a normalized number of the peaks per unit time and a normalized dispersion of the numbers of the peaks per unit time over an entire screen.

The index data regarding the frequency per unit time of the peak of the motion of the object of evaluation may be a proportion of a region in which a value of a product of a normalized number of the peaks per unit time and a normalized dispersion of the numbers of the peaks per unit time is higher than or equal to a predetermined threshold with respect to an entire image of the object of evaluation.

The index data generating unit may further generate index data regarding a classification result of classifying each of partial regions of the image of the object of evaluation on the basis of the feature amount of the motion of the object of evaluation, and the evaluation value calculating unit may further calculate an evaluation value that evaluates the classification result of the feature amount of the motion of the object of evaluation using the index data regarding the classification result generated by the index data generating unit.

The index data generating unit may calculate a motion amount of the object of evaluation detected by the motion detecting unit, and the evaluation value calculating unit may generate an image of a change in the motion amount calculated by the index data generating unit with respect to time so as to be displayed.

The index data generating unit may generate index data that represents a change due to administration of a drug to a cardiomyocyte in a peak of a waveform representing a relaxation of the cardiomyocyte which is the object of evaluation, in the change in the calculated motion amount with respect to time, and the evaluation value calculating unit may evaluate the index data calculated by the index data generating unit and calculates an evaluation value.

An imaging unit which images the object of evaluation and obtains an image of the object of evaluation may further be included, and the motion detecting unit may detect the motion of the object of evaluation using the image of the object of evaluation obtained by the imaging unit.

The motion detecting unit may detect the motion of the object of evaluation between frame images in an evaluation duration with a predetermined length in the image of the object of evaluation which is a moving image.

The motion detecting unit may repeat detection of the motion of the object of evaluation in the evaluation duration a predetermined number of times.

The evaluation value calculating unit may evaluate each of a plurality of kinds of the index data generated by the index data generating unit to calculate the evaluation value, and integrate the calculated evaluation values, thereby calculating an evaluation value that evaluates the object of evaluation.

The object of evaluation may be a cell that moves spontaneously.

The object of evaluation may be a cultured cell generated by culturing a cell collected from a living body.

According to another aspect of the present disclosure, in addition, an image processing method includes: detecting a motion of an object of evaluation using an image of the object of evaluation by a motion detecting unit of an image processing apparatus; by using a motion vector that represents the detected motion of the object of evaluation, generating index data that represents a feature of the motion of the object of evaluation and is used as an index for evaluating the object of evaluation by an index data generating unit of the image processing apparatus; and evaluating the generated index data and calculating an evaluation value by an evaluation value calculating unit of the image processing apparatus.

According to another aspect of the present disclosure, moreover, a program causes a computer to function as: a motion detecting unit which detects a motion of an object of evaluation using an image of the object of evaluation; an index data generating unit which, by using a motion vector that represents the detected motion of the object of evaluation, generates index data that represents a feature of the motion of the object of evaluation and is used as an index for evaluating the object of evaluation; and an evaluation value calculating unit which evaluates the generated index data and calculates an evaluation value.

According to another aspect of the present disclosure, the motion of the object of evaluation is detected by using the image of the object of evaluation, the motion vector that represents the detected motion of the object of evaluation is used, the index data that represents the feature of the motion of the object of evaluation and is used as the index for evaluating the object of evaluation is generated, the generated index data is evaluated, and the evaluation value is calculated.

Advantageous Effects of Invention

According to the present disclosure, there is an excellent effect of obtaining classification data that becomes an index for enabling accurate evaluation of an object that performs a periodic motion with high accuracy.

BRIEF DESCRIPTION OF DRAWINGS

FIG. 3 is a diagram schematically illustrating a structure example of evaluation object image data 600.

FIG. 4 is a block diagram illustrating a configuration example of a motion detecting unit 310.

FIG. 5 is a diagram schematically illustrating a process of dividing frame image data 610 into blocks 611.

DESCRIPTION OF EMBODIMENTS

Hereinafter, embodiments for embodying a present technique (hereinafter, referred to as embodiments) will be described. Descriptions will be provided in the following order.

1. First Embodiment (Evaluation Index Data Generation Process: Example of Performing Classification Process Using Templates)
2. Second Embodiment (Evaluation Index Data Generation Process: Example of Performing Classification Process Using k-means Method)
3. Third Embodiment (Cultured Cardiomyocyte Evaluation Apparatus)
4. Fourth Embodiment (Drug Evaluation Apparatus)
5. Fifth Embodiment (Personal Computer)

<1. First Embodiment>

[Configuration Example of Cultured Cardiomyocyte Evaluation System]

Figure 1:
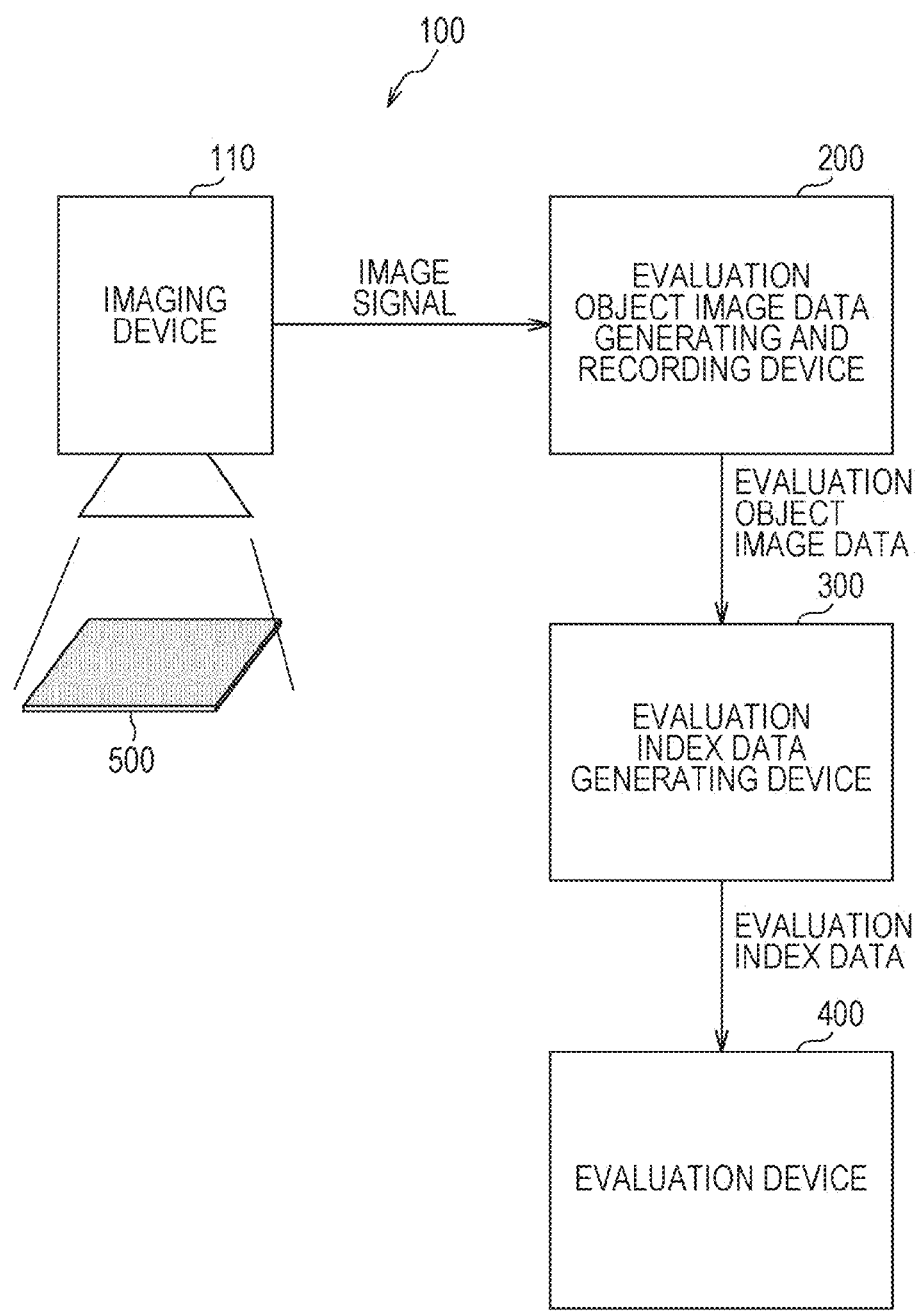
FIG. 1 illustrates a configuration example of a cultured cardiomyocyte evaluation system 100.

FIG. 1 illustrates a configuration example of a cultured cardiomyocyte evaluation system 100. The cultured cardiomyocyte evaluation system 100 illustrated in this figure is for evaluating the quality of cultured cardiomyocytes 500.

In regenerative medicine, treatment of various tissues, organs, and the like of the human body is performed using cells cultured in vitro. The cultured cardiomyocytes 500 are cultured as cells provided for such treatment for heart disease. Currently, there is a situation in which a technique for mass-producing such cultured cells and supplying a sufficient amount of cells in medical practice at low cost has been developed. In a case of achieving the situation in which cultured cells are mass-produced as such, efficiently and accurately evaluating the cultured cells is required.

The cultured cardiomyocytes 500 themselves perform motions corresponding to pulsations. The quality of the cultured cardiomyocytes 500 may be determined by evaluating whether or not the motions corresponding to the pulsations are favorable. On the basis of this, the cultured cardiomyocyte evaluation system 100 records moving image data having the photographed cultured cardiomyocytes 500 and performs evaluation on the basis of motion detection results of the recorded moving image data. Accordingly, more detailed and accurate evaluation results than those of noninvasive and visual evaluation are obtained.

As a configuration for this, the cultured cardiomyocyte evaluation system 100 includes, for example, as illustrated in the figure, an imaging device 110, an evaluation object image data generating and recording device 200, an evaluation index data generating device 300, and an evaluation device 400.

The imaging device 110 is for photographing the cultured cardiomyocytes 500 which are an object of evaluation. In addition, in this figure, a state where the cultured cardiomyocytes 500 are directly photographed by the imaging device 110 is illustrated. However, in practice, for example, a microscope image of the cultured cardiomyocytes 500 is imaged in the configuration. In addition, during the imaging, the imaging position of the imaging device 110 with respect to the cultured cardiomyocytes 500 is in a fixed state.

The evaluation object image data generating and recording device 200 is a device for generating evaluation object image data on the basis of an image signal input from the imaging device 110 and recording and saving the generated evaluation object image data in, for example, a recording medium therein.

The evaluation object image data generated here becomes, for example, moving image data generated from the image signal of the imaged cultured cardiomyocytes 500.

The evaluation index data generating device 300 is, for example, a device which receives the moving image data saved as the evaluation object image data in the evaluation object image data generating and recording device 200 and generates evaluation index data used as an index for evaluation of the cultured cardiomyocytes 500. The evaluation device 400 is a device which obtains evaluation results by processing the evaluation index data generated by the evaluation index data generating device 300.

[Configuration Example of Evaluation Index Data Generating Device]

Figure 2:
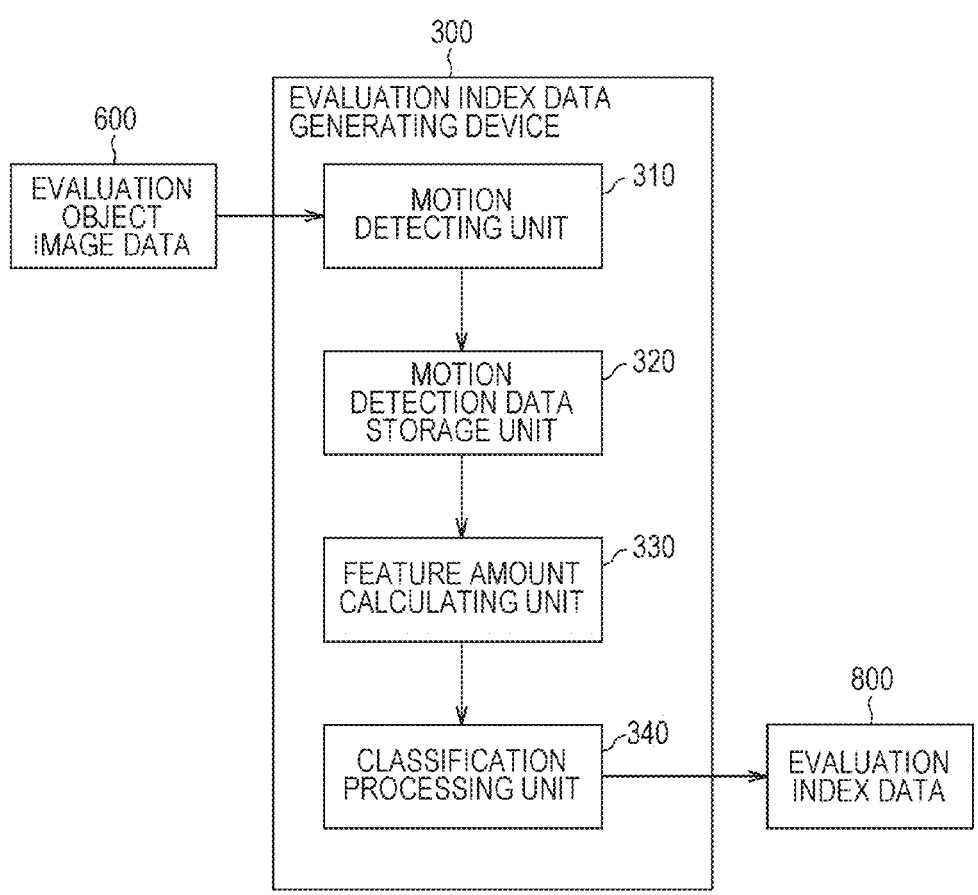
FIG. 2 is a block diagram illustrating a configuration example of an evaluation index data generating device 300.

FIG. 2 illustrates a configuration example of the evaluation index data generating device 300. The evaluation index data generating device 300 illustrated in this figure includes a motion detecting unit 310, a motion detection data storage unit 320, a feature amount calculating unit 330, and a classification processing unit 340. In addition, evaluation object image data 600 illustrated in this figure is obtained by reproducing data recorded in the evaluation object image data generating and recording device 200, and is moving image data including frame image data as described above.

The motion detecting unit 310 is a unit which receives evaluation object image data 600 and performs a motion detection process. In addition, a specific example of the motion detection process by the motion detecting unit 310 in this case and a structure example of motion detection data will be described later. In addition, the motion detection data storage unit 320 is a unit which stores the motion detection data obtained as detection results by the motion detection process of the motion detecting unit 310.

The feature amount calculating unit 330 is a unit which calculates and acquires a predetermined feature amount using the motion detection data stored in the motion detection data storage unit 320. In addition, an example of the feature amount calculated here will be described later.

The classification processing unit 340 is a unit for obtaining evaluation index data 800 by performing a classification process on the basis of the information on the feature amount obtained by the feature amount calculating unit 330. A specific example of the classification process will be described later. The evaluation index data 800 obtained by the classification processing unit 340 is an example of classification data described in the claims.

[Structure of Evaluation Object Image Data]

FIG. 3 illustrates a structure example of the evaluation object image data 600 input to the evaluation index data generating device 300. As illustrated in this figure, the evaluation object image data 600 includes first to (T+1)-th frame image data 610-1 to (T+1) corresponding to a predetermined time.

In addition, the moving image data saved as the evaluation object image data 600 in the evaluation object image data generating and recording device 200 may include the frame image data 610-1 to T illustrated in FIG. 3 as it is. In addition, moving image data including sections of the frame image data 610-1 to T may also be employed. In the latter case, for example, image sections that are determined to be optimal for evaluation are extracted from the moving image data saved as the evaluation object image data 600 in the evaluation object image data generating and recording device 200. In addition, moving image data as the image sections may be input to the evaluation index data generating device 300 as the evaluation object image data 600 of FIG. 3.

[Configuration Example of Motion Detecting Unit]

FIG. 4 illustrates a configuration example of the motion detecting unit 310. The motion detecting unit 310 illustrated in this figure includes a frame memory 311 and a motion vector calculating unit 312. The frame memory 311 is a unit which holds the frame image data 610 which are sequentially input for each frame duration as the evaluation object image data 600.

The motion vector calculating unit 312 is a unit which calculates motion vectors. Therefore, the motion vector calculating unit 312 receives frame image data which is input as the evaluation object image data 600 of a current time and frame image data of the previous time held in the frame memory 311. In addition, motion vectors are calculated using the two frame image data. The calculated motion vectors are held in the motion detection data storage unit 320 as motion detection data 700.

Next, a process performed by the motion detecting unit 310 including the units illustrated in FIG. 4 will be described. The motion vector calculating unit 312 as described above receives the frame image data 610 of the current time and the frame image data 610 of the previous time. The motion vector calculating unit 312 divides the received frame image data 610 in units of blocks. That is, as illustrated in FIG. 5, a two-dimensional pixel region formed by the frame image data 610 is divided into M blocks in the horizontal direction and is divided into N blocks in the vertical direction. As a result, the frame image data 610 is divided into (M×N) blocks 611. Each of the blocks 611 includes, for example, (16×16) pixels. The motion vector calculating unit 312 in this case calculates motion vectors as the motion detection process in units of the blocks 611 as objects of the process. In addition, the motion detection process is performed sequentially using the first to (T+1-th) frame image data 610.

Figure 6:
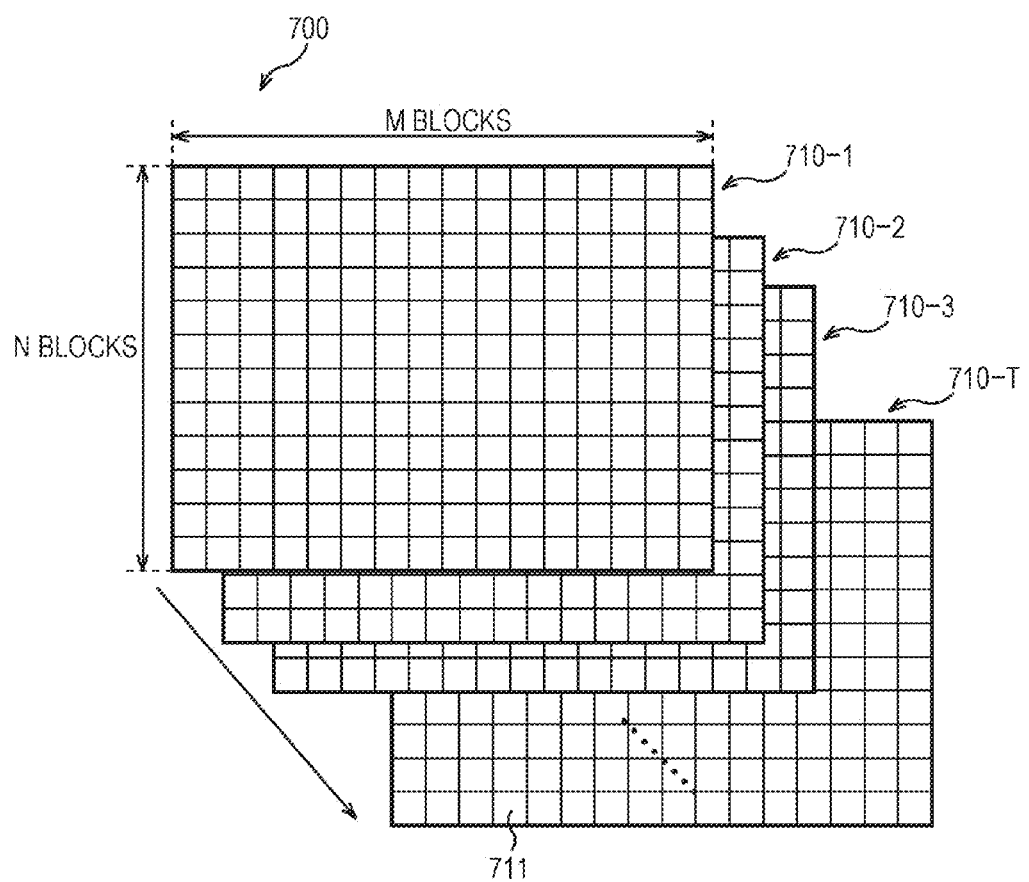
FIG. 6 is a diagram schematically illustrating a structure example of motion detection data 700.

In addition, the motion detection data 700 obtained in a stage in which the final motion detection process using the T-th and (T+1)-th frame image data 610 is completed is as illustrated in FIG. 6. First, the motion detection data 700 illustrated in this figure includes T frame unit motion detection data 710-1 to T. Each of the frame unit motion detection data 710-1 to T is obtained by performing the motion detection process on the frame image data 610 of the current time and the previous frame image data 610 obtained for each frame duration as an object. For example, the third frame unit motion detection data 710-1 is obtained by inputting third frame image data 610-4 and third frame image data 610-3 as the frame image data of the current time and the previous time and performing motion detection thereon.

Each of the frame-corresponding motion detection data 710-1 to T is formed of (M×N) block unit motion detection data 711. Each of the block unit motion detection data 711 corresponds to the corresponding single block 611 and becomes data that represents a motion vector detected for the corresponding block 611. As such, the motion detection data 700 has a structure in which each of the frame-corresponding motion detection data 710 has (M×N) block unit motion detection data 711. This means that time-series data for a motion vector corresponding to each of the blocks 611 that form the frame image data 610 is obtained.

[Examples of Feature Amount Calculated by Feature Amount Calculating Unit]

The feature amount calculating unit 330 calculates a plurality of feature amounts using the motion detection data 700 stored in the motion detection data storage unit 320. First, examples of the feature amounts calculated and acquired by the feature amount calculating unit 330 will be described with reference to FIG. 7.

Figure 7:
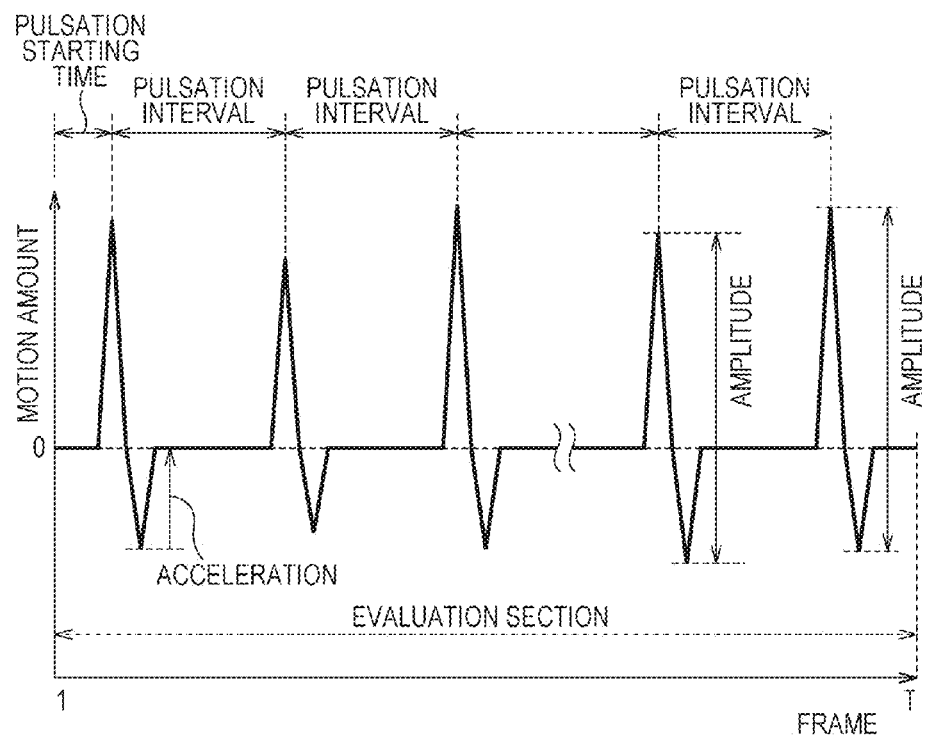
FIG. 7 is a diagram illustrating examples of calculated feature amounts.

FIG. 7 illustrates motion vectors that are represented by the block unit motion detection data 711 corresponding to a certain single block 611 in time series. That is, the number of the block unit motion detection data 711 corresponding to the single block 611 is also T so as to correspond to the fact that the number of frame-corresponding motion detection data 710 is T as described in FIG. 6. FIG. 7 samples the motion vectors represented by the T block unit motion detection data 711 in a time-series order.

In addition, the block unit motion detection data 711 has a motion amount of a horizontal direction component and a motion amount of a vertical direction component as information of the motion vectors, and in FIG. 7, the motion amount of any one of the horizontal direction component and the vertical direction component is illustrated. In FIG. 7, the vertical axis represents the motion amount, and the horizontal axis represents the frames, that is, the time.

In addition, in the following description, as illustrated in FIG. 7, a section corresponding to a predetermined time obtained as the T block unit motion detection data 711 (that is, data of the motion amounts) are developed in the time-series direction is referred to as an "evaluation section".

As the examples of the feature amounts that may be calculated, here, an average motion amount Vav, an average motion direction θav, an average amplitude Aav, an average acceleration Bav, an average pulsation interval Dav, and a pulsation starting time S are assumed. Any of such feature amounts is obtained on the basis of the motion vectors as understood by the following description. In addition, such feature amounts are obtained for each of the blocks 611.

First, the average motion amount Vav will be described. As illustrated in FIG. 7, a change in the motion amount with respect to time is shown depending on the T block unit motion detection data 711. This is obtained corresponding to a periodic change between a state where the cultured cardiomyocytes 500 move and a state where they stop in response to the pulsations generated in the cultured cardiomyocytes 500. In this point, for example, it can be said that the change in the motion amount with respect to time has features corresponding to pulsations. Here, in the present disclosure, the average of T motion amounts obtained in the evaluation section is treated as a feature amount. The average motion amount Vav may be obtained by the following expression assuming that the motion amounts of the horizontal direction component and the vertical direction component obtained from the motion vectors in each of the block unit motion detection data 711 are Vx and Vy and a variable corresponding to a frame order is n.

$$V = \sqrt{V_x^2 + V_y^2}, \; Vav = \frac{1}{T}\sum_{n=1}^{T} V_n \qquad \text{[Math. 1]}$$

That is, as the average motion amount Vav, first, a synthesized motion amount V is obtained by synthesizing the motion amounts Vx and Vy of the horizontal direction component and the vertical direction component for each of the T block unit motion detection data 711. In addition, the average motion amount Vav is obtained by calculating the average value of the T synthesized motion amounts V.

Otherwise, first, the average value (horizontal average motion amount Vavx) of the motion amounts Vx of the horizontal direction component and the average value (vertical average motion amount Vavy) of the motion amounts Vy of the vertical direction component in the evaluation period are calculated. Next, the average motion amount Vav may also be calculated by synthesizing the horizontal average motion amount Vavx and the vertical average motion amount Vavy.

For example, the higher the value of the average motion amount Vav is, the greater the motion corresponding to the pulsation of a part of the cultured cardiomyocytes 500 corresponding to the block 611 may be evaluated to be.

Next, the average motion direction θav is the average value of T motion directions θ obtained in the evaluation section. The average motion direction θav may be obtained by the following expression.

$$\theta = \cos^{-1}\frac{V_y}{V_x}, \theta av = \frac{1}{T}\sum_{n=1}^{T}\theta_n \qquad [\text{Math. 2}]$$

For example, by the distribution of the average motion directions θav of the corresponding blocks 611 in the entire frame image, the uniformity of the directions in which the cultured cardiomyocytes 500 are moved due to the pulsations may be evaluated. In addition, the distribution state that a part having non-uniform motion directions is in, and the like may also be evaluated.

For example, according to a case where there are actual movements as the motions of the pulsations of the cultured cardiomyocytes 500, as illustrated in FIG. 7, an amplitude of higher than or equal to a predetermined value periodically occurs. The average amplitude Aav is the average value of amplitudes of higher than or equal to the predetermined value obtained as described above in the evaluation section. The average amplitude Aav may be obtained, for example, as follows.

First, peak detection is performed on the synthesized motion amounts V which are K motion vectors in the evaluation section, and the detected peak values are averaged, thereby obtaining the average amplitude Aav. Otherwise, first, peak detection is performed on the motion amounts of the horizontal direction component, and the detected peak values are averaged, thereby obtaining an average amplitude (horizontal average amplitude) Aavx of the horizontal direction component. In the same manner, an average amplitude (vertical average amplitude) Aavy of the vertical direction component is obtained. Next, an operation of calculating the average amplitude Aav by performing an operation of synthesizing the horizontal average amplitude Aavx and the vertical average amplitude Aavy may be considered. For example, the greater the average amplitude Aav is, the greater the motion corresponding to the pulsation of the part of the cultured cardiomyocytes 500 corresponding to the block 611 may be evaluated to be.

In addition, as illustrated in FIG. 7, it can be said that the change in motion amount in time series also represents a change in acceleration with respect to the motions by pulsations. The average acceleration Bav is the average value of accelerations obtained in the evaluation section and may be obtained, for example, as follows.

First, the synthesized motion amounts B represented by a predetermined number of block unit motion detection data 711 which are sequential in the time-series order are differentiated. This is performed on the first to T-th block unit motion detection data 711, thereby calculating an acceleration B for each predetermined time in the evaluation section. In addition, the average acceleration Bav is obtained as the average value of the accelerations B. Otherwise, first, the motion amounts Vx of the horizontal direction component represented by a predetermined number of block unit motion detection data 711 which are sequential in the time-series order are sequentially differentiated to calculate a horizontal acceleration Bx for each predetermined time, and a horizontal average acceleration Bavx is obtained as the average value of the horizontal accelerations Bx. In the same manner, a vertical average acceleration Bavy is calculated. In addition, the average acceleration Bav may also be obtained by synthesizing the horizontal average acceleration Bavx and the vertical average acceleration Bavy. For example, the average acceleration Bav becomes an index of rapidity when the cultured cardiomyocytes 500 are changed from a still state to a moving state in response to pulsations. When the average acceleration Bav is high, the motions of the corresponding part of the cultured cardiomyocytes 500 in response to the pulsations may be evaluated to be active to that extent.

In addition, as also described before, the peak of an amplitude periodically appears in response to pulsations. In FIG. 7, a time interval at which the peak of the amplitude appears is represented as a pulsation interval. The average pulsation interval Dav is the average value of pulsation intervals obtained in the evaluation section and may be obtained, for example, as follows.

First, peak detection is performed in the same manner as when the average amplitude Aav is obtained. In addition, a frame timing at which the peak is detected, that is, a time is obtained. Next, a time width from a time at which a single peak is detected to a time at which the next peak is detected is calculated as a pulsation interval D. The average pulsation interval Dav is obtained by calculating the average value of the calculated pulsation intervals D. For example, by the distribution of the average pulsation intervals Dav of the corresponding blocks 611 in the entire frame, the uniformity of the pulsation time intervals in the entire cultured cardiomyocytes 500 may be evaluated. In addition, in a case of focusing on a non-uniform distribution, the distribution state that the shift of the pulsation time interval is in may be evaluated. The average pulsation interval Dav is an example of an average motion interval described in the claims.

In addition, the pulsation starting time S is obtained by measuring a time until the peak of an amplitude of a motion amount corresponding to the motion of the initial pulsation after starting the evaluation section is obtained. Even regarding the pulsation starting time S, for example, by the distribution of the pulsation starting times S of the corresponding blocks 611 in the entire frame, the uniformity of the pulsation starting times in the entire cultured cardiomyocytes 500 may be evaluated. In addition, in a case of focusing on a non-uniform distribution, the distribution state that the shift of the pulsation starting timing is in may be evaluated.

In this manner, any of the feature amounts is calculated on the basis of the detected motion vectors (motion amounts). That is, in the present disclosure, it is possible to quantify various items from the time-series data of the motion vectors.

The feature amount calculating unit 330 is able to be configured to calculate any of the six feature amounts including the average motion amount Vav, the average motion direction θav, the average amplitude Aav, the average acceleration Bav, the average pulsation interval Dav, and the pulsation starting time S are assumed. For example, in practice, the feature amounts needed to perform the classification process performed by the classification processing unit 340 may be calculated from such feature amounts.

[Example of Classification Process]

The classification processing unit 340 performs the classification process using a plurality of kinds of feature amounts calculated by the feature amount calculating unit 330 as described above, and obtains the classification process results as the evaluation index data 800. Several methods may be considered as such classification methods, and here, a method called clustering is employed. That is, a plurality of classification categories called clusters are set, and each of the blocks 611 that form the frame image data 610 illustrated in FIG. 5 is classified to any of the plurality of clusters according to the feature amount thereof.

As a specific example of the classification process by clustering, a template method is employed in the first embodiment. In addition, as the employed feature amounts, there are two feature amounts including the average motion amount Vav and the average motion direction θav from among those assumed in advance. Accordingly, the feature amount calculating unit 330 calculates the average motion amount Vav and the average motion direction θav.

Figure 8:
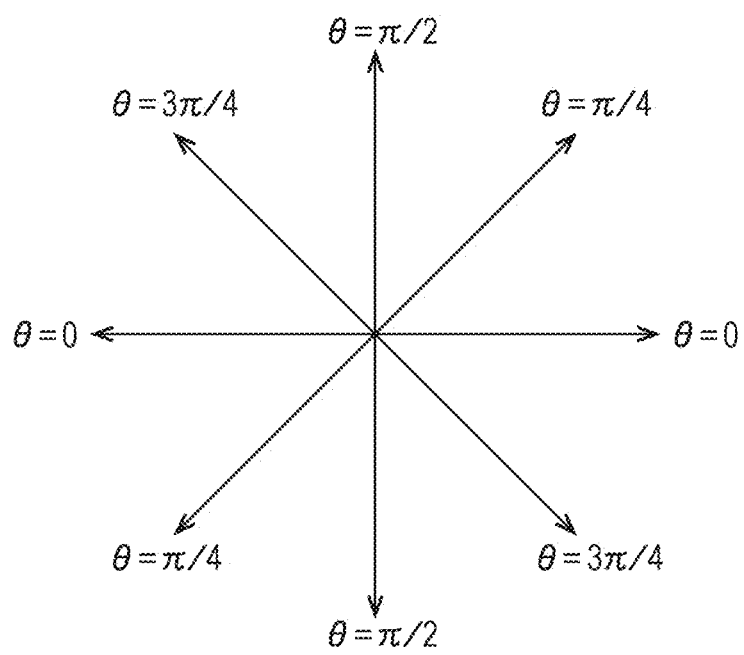
FIG. 8 is a diagram of an example of angle values set for respective templates in correspondence with average motion directions, which are one of the feature amounts calculated according to a first embodiment.

The classification processing unit 340 in this case has, for example, the following first to fifth templates in combinations of the average motion amount Vav and the average motion direction θav. In addition, FIG. 8 is referred to describe such templates. FIG. 8 illustrates a specific example of the average motion directions θ specified in the first to fifth templates described as follows.

First, the first temperature is shown by the following expression.

(Vav,θav)=(0,0)

In the above expression, (Vav,θav) represents a combination of the average motion amount Vav and the average motion direction θav. In addition, the average motion amount Vav in the above expression is "0", and this means that the motion amount over the evaluation section is 0. That is, the first template has a state in which an image part corresponding to the position of the block 611 is stopped in the evaluation section as a template.

In addition, the second template is shown by the following expression.

(Vav,θav)=(a,0)

In the above expression, a may have an arbitrary value other than 0 as the average motion amount Vav. That is, the second template has a combination of the motion of the image part corresponding to the position of the block 611 and a direction of "0" shown in FIG. 8 as the average motion direction θav, as a template.

In addition, the third template is shown by the following expression.

(Vav,θav)=(a,π/4)

That is, the third template has a combination of the motion of the image part corresponding to the position of the block 611 and a direction of "π/4(45°)" as the average motion direction θav, as a template.

In addition, the fourth template is shown by the following expression.

(Vav,θav)=(a,π/2)

That is, the fourth template has a combination of the motion of the image part corresponding to the position of the block 611 and a direction of "π/2(90°)" shown in FIG. 8 as the average motion direction θav, as a template.

In addition, the fifth template is shown by the following expression.

(Vav,θav)=(a, 3π/4)

That is, the fifth template has a motion state in which the motion of the image part corresponding to the position of the block 611 is present and the average motion direction θ is a direction of 3π/4(135°) shown in FIG. 8 as a template.

As the first to fifth templates are prepared, 5 clusters corresponding to the respective templates are present. Here, clusters respectively corresponding to the first to fifth templates are called the first to fifth clusters.

The classification processing unit 340 calculates the combination (Vav,θav) of the feature amounts obtained for the single block 611 and the distance between the first to fifth templates. In addition, the block 611 is classified into a cluster corresponding to the template closest to the calculated distance. For example, when the calculated distance is closest to the third template, the block 611 is classified into the third cluster. The classification process is performed on each of the blocks 611. As a result, data having content in which each of the blocks 611 that form the frame image data 610 is classified to any of the first to fifth clusters is obtained. This becomes the evaluation index data 800 obtained by the classification process in the first embodiment.

Figure 9:
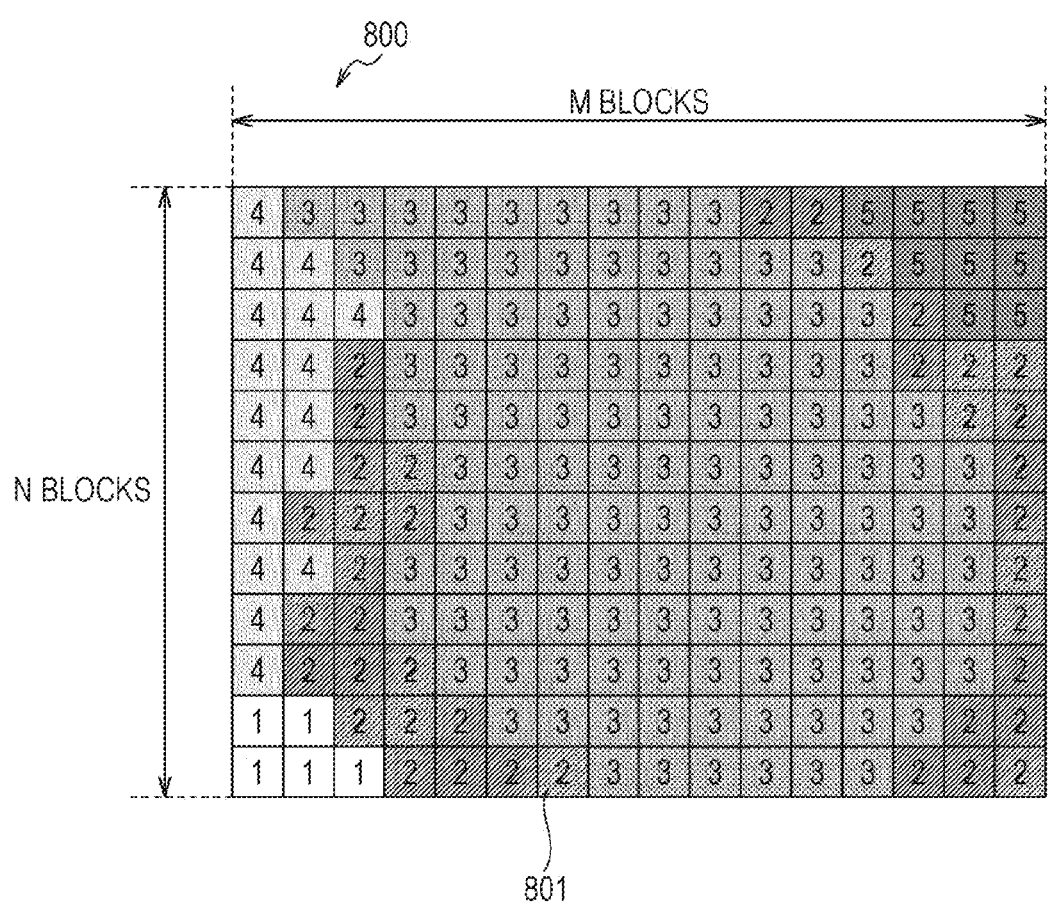
FIG. 9 is a diagram schematically illustrating a structure example of evaluation index data 800.

FIG. 9 schematically illustrates the evaluation index data 800 obtained by the classification process in the first embodiment. As illustrated in this figure, the evaluation index data 800 includes a group of (M×N) individual classification result data 801. The individual classification result data 801 are matched with the blocks 611 that form the frame image data 610 through one-to-one correspondence, and have information representing which one of the first to fifth clusters is the cluster into which the corresponding block 611 is classified. In this figure, which one of the first to fifth clusters is the block 611 corresponding to the individual classification result data 801 classified into is shown by the numbers 1 to 5 shown in the individual classification result data 801.

In addition, in FIG. 9, as the evaluation index data 800, a structure in which the individual classification result data 801 are arranged in an (M×N) matrix. Each of the individual classification result data 801 arranged in this manner corresponds to the block 611 disposed at the same position in the frame image data 610.

For example, it can be said that the distribution of the first to fifth clusters in a single frame image is shown in the evaluation index data 800 having the structure shown in FIG. 9. It is ascertained that this information indicates, in all the imaged cultured cardiomyocytes 500, which parts have a motion or which parts do not have a motion, and which direction the moving parts move in. More specifically, the motion regarding the pulsation of the cultured cardiomyocytes 500 may be ascertained as follows.

For example, first, the cultured cardiomyocytes 500 need to have motions, and cultured cardiomyocytes 500 in which a large part thereof does not have motions are evaluated as poor quality. In the evaluation index data 800 shown in FIG. 9, this may be evaluated by the number of individual classification result data 801 classified into the first cluster.

In addition, although there are motions due to the same pulsations, cultured cardiomyocytes 500 have higher quality as they move in the same direction as much as possible. For example, regarding the evaluation index data 800 shown in FIG. 9, the occupation ratios of the corresponding clusters are plotted as a histogram to evaluate the ratios of the directions of the motions due to the pulsations in the entire cultured cardiomyocytes 500. Moreover, in a case of different motion directions, not only the ratios of the directions of the motions, but also the distribution state that such a part is in may be accurately known by the distribution of the clusters shown in FIG. 9.

In the example of the evaluation index data 800 of FIG. 9, in the arrangement of the individual classification result data 801 corresponding to the frame image data 610, the individual classification result data 801 classified into the third cluster are distributed in a wide region at the center. This represents that the cultured cardiomyocytes 500 as the object of evaluation have a tendency to move in the direction of (π/4(45°)) shown in FIG. 8. For example, in a case where an evaluator wants to check such a distribution state of motion directions, an image classified according to the clusters into which the blocks 611 corresponding to the individual classification result data 801 based on FIG. 9 are classified is generated and displayed by the evaluation device 400. In addition, by checking this image, the evaluator may accurately perceive the state that the directions of the motion of the cultured cardiomyocytes 500 are in.

In this manner, in the first embodiment, on the basis of the two feature amounts including the average motion amount Vav and the average motion direction θav, the presence of a part having motion and the presence of a part without motion in the cultured cardiomyocytes 500 may be distinguished and recognized as described above. In addition, regarding the part having motion, the degree to which the directions of the motion are uniform may be recognized. In addition, the distribution of the part without motion and a part with different directions of motion in the part with motion may also be recognized. That is, in relation to the pulsations of the cultured cardiomyocytes 500, more accurate and detailed evaluation may be performed on two points including the presence or absence of the motion and the motion directions. In addition, this means that by combining a plurality of feature amounts, evaluation regarding a plurality of evaluation items for each of the feature amounts is possible.

Here, the present technique does not need to be limited to the combination of the average motion amount Vav and the average motion direction θav in the above description. That is, a combination of one or more arbitrary feature amounts selected from the 6 feature amounts exemplified in advance may be selected. In addition, in a case where a plurality of feature amounts is selected, various evaluation items are obtained according to the selected combination.

For example, the evaluation device 400 in this case recognizes the state of each part as described above by inputting the evaluation index data 800 as shown in FIG. 9 and performing a process using a predetermined algorithm, and outputs the recognition results in a form that is able to be perceived by the evaluator. For example, when the cluster classification result as shown in FIG. 9 is expressed as an image so as to be displayed and output, the evaluator may visually perceive the fact.

[Example of Process Order of Evaluation Index Data Generating Device]

Figure 10:
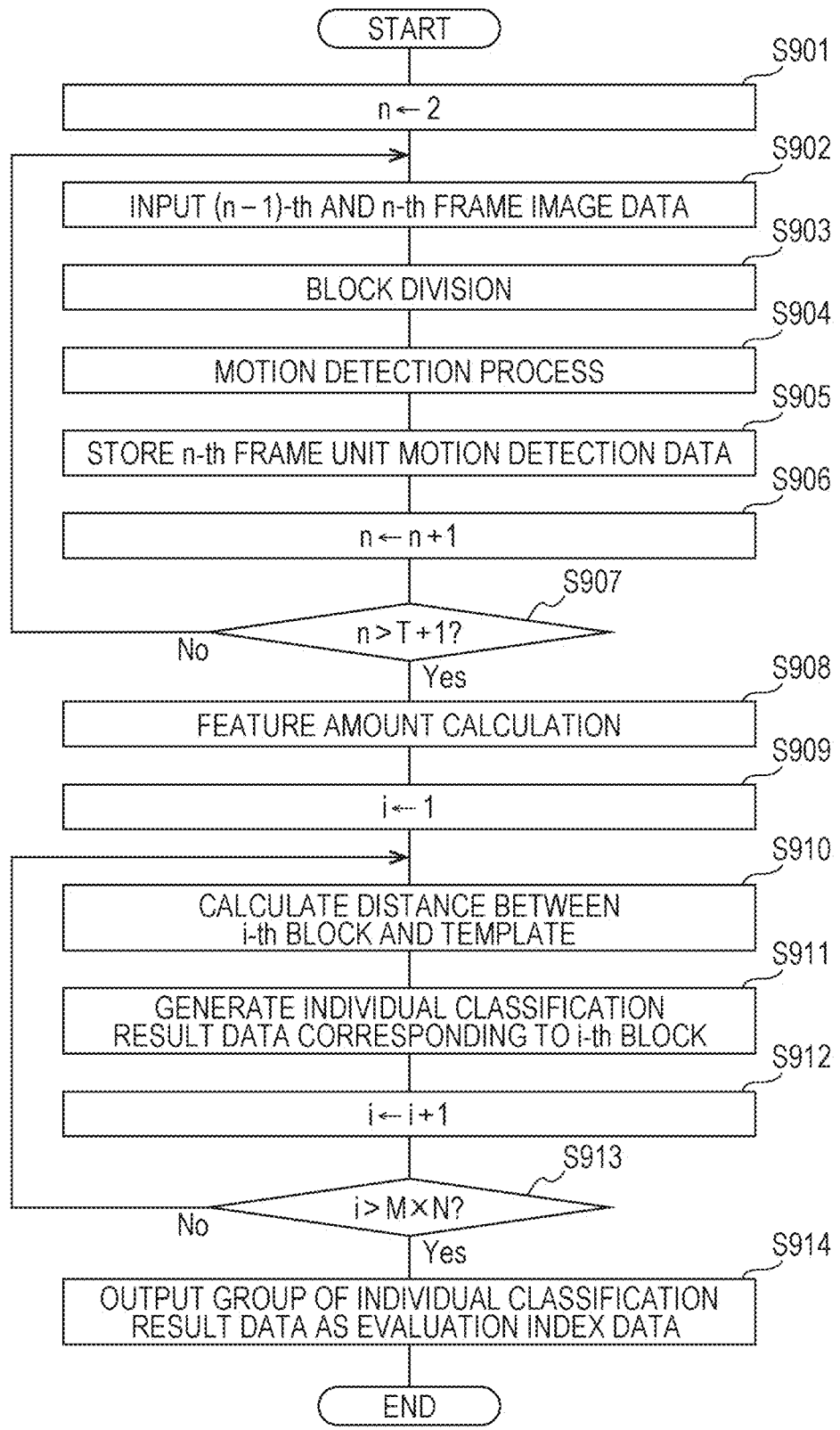
FIG. 10 is a flowchart showing an example of the order of a process performed by the evaluation index data generating device 300 according to the first embodiment.

The flowchart of FIG. 10 shows an example of the order of a process performed by the evaluation index data generating device 300 in the first embodiment. In addition, the process of each of the steps in this figure is appropriately performed by any of the motion detecting unit 310, the feature amount calculating unit 330, and the classification processing unit 340 illustrated in FIG. 2. At least a part of the process of each of the steps shown in FIG. 10 may be configured by being realized by the CPU (Central Processing Unit) of a computer device that executes programs.

The process from Steps S901 to S907 in FIG. 10 is a motion detection process performed by the motion detecting unit 310. First, the motion detecting unit 310 substitutes a variable n corresponding to numbers given to the frame image data 610 that form the evaluation object image data 600 with 2 as initial settings (Step S901). Next, the motion vector calculating unit 312 in the motion detecting unit 310 receives (n−1)-th frame image data and n-th frame image data (Step S902). That is, the previous frame image data held in the frame memory 311 and the current frame image data are input. Next, the motion vector calculating unit 312 performs a process of dividing each of the input frame image data into blocks having a predetermined pixel count (Step S903). In addition, the motion detection process is performed by a method such as block matching (Step S904).

According to the motion detection process in Step S904, a single frame unit motion detection data 710-(n−1) in the motion detection data 700 shown in FIG. 6 is obtained. Here, the motion detecting unit 310 stores the frame unit motion detection data 710-(n−1) in the motion detection data storage unit 320 (Step S905).

Next, the motion detecting unit 310 increments the variable n (Step S906) and determines whether or not the variable n is greater than the maximum value (T+1) (Step S907). In addition, the maximum value (T+1) corresponds to the number of frame image data that form the evaluation object image data 600. In a case where the determination result that the variable n is greater than the maximum value (T+1) is obtained (Step S907), the process from Step S902 is repeatedly performed. Accordingly, the first frame unit motion detection data 710-1 to the T-th frame unit motion detection data 710-T are sequentially stored in the motion detection data storage unit 320. In addition, when a stage in which the T-th frame unit motion detection data 710-T is stored is reached, it is determined that the variable n is greater than the maximum value T (Step S907), and the process proceeds to the order after Step S908.

In Step S907, as the variable n is determined to be greater than (T+1), the feature amount calculating unit 330 performs a process of calculating feature amounts using the motion detection data 700 (Step S908). The feature amounts calculated here are, for example, the average motion amount Vav and the average motion direction θav as described above.

Subsequently, the classification process according to the template method described above is performed by the classification processing unit 340. Therefore, first, the classification processing unit 340 substitutes a variable i representing numbers given to the (M×N) blocks 611 that form the frame image data 610 with 1 (Step S909). Next, the classification processing unit 340 calculates the distance between the feature amount (Vav,θav) calculated for the i-th block 611 and the feature amount (Vav,θav) of each of a plurality of templates prepared in advance (Step S910). The feature amounts (Vav,θav) represents the combination of the average motion amount Vav and the average motion direction θav described above.

In addition, the classification processing unit 340 classifies the i-th block 611 into the cluster corresponding to the template from which the calculated distance is shortest. In addition, the individual classification result data 801 representing the classification results is generated (Step S911). The individual classification result data 801 has information of content corresponding to an identifier of the cluster classified into an identifier of the i-th block. In addition, in the example described above, as the first to fifth templates are prepared, 5 clusters including the first to fifth clusters are prepared. Regarding the correspondence in this example, in Step S911, the block 611 as an object of the classification process is classified to any one cluster of the first to fifth clusters.

Next, the classification processing unit 340 increments the variable i (Step S912) and determines whether or not the variable i is greater than the maximum value (M×N) (Step S913). Here, in a case where the variable is less than or equal to the maximum value (M×N), the process is returned to Step S910, and the process of sequentially classifying the blocks into the clusters is repeated. In addition, when the cluster classification of all the (M×N) blocks 611 is completed, it is determined that the variable i is greater than the maximum value (M×N) in Step S913. According to the determination result, the classification processing unit 340 generates and outputs the evaluation index data 800 by the individual classification result data obtained by the process of Steps S910 to S912 until now (Step S914).

In addition, the combination of the average motion amount Vav and the average motion direction θav in the above description is an example. In the first embodiment, for example, the evaluation index data 800 may be generated by a combination of one or more arbitrary feature amounts selected from the 6 feature amounts exemplified in advance. In addition, on the basis of the calculation method described above, the average motion amount Vav may also be obtained by separately obtaining the horizontal average motion amount Vavx and the vertical average motion amount Vavy. The average amplitude Aav is obtained by separately obtaining the horizontal average amplitude Aavx and the vertical average amplitude Aavy. The average acceleration Bav is obtained by separately obtaining the horizontal average acceleration Bavx and the vertical average acceleration Bavy. Here, for example, it may be thought that the feature amounts including the horizontal direction components and vertical direction components are treated independently so as to be used to generate the evaluation index data 800. In addition, in the above description, the number of clusters is 5 and may also be set to another number.

<2. Second Embodiment>
[Configuration of Evaluation Index Data Generating Device]

The classification process in the first embodiment uses templates, and other methods may be considered as the method of the classification process. Here, as a second embodiment, a configuration that employs another classification process method will be described.

The configuration of the evaluation index data generating device 300 corresponding to the second embodiment is, for example, as in FIG. 2. However, the number of kinds of feature amounts calculated by the feature amount calculating unit 330 and the order of the classification process performed by the classification processing unit 340 are different as in the following description.

[Example of Process Order of Evaluation Index Data Generating Device]

Figure 11:
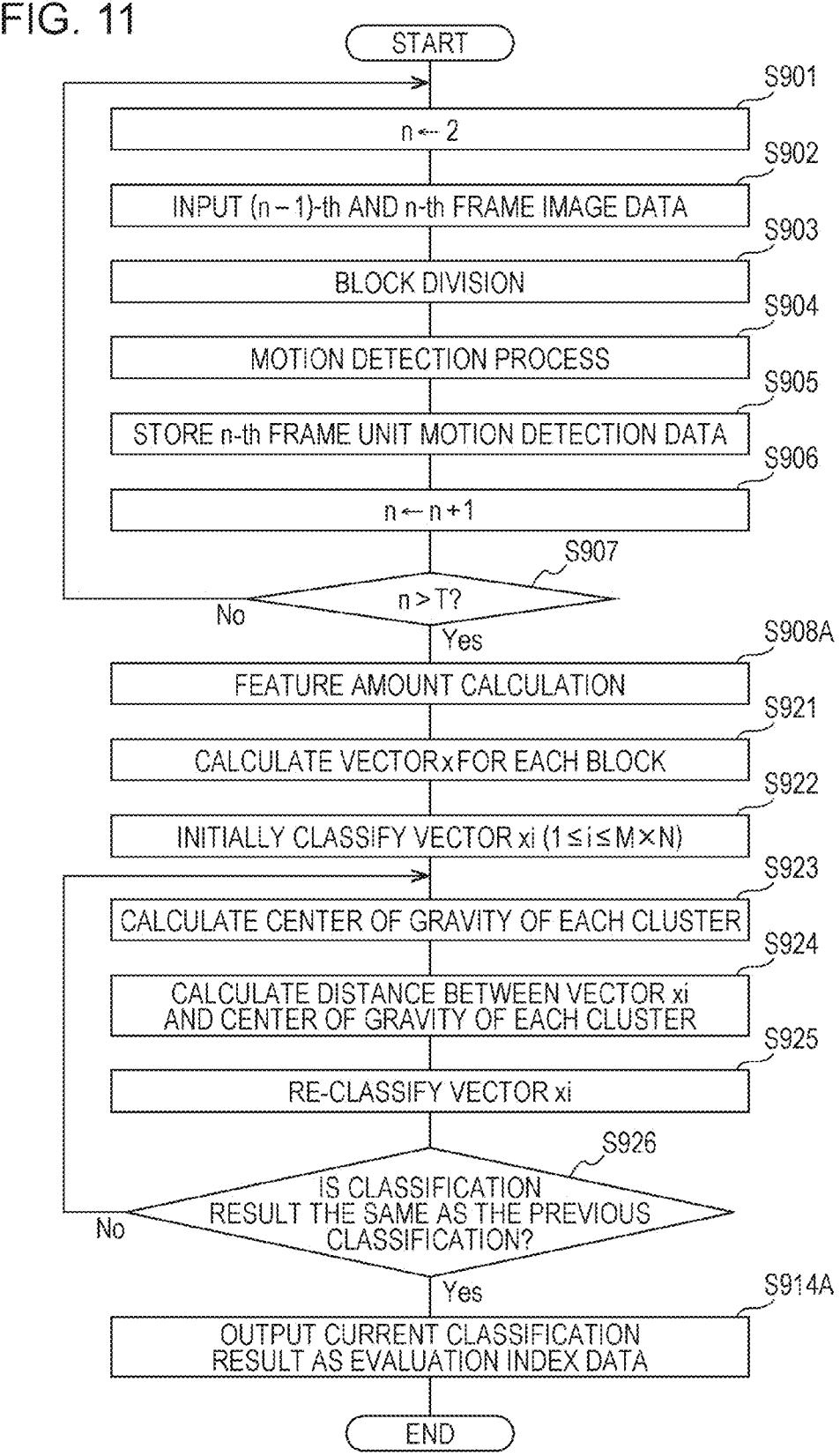
FIG. 11 is a flowchart showing an example of the order of a process performed by the evaluation index data generating device 300 according to the second embodiment.

The flowchart of FIG. 11 shows an example of the order of a process performed by the evaluation index data generating device 300 corresponding to the second embodiment. In this figure, the process from Step S901 to S907 is the same as that in FIG. 10 corresponding to the first embodiment described before.

When it is determined that the variable n is greater than the maximum value T in Step S907, the feature amount calculating unit 330 calculates feature amounts for each of the blocks 611 using the motion detection data 700 stored in the motion detection data storage unit 320 (Step S908A).

As the feature amounts calculated for each of the blocks 611 in Step S908A, there are 9 amounts as follows. That is, the feature amounts include a horizontal average motion amount Vavx, a vertical average motion amount Vavy, an average motion direction θav, a horizontal average amplitude Aavx, a vertical average amplitude Aavy, a horizontal average acceleration Bavx, a vertical average acceleration Bavy, an average pulsation interval Dav, and a pulsation starting time S.

The classification processing unit 340 performs clustering based on a k-means method (k-means method) as follows by using the feature amounts calculated as described above. That is, the classification processing unit 340 calculates a 9-dimensional vector x which combines the 9 feature amounts for each of the blocks 611 (Step S921).

In Step S921, (M×N) vectors x corresponding to the blocks 611 are obtained. Then, the classification processing unit 340 in this case first performs initial cluster classification (initial classification) on the (M×N) vectors xi (1≤i≤(M×N)) according to the k-means method. That is, K samples corresponding to the number K of clusters set in advance are extracted from the vector xi and the distances between the samples and the vector xi other than the samples are calculated. In addition, the vector xi other than the samples is classified into the same cluster as that of the sample having the closest calculated distance.

Next, the classification processing unit 340 calculates the center of gravity Gj (1≤j≤K) for each of the first to K-th clusters according to the final classification results until now (S923). The center of gravity Gj varies depending on the final classification results. Next, the classification processing unit 340 calculates the distance between each of the clusters and the center of gravity Gj for each of the vectors xi (Step S924). In addition, re-classification is performed by classifying each of the vectors xi into the cluster having the shortest calculated distance (Step S925). The process from Steps S923 to S925 is repeated until the classification result has no change and becomes the same as that of the previous result in Step S926.

In addition, the classification result determined to be the same as that of the previous result according to Step S926 becomes, that is, the final classification result. Here, the classification processing unit 340 generates and outputs evaluation index data 800 from the classification result that is finally obtained (Step S914A). That is, in the final classification result, the vector xi is classified into any of the clusters. Here, the classification processing unit 340 generates, for example, individual classification result data 801 in which the identifier of the block 611 corresponding to the vector xi corresponds to the identifier of the classified cluster. In addition, a group of the individual classification result data 801 for each of the i-th to M×N-th blocks 611 is generated as the evaluation index data 800.

As understood from the above description, the evaluation index data 800 obtained in the second embodiment also has the structure shown in, for example, FIG. 9. In addition, each of the clusters represents a combination of numerical ranges of a plurality of different feature amounts. Therefore, each of the clusters has different meaning in relation to the periodic motion as pulsations. Therefore, using the evaluation index data 800 obtained in the second embodiment, accurate and detailed evaluation results may also be obtained.

In addition, the present disclosure shows an example for embodying the present technique, and as clearly described in the present disclosure, items in the present disclosure have a correspondence relationship with specific items of the invention in the claims. Similarly, the specific items of the invention in the claims have a correspondence relationship with the items of the present disclosure denoted by the same names. However, the present technique is not limited to the embodiments and may be embodied by making various modifications of the embodiments in a range without departing from the gist of the present technique.

For example, as the feature amounts used for generating the evaluation index data 800, combinations other than those specifically described in each of the embodiments may also be employed. In addition, feature amounts other than those specifically described in each of the embodiments may be obtained and combined. In addition, from among the feature amounts obtained in each of the embodiments, any of the motion amount, motion direction, amplitude, acceleration, pulsation interval, and the like is an average value of the values obtained for each of the frame periods. However, such feature amounts have changes in time series. Here, it may be considered that, for example, changes in time series are calculated as feature amounts to be used to generate the evaluation index data 800. In addition, as the classification process performed by the classification processing unit 340, other algorithms and methods may also be employed. In addition, the object of evaluation is the cultured cardiomyocytes 500. However, for example, the configuration of the present disclosure may be applied to other objects as long as the motions thereof have periodicity.

In addition, the process order described in the present disclosure may be ascertained as a method having a series or orders and may also be ascertained as a program for executing such a series of orders on a computer and a recording medium that stores the program. As the recording medium, for example, CD (Compact Disc), MD (MiniDisc), DVD (Digital Versatile Disc), memory card, Blu-ray Disc (Blu-ray Disc (registered trademark)), and the like may be used.

<3. Third Embodiment>

[Overview of Another Example of Evaluation Method]

The evaluation method of cells may be a method other that that described above. For example, an evaluation value may be obtained for the index calculated from the motion vector obtained for each of the blocks of cultured cells.

Figure 12:
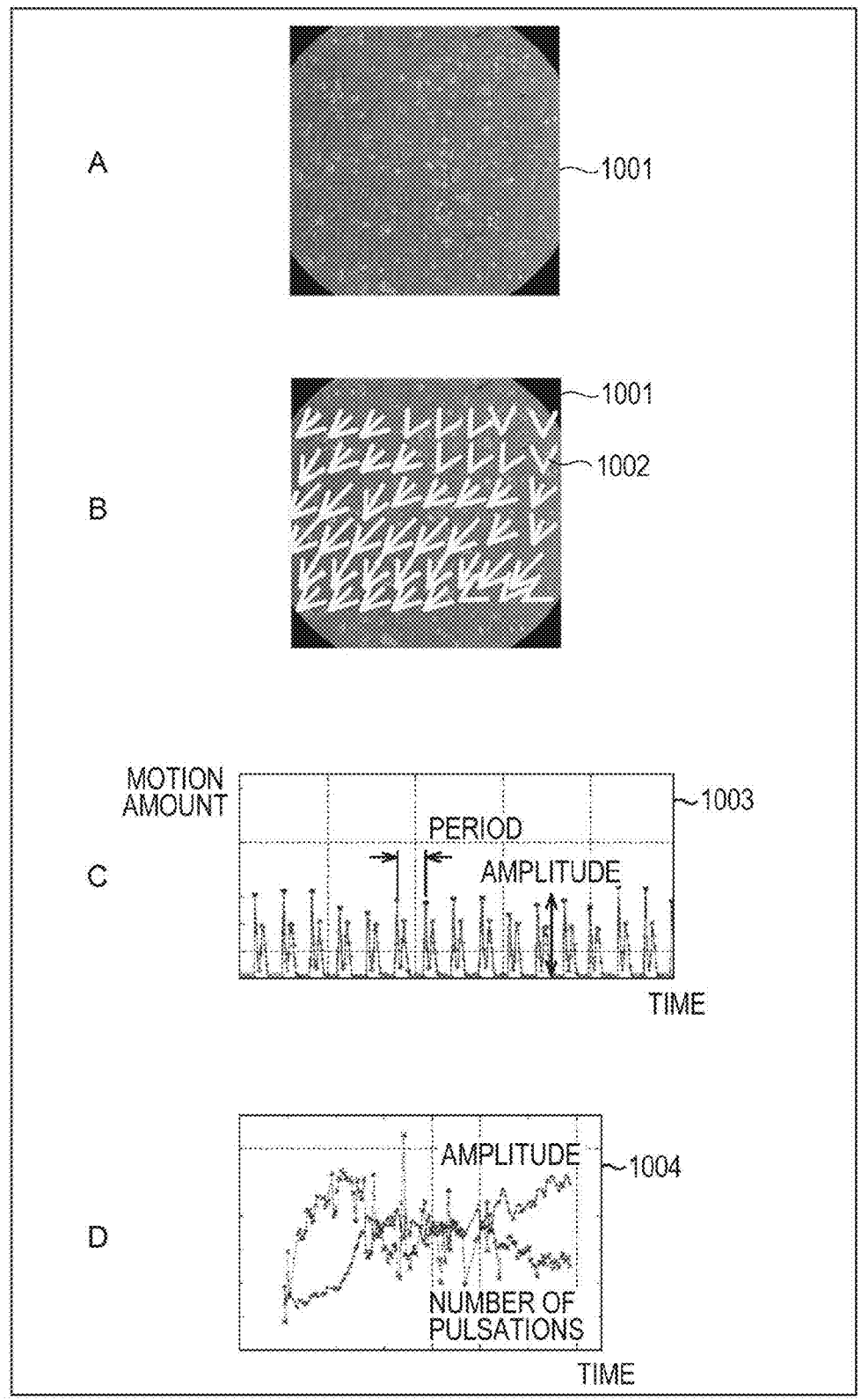
FIG. 12 is a diagram for explaining the summary of other evaluation methods of cells.

For example, when cultured cells 1001 as shown A in FIG. 12 are an object of evaluation, first, as shown B in FIG. 12, a motion vector 1002 may be obtained for each block (partial region) every predetermined time (for example, each frame), a change in the motion amount of each block with respect to time may be obtained as in a graph 1003 shown C in FIG. 12, from this data, data that represents changes in the amplitude and the number of pulsations of the motions of the cells with respect to time as in a graph 1004 shown D in FIG. 12 may be generated, and evaluation values for evaluating such indexes may be obtained, thereby evaluating the motions of the cells using the evaluation values.

In this manner, using the evaluation values, the object of evaluation (for example, the motions of cells) may be evaluated more quantitatively. In addition, since the motion vector is used to generate the indexes, more various indexes may be obtained easily and in a noninvasive manner. That is, the object of evaluation (for example, the motions of cells) may be more correctly evaluated.

[Cultured Cardiomyocyte Evaluation Apparatus]

Figure 13:
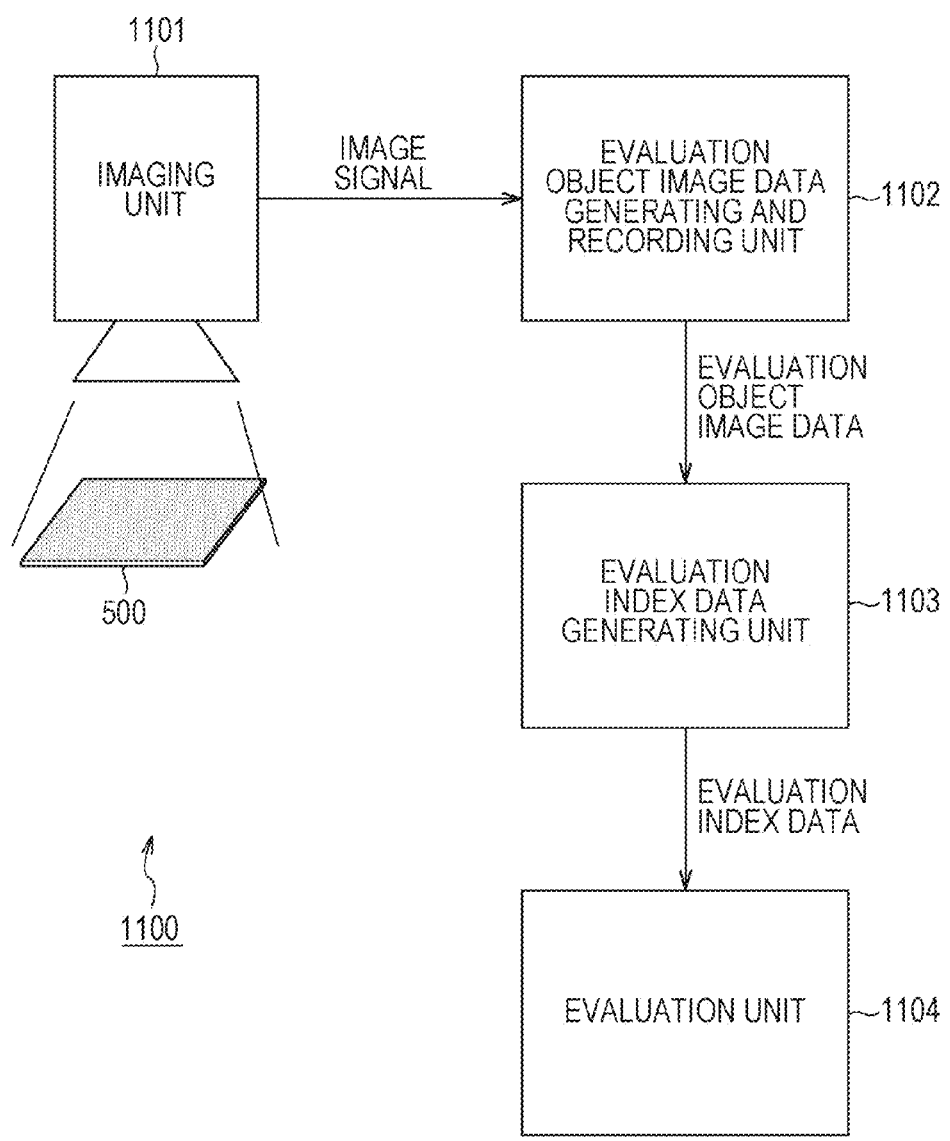
FIG. 13 is a block diagram illustrating a main configuration example of a cultured cardiomyocyte evaluation apparatus.

FIG. 13 is a block diagram illustrating a main configuration example of a cultured cardiomyocyte evaluation apparatus.

The cultured cardiomyocyte evaluation apparatus 1100 illustrated in FIG. 13 is an apparatus that performs evaluation of motions of cultured cardiomyocytes 500, like the cultured cardiomyocyte evaluation system 100 of FIG. 1. That is, the cultured cardiomyocyte evaluation apparatus 1100 realizes the cultured cardiomyocyte evaluation system 100 as a single apparatus. As such, the configuration of the cultured cardiomyocyte evaluation system 100 is arbitrary as long as the function of the entire system is not changed. For example, the plurality of devices illustrated in FIG. 1 may be configured as a single device, and a single device may be configured as a plurality of devices. For example, the entirety of the cultured cardiomyocyte evaluation system 100 may be configured as a single apparatus as illustrated in FIG. 13.

In other words, even in this embodiment, like the cultured cardiomyocyte evaluation system 100 of the first embodiment and the second embodiment for example, the cultured cardiomyocyte evaluation apparatus 1100 may also be configured of a plurality of devices. Hereinafter, description will be provided using the cultured cardiomyocyte evaluation apparatus 1100.

However, in the case of this embodiment, unlike the first embodiment and the second embodiment, (the motions of) the cultured cardiomyocytes 500 may be evaluated by a method other than the evaluation method described above. That is, as described above, the cultured cardiomyocyte evaluation apparatus 1100 of this embodiment obtains evaluation values that evaluate the motions of an object of evaluation.

The cultured cardiomyocytes 500 illustrated in FIG. 13 are living tissues (cell group) for heart disease, which are generated by culturing cardiomyocytes collected from a living body in vitro. Cardiomyocytes have pulsations by always repeating contraction and relaxation. When such cardiomyocytes are cultured and grown to the cultured cardiomyocytes 500, ideally, the operations of the cells are related to each other and the entirety of the cultured cardiomyocytes 500 pulsates as a single living tissue.

The cultured cardiomyocyte evaluation apparatus 1100 has, for example, the cultured cardiomyocytes 500 cultured as described above as an object of evaluation and evaluates the motions thereof in order to evaluate the performance of the cultured cardiomyocytes 500.

In addition, the object of evaluation of the cultured cardiomyocyte evaluation apparatus 1100 may be other than the cultured cardiomyocytes 500. For example, cultured cells other than cardiomyocytes may be an object of evaluation. As a matter of course, the object of evaluation may be other than cells. However, as the object of evaluation, an object that moves by itself and is able to be evaluated by evaluating the motions thereof is desirable. In addition, the motions may be achieved autonomously (spontaneously) like cardiomyocytes, and may also be achieved by an electric signal supplied from the outside, and the like.

As illustrated in FIG. 13, the cultured cardiomyocyte evaluation apparatus 1100 includes an imaging unit 1101, an evaluation object image data generating and recording unit 1102, an evaluation index data generating unit 1103, and an evaluation unit 1104.

The imaging unit 1101 corresponds to the imaging devices 110 of FIG. 1. That is, the imaging unit 1101 images the cultured cardiomyocytes 500 which are the object of evaluation. In addition, the imaging unit 1101 may directly image the cultured cardiomyocytes 500 (without using another member), and may image the cultured cardiomyocytes 500 using another member such as a microscope. In addition, the cultured cardiomyocytes 500 may be fixed to the imaging unit 1101 or may also not be fixed. Since the cultured cardiomyocyte evaluation apparatus 1100 detects motions (temporal changes in position), generally, it is desirable that the cultured cardiomyocytes 500 be fixed to the imaging unit 1101.

The imaging unit 1101 supplies an image signal of the image of the cultured cardiomyocytes 500 obtained through imaging to the evaluation object image data generating and recording unit 1102.

The evaluation object image data generating and recording unit 1102 corresponds to the evaluation object image data generating and recording device 200 of FIG. 1. That is, the evaluation object image data generating and recording unit 1102 generates evaluation object image data on the basis of the image signal supplied from the imaging unit 1101 and records and saves the generated evaluation object image data in, for example, a recording medium therein. The evaluation object image data generated here becomes, for example, moving image data generated from the image signal of the imaged cultured cardiomyocytes 500.

For example, the evaluation object image data generating and recording unit 1102 may extract frame images only in a partial period from a plurality of frame images supplied from the imaging unit 1101 and use these as the evaluation object image data. In addition, for example, the evaluation object image data generating and recording unit 1102 may extract a partial region of each of the frame images supplied from the imaging unit 1101 as a small frame image and use a moving image made of the small frame images as the evaluation object image data. Moreover, for example, the evaluation object image data generating and recording unit 1102 may perform arbitrary image processing on each of the frame images supplied from the imaging unit 1101 and use the image processing result as the evaluation object image data. As the image processing, for example, image enlargement, reduction, rotation, deformation, luminance or chromaticity correction, sharpness, noise removal, intermediate frame image generation, and the like may be considered. As a matter of course, any image processing other than those may be employed.

The evaluation object image data generating and recording unit 1102 supplies the stored evaluation object image data to the evaluation index data generating unit 1103 at a predetermined timing.

The evaluation index data generating unit 1103 corresponds to the evaluation index data generating device 300 of FIG. 1. That is, the evaluation index data generating unit 1103 performs motion detection of the object of evaluation (the cultured cardiomyocytes 500) for each of the blocks which are partial regions into which the entire region of the image of the object of evaluation (cultured cardiomyocytes 500) is divided, between the frame images of the supplied evaluation object image data. The evaluation index data generating unit 1103 expresses the detected motion of each of the blocks as a motion vector and obtains various feature amounts (motion feature amount data) regarding the motions of the object of evaluation (cultured cardiomyocytes 500) from the motion vector. In addition, as described in the first embodiment and the second embodiment, the evaluation index data generating unit 1103 classifies the blocks on the basis of the motion feature amount data.

The evaluation index data generating unit 1103 supplies the motion feature amount data generated as described above and the classification result to the evaluation unit 1104 as evaluation index data.

The evaluation unit 1104 corresponds to the evaluation device 400 of FIG. 1. That is, the evaluation unit 1104 calculates an evaluation value for each of the supplied evaluation index data, integrates the calculated evaluation values, and obtains the evaluation values of the object of evaluation (cultured cardiomyocytes 500).

[Evaluation Index Data Generating Unit]

Figure 14:
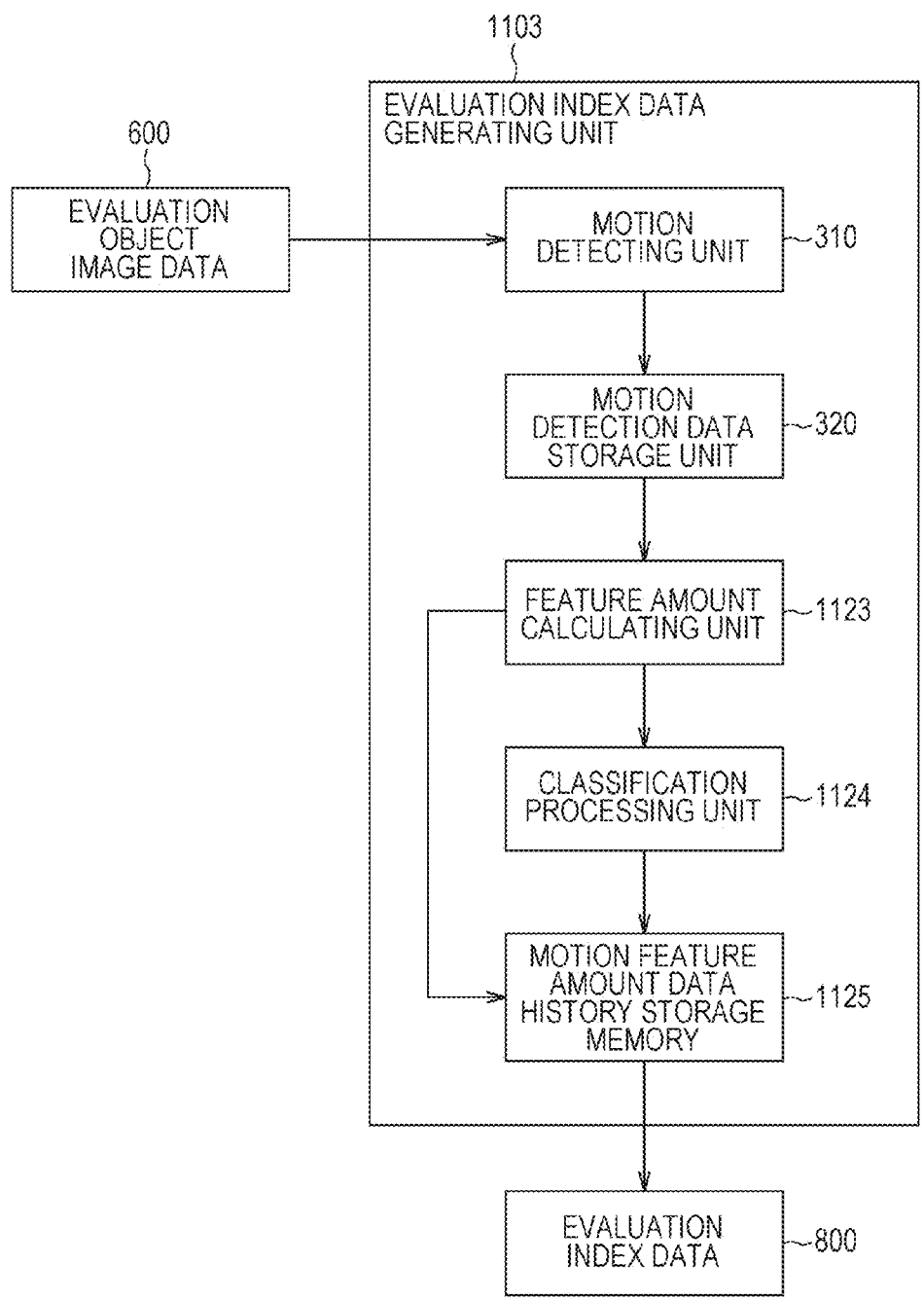
FIG. 14 is a block diagram illustrating a main configuration example of a evaluation index data generating unit of FIG. 13.

FIG. 14 is a block diagram illustrating a main configuration example of the evaluation index data generating unit 1103. As illustrated in FIG. 14, the evaluation index data generating unit 1103 has, like the evaluation index data generating device 300 of FIG. 2, the motion detecting unit 310 and the motion detection data storage unit 320. In addition, the evaluation index data generating unit 1103 has a feature amount calculating unit 1123 instead of the feature amount calculating unit 330 of the evaluation index data generating device 300 of FIG. 2 and has a classification processing unit 1124 instead of the classification processing unit 340 of the evaluation index data generating device 300 of FIG. 2. Moreover, the evaluation index data generating unit 1103 has a motion feature amount data history storage memory 1125.

The motion detecting unit 310 receives the evaluation object image data 600, performs motion detection thereon, and supplies the detection result (motion vector) as motion detection data to the motion detection data storage unit 320 so as to be stored. As described with reference to FIGS. 3 to 6, the motion detecting unit 310 includes the frame memory 311 and the motion vector calculating unit 312, divides the entire region of each of the frame images of the evaluation object image data 600 into M×N (M and N are arbitrary natural numbers) blocks, and performs motion detection on each of the blocks using a method such as block matching between frame images, thereby generating a motion vector.

As illustrated in FIG. 7, the motion detecting unit 310 performs motion detection in an evaluation section (for example, T+1 frames (T is an arbitrary natural number)) having a predetermined length. For example, as illustrated in FIG. 6, the motion detecting unit 310 generates (M×N×T) motion detection data (motion vectors) using (T+1) frame images and stores the resultant in the motion detection data storage unit 320.

When motion detection in a single evaluation section is ended (when (M×N×T) motion detection data (motion vectors) are stored in the motion detection data storage unit 320), the feature amount calculating unit 1123 acquires the motion detection data and calculates feature amounts regarding the motions of the cultured cardiomyocytes 500 from the motion detection data.

For example, the feature amount calculating unit 1123 calculates feature amounts regarding the motions (pulsations) of the cultured cardiomyocytes 500 for each of the blocks, using the (M×N×T) motion detection data (motion vectors).

For example, the feature amount calculating unit 1123 calculates the average value (average amplitude Aav) of the amplitudes of the motions of the cultured cardiomyocytes 500 in the evaluation section exemplified in FIG. 7 as one of the feature amounts regarding the motions of the cultured cardiomyocytes 500.

As shown in FIG. 7, the amplitude is an amplitude when the motion amount is changed. The average amplitude Aav is the average value of the amplitudes in the corresponding evaluation section. The amplitude A and the average amplitude Aav are calculated for each of the blocks.

That is, when the horizontal direction component of each amplitude is Ax and the vertical direction component thereof is Ay, each amplitude A is calculated by the following Expression (1).

[Math. 3]

$$A = \sqrt{A_X^2 + A_Y^2} \quad (1)$$

When a variable corresponding to a frame order is n, using each amplitude An calculated by Expression (1), the average amplitude Aav in the evaluation section is calculated by the following Expression (2).

[Math. 4]
$$Aav = \frac{1}{T}\sum_{n=1}^{T} A_n$$

The feature amount calculating unit 1123 calculates the average amplitude Aav for each of the blocks.

In addition, for example, the feature amount calculating unit 1123 calculates the average value (average pulsation interval Dav) of the pulsation intervals (or the number of pulsations per unit time) of the motions of the cultured cardiomyocytes 500 in one evaluation section exemplified in FIG. 7 as one of the feature amounts regarding the motions of the cultured cardiomyocytes 500.

The pulsation interval D is an interval of peaks of the motion amounts as shown in FIG. 7. The average pulsation interval Dav is the average value of the pulsation intervals D in the corresponding evaluation section. The feature amount calculating unit 1123 calculates such an average pulsation interval Dav for each of the blocks.

That is, when a variable corresponding to a frame order is n and a timing of the peak of the motion amount is Pn, the pulsation interval Dn is calculated by the following Expression (3).

[Math. 5]

$$Dn = P(n+1) - P(n) \quad (3)$$

Therefore, the average pulsation interval Dav in the evaluation section is calculated by the following Expression (4).

[Math. 6]

$$Dav = \frac{1}{T}\sum_{n=1}^{T} Dn \quad (4)$$

The feature amount calculating unit 1123 calculates such an average pulsation interval Dav for each of the blocks.

That is, in the case of the above example, two kinds of feature amounts are generated for each of the (M×N) blocks. The kinds and the number of feature amounts calculated by the feature amount calculating unit 1123 are arbitrary. For example, as described in the first embodiment, the average motion amount Vav, the average motion direction θav, the average acceleration Bav, and the pulsation starting time S may be calculated as the feature amounts.

In addition, a method of calculating each of the feature amounts is arbitrary. For example, in the case of the feature amounts such as the average motion amount Vav, the average amplitude Aav, and the average acceleration Bav which have both the horizontal component and the vertical component, the feature amount calculating unit 1123 may calculate the average of each of the components and synthesize the averages of both the components.

The feature amount calculating unit 1123 supplies the calculated feature amounts to the motion feature amount data history storage memory 1125 as the motion feature amount data so as to be stored. As a matter of course, the feature amount calculating unit 1123 may sequentially supply the obtained feature amounts to the motion feature amount data history storage memory 1125 as the motion feature amount data so as to be stored. In addition, the feature amount calculating unit 1123 may cause a part of the obtained feature amounts to be stored in the motion feature amount data history storage memory 1125 as the motion feature amount data.

In addition, the feature amount calculating unit 1123 also supplies the calculated feature amounts to the classification processing unit 1124.

Like the classification processing unit 340 of FIG. 2, the classification processing unit 1124 performs a classification process using the plurality of kinds of feature amounts calculated by the feature amount calculating unit 1123 and supplies the classification process results to the motion feature amount data history storage memory 1125 as the motion feature amount data so as to be stored.

The evaluation index data generating unit 1103 repeats the generation of evaluation index data as described above S times. That is, the imaging unit 1101 continues imaging and generates frame images for at least a time of (evaluation section (T+1 frames)×S times), and the evaluation object image data generating and recording unit 1102 generates the evaluation object image data for at least (evaluation section×S times). In addition, in the evaluation object image data, the evaluation sections may not be continuous over time.

For example, it is assumed that a duration from the start of the culture to the end of the culture is 10 days and T=600 frames are imaged every 2 hours to perform evaluation. In this case, each evaluation section is 600 frames, and the evaluation section is repeated S=120 times.

Figure 15:
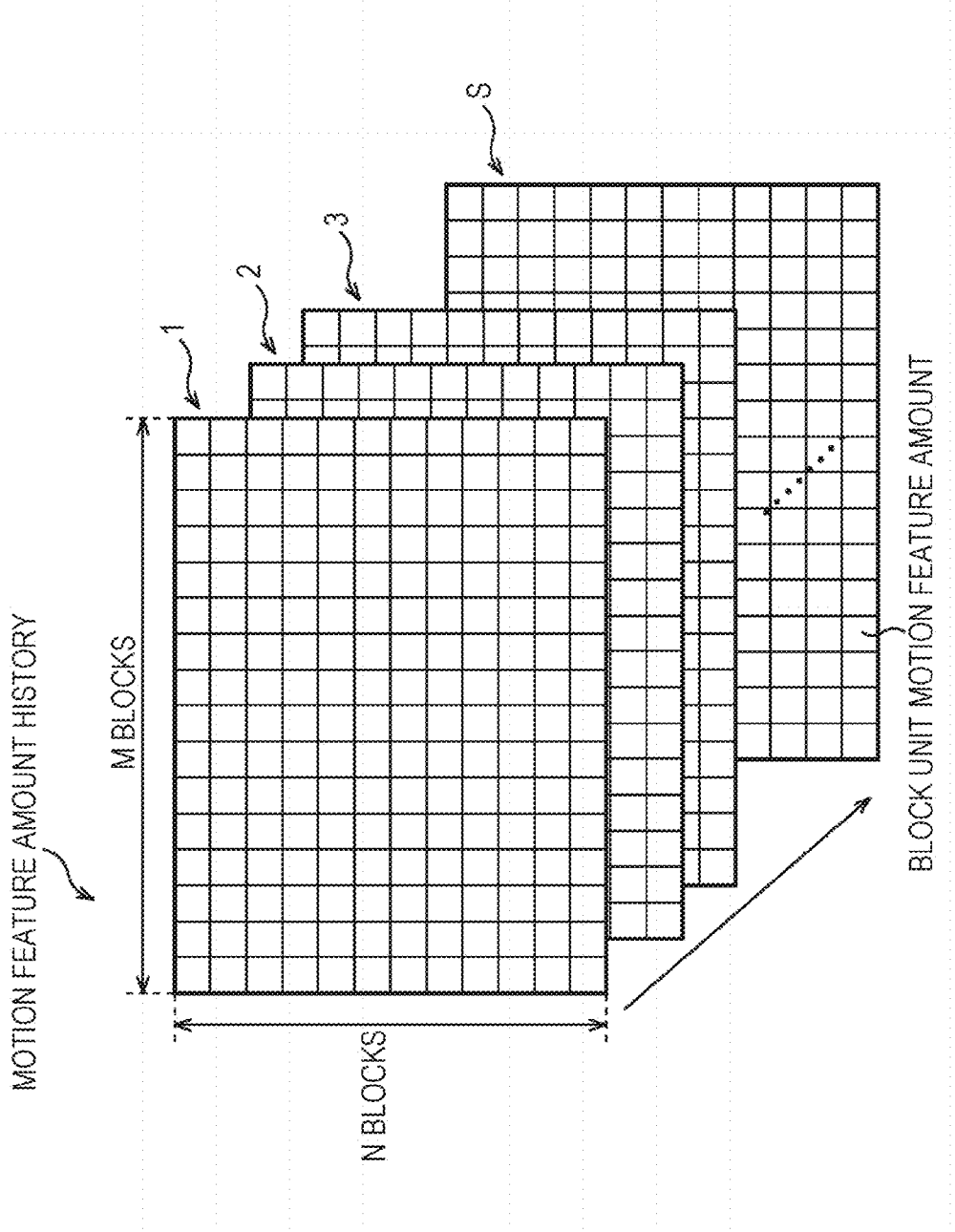
FIG. 15 is a diagram for explaining a form of data stored in a motion feature amount data history storage memory.

The evaluation index data generating unit 1103 generates feature amounts for each of blocks in each of the evaluation sections as described above. Accordingly, in the motion feature amount data history storage memory 1125, M×N×S feature amounts are stored as illustrated in FIG. 15. In addition, in a case where a plurality of kinds of feature amounts are generated, more feature amounts (M×N×S×the number of kinds) are stored in the motion feature amount data history storage memory 1125.

In this manner, the generation of the feature amounts is repeated S times, and when a predetermined number of feature amounts are stored, the motion feature amount data history storage memory 1125 supplies the stored feature amounts to the evaluation unit 1104 as the evaluation index data 800 at a predetermined timing.

[Evaluation Unit]

Figure 16:
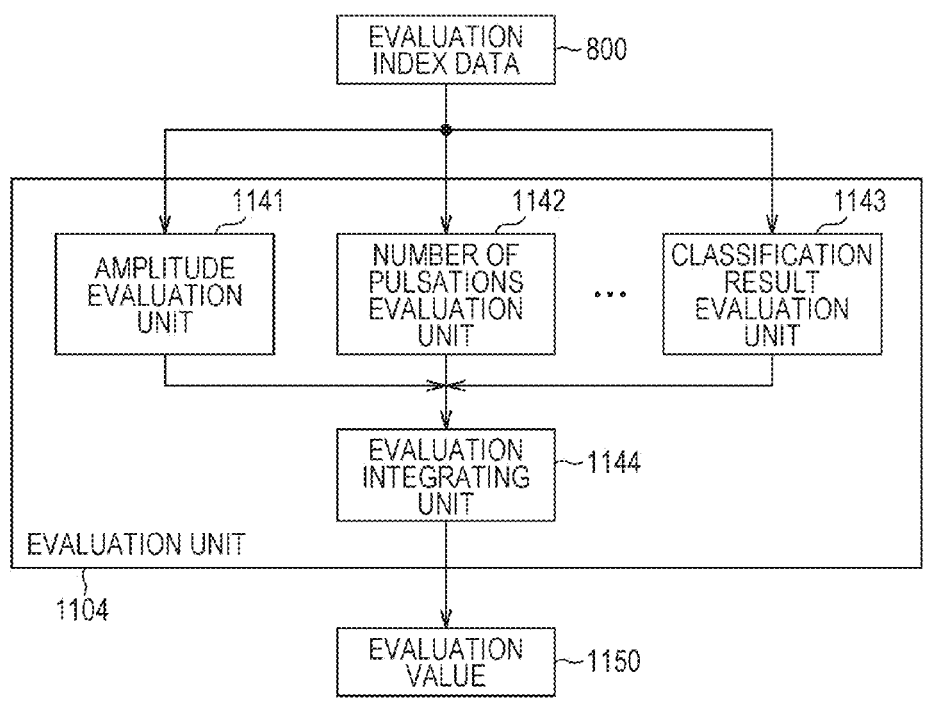
FIG. 16 is a block diagram illustrating a main configuration example of an evaluation unit of FIG. 13.

FIG. 16 is a block diagram illustrating a main configuration example of the evaluation unit 1104. As illustrated in FIG. 16, the evaluation unit 1104 has an evaluation unit (an evaluation unit for each of the indexes) for each of the supplied evaluation index data 800. In the example of FIG. 16, the evaluation unit 1104 has, as the evaluation units for the indexes, an amplitude evaluation unit 1141, a number of pulsations evaluation unit 1142, and a classification result evaluation unit 1143.

The amplitude evaluation unit 1141 evaluates the average amplitude Aav supplied as the evaluation index data. The number of pulsations evaluation unit 1142 evaluates the average pulsation interval Dav supplied as the evaluation index data. The classification result evaluation unit 1143 evaluates the classification process result supplied as the evaluation index data.

The evaluation units of the indexes represent the kinds of index data that are able to be evaluated by the evaluation unit 1104. Basically, the evaluation unit 1104 is set to be able to evaluate all the supplied evaluation index data. Therefore, for example, in a case where another evaluation index data 800 is supplied to the evaluation unit 1104, an evaluation unit corresponding to the evaluation index data 800 is prepared in the evaluation unit 1104. As such, the kinds and the number of evaluation units for the indexes included in the evaluation unit 1104 are dependent on the kinds and the number of supplied evaluation index data.

[Operation Example 1 of Amplitude Evaluation Unit]

Next, a specific example of amplitude evaluation by the amplitude evaluation unit 1141 will be described. In general, it is desirable that the amplitude of the pulsations of the cardiomyocytes be significantly stable. Here, the amplitude evaluation unit 1141 calculates an evaluation value to have a greater value in a case where the amplitude is more significantly stabilized.

Figure 17:
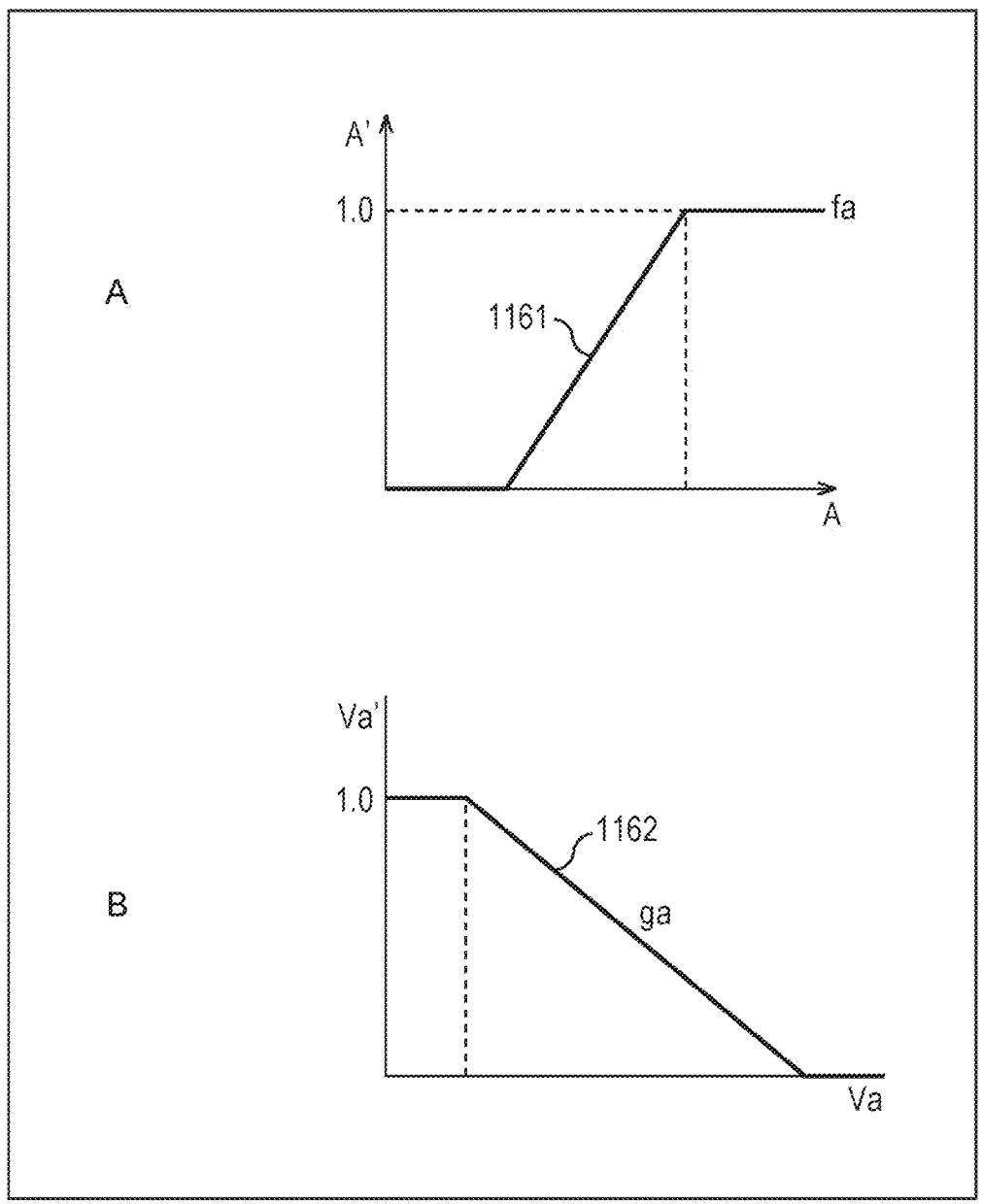
FIG. 17 is a diagram for explaining an example of amplitude evaluation.

In this case, the amplitude evaluation unit 1141 first normalizes each amplitude A (average amplitude Aav) which is the evaluation index data for each of the blocks of the frame images as in the following Expression (5) using such a function fa as a curve 1161 of the graph shown in FIG. 17A (obtains an amplitude A' normalized by the function fa).

[Math. 7]

$$A' = f_a(A) \quad (5)$$

For example, when it is assumed that the number of blocks in the entire frame image is M×N and the calculation of the average amplitude Aav is repeated S times, the amplitude evaluation unit 1141 normalizes each of the M×N×S average amplitudes Aav using the function fa.

The function fa may be any function as long as the function produces a greater value as the value of the amplitude A is greater and produces a smaller value as the value thereof is smaller. That is, the normalized amplitude A' takes a greater value as the amplitudes are greater and takes a smaller value as the amplitudes are smaller.

Next, the amplitude evaluation unit 1141 obtains a dispersion Va of the amplitudes of the past N times for each of the blocks as in the following Expression (6).

[Math. 8]

$$V_a = \frac{1}{N} \sum_{k=0}^{N-1} (\overline{A} - A(t-k))^2 \quad (6)$$

In addition, in Expression (6), the overlined A is the average value of the amplitudes A (average amplitude Aav). In addition, in the case where the calculation of the average amplitude Aav is repeated S times, N=S is achieved. That is, for example, when it is assumed that the number of blocks in the entire frame image is M×N and the calculation of the average amplitude Aav is repeated S times, the amplitude evaluation unit 1141 calculates M×N dispersions Va from the M×N×S average amplitudes Aav.

Next, the amplitude evaluation unit 1141 normalizes the dispersion Va of the amplitudes as in the following Expression (7) using such a function ga as a curve 1162 of the graph shown in FIG. 17B (obtains a dispersion Va' normalized by the function ga).

[Math. 9]

$$V'_a = g_a(V_a) \quad (7)$$

For example, when it is assumed that the number of blocks in the entire frame image is M×N, the amplitude evaluation unit 1141 normalizes each of the M×N dispersions Va using the function ga.

The function ga may be any function as long as the function produces a smaller value as the value of the dispersion Va is greater and produces a greater value as the value thereof is smaller. That is, the normalized dispersion Va' of the amplitudes takes a greater value with smaller variations and takes a smaller value with greater variations.

Next, the amplitude evaluation unit 1141 calculates the average value (M×N average values) over the entire screen of the products of the normalized amplitude A' and the normalized dispersion Va' of the amplitudes as an evaluation value Ea as in the following Expression (8).

[Math. 10]

$$E_a = \frac{1}{MN} \sum_{k=0}^{M-1} \sum_{l=0}^{N-1} A'_{k,l} V'_{k,l} \quad (8)$$

In this case, the evaluation value Ea has a greater value as the normalized amplitude and the normalized dispersion of the amplitudes in the entire frame image are greater. That is, a case where the amplitude of each of the blocks is greater and is more stabilized (the amplitude is greater and variations in the time direction thereof are smaller) is evaluated at a higher degree.

In addition, the amplitude evaluation unit 1141 may also calculate the proportion of the number Na1 of blocks in which the value of the product of the normalized amplitude A' and the normalized dispersion Va' of the amplitudes is greater than or equal to a predetermined threshold Ta1 with respect to the entire frame image as an evaluation value Ea as in the following Expression (9).

[Math. 11]

$$E_a = \frac{N_{a1}}{MN} \quad (9)$$

The threshold Ta1 is an arbitrary value set in advance. When the value is set to be greater, the evaluation reference is increased (evaluation conditions become strict), and the value of the evaluation value Ea is reduced. In this case, the evaluation value Ea takes a higher value as the number of blocks in which the product of the amplitude and the dispersion in the entire frame image is stabilized to be greater than a predetermined reference is greater.

That is, in this case, it is preferable that variations between blocks be smaller compared to a case where the evaluation value Ea is calculated using the average value as described above. For example, in the case of evaluating the average value, there may be cases where evaluation is enhanced although variations between blocks are great. Contrary to this, in a case where evaluation is performed using a threshold, even though the value of a partial block is excessively high, a high degree of evaluation is not achieved when the number Na1 of blocks is not great.

[Operation Example 2 of Amplitude Evaluation Unit]

In addition, the amplitude evaluation method is not limited to the above-described example. For example, the pulsations of the cultured cardiomyocytes may be compared to those in a case of an ideal and normal culture and the comparison results may be evaluated. In this case, a transition pattern of the pulsations during ideal and normal culture (ideal transition pattern) is determined in advance.

Figure 18:
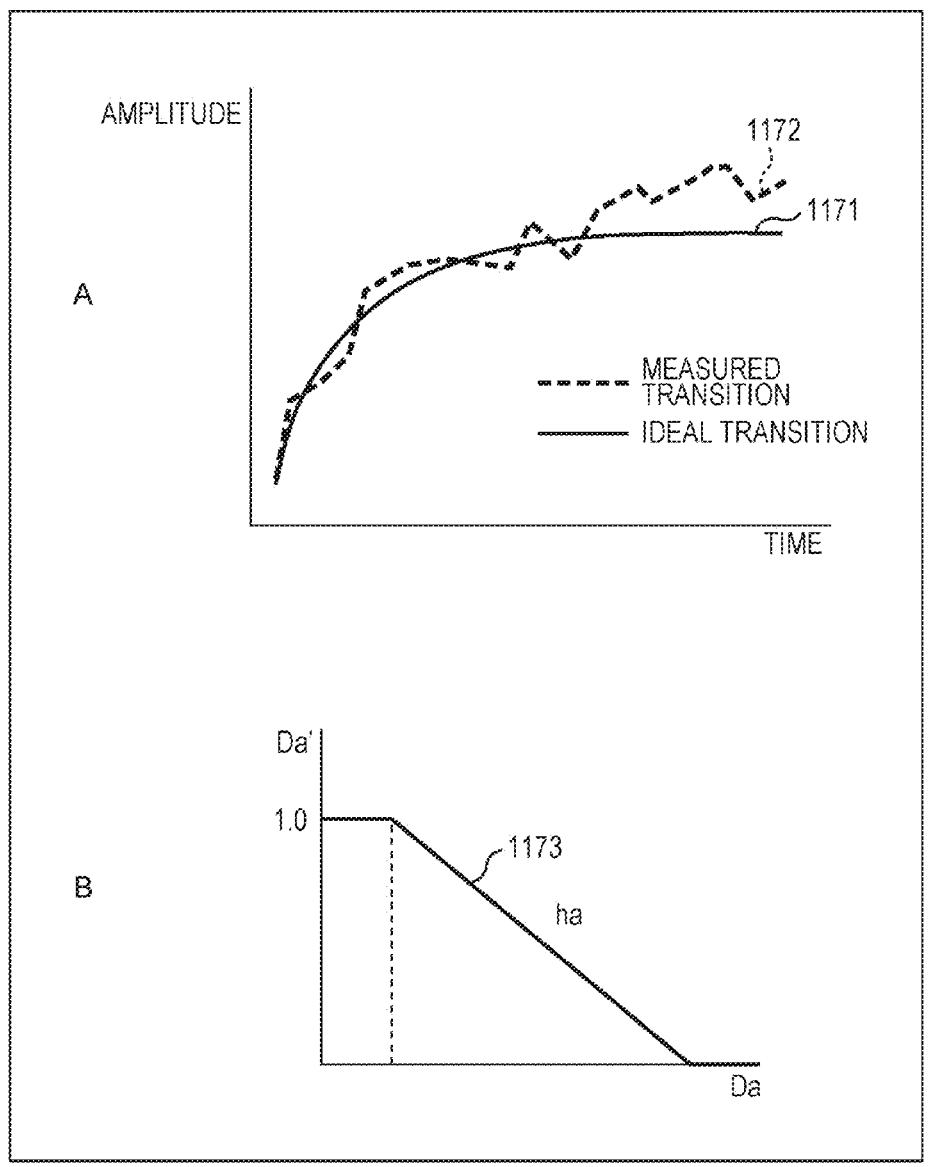
FIG. 18 is a diagram for explaining an example of amplitude evaluation.

As shown in the graph A of FIG. 18, the amplitude evaluation unit 1141 compares a transition pattern of the pulsations of the cultured cardiomyocytes (measured transition pattern) to the ideal transition pattern and evaluates the similarity therebetween. In A of FIG. 18, a full line 1171 represents the ideal transition pattern of amplitudes, and a dotted line 1172 represents the measured transition pattern of the amplitudes. As the difference between the two is smaller, the evaluation value is greater.

First, the amplitude evaluation unit 1141 calculates the sum Da of the distances between the two transition patterns at each elapsed time for each of the blocks as in the following Expression (10).

[Math. 12]

$$D_a = \sum_{k=0}^{S-1} W_a(k)\sqrt{(A(k)-A_I(k))^2} \quad (10)$$

In Expression (10), A(k) is the amplitude A (average amplitude Aav) in the measured transition pattern, and $A_I$(k) is the amplitude A (average amplitude Aav) in the ideal transition pattern. k represents which number of times is the measurement value (elapsed time) (in a case where the measurement is repeated S times, 0≤k≤S−1). In addition, $W_a$(k) is a weight coefficient, and the value thereof is arbitrary. For example, the difference between the two transition patterns is not important immediately after the start of the measurement. However, in a case where the two transition patterns are required to approximate each other as the elapsed time is increased, the value of the weight coefficient $W_a$ is set to be greater as the value of k is greater.

As described above, when the sum Da of the distances between the two transition patterns at each elapsed time is obtained, the amplitude evaluation unit 1141 then normalizes the sum Da of the distances using such a function ha as a full line 1173 of the graph shown in FIG. 18B as in the following Expression (11) (calculates a normalized sum Da' of the distances).

[Math. 13]

$$D'_a = h_a(D_a) \quad (11)$$

The function ha may be any function as long as the function produces a smaller value as the value of the sum Da of the distances is greater and produces a greater value as the value thereof is smaller. That is, the normalized sum Da' of the distances takes a greater value as the difference between the ideal transition pattern and the measured transition pattern is smaller and takes a smaller value as the difference between the ideal transition pattern and the measured transition pattern is greater.

Next, the amplitude evaluation unit 1141 calculates the average value (M×N average values) over the entire screen of the normalized sums Da' of the distances as an evaluation value Ea as in the following Expression (12).

[Math. 14]

$$E_a = \frac{1}{MN}\sum_{k=0}^{M-1}\sum_{l=0}^{N-1} D'_{k,l} \quad (12)$$

In this case, the evaluation value Ea has a greater value as the difference between the measured transition and the ideal transition in the entire frame image is smaller.

In addition, the amplitude evaluation unit 1141 may also calculate the proportion of the number Na2 of blocks in which the value of the normalized sum Da' of the distances is greater than or equal to a predetermined threshold Ta2 with respect to the entire frame image as an evaluation value Ea as in the following Expression (13).

[Math. 15]

$$E_a = \frac{N_{a2}}{MN} \quad (13)$$

In Expression (13), the threshold Ta2 is an arbitrary value set in advance. When the value is set to be greater, the evaluation reference is increased (evaluation conditions become strict), and the value of the evaluation value Ea is reduced. In this case, the evaluation value Ea takes a higher value as the number of blocks, in which the difference between the measured transition and the ideal transition in the entire frame image is stabilized to be smaller than a predetermined reference, is greater.

In this manner, the amplitude evaluation unit 1141 calculates the evaluation value Ea that evaluates the amplitudes on the basis of the index data regarding the amplitudes of the pulsations of the cardiomyocytes. That is, the amplitude evaluation unit 1141 may quantitatively perform evaluation on the amplitudes of the pulsations of the cardiomyocytes.

[Operation Example 1 of Number of Pulsations Evaluation Unit]

Next, a specific example of evaluation of number of pulsations by the number of pulsations evaluation unit 1142 will be described. In general, it is desirable that regarding the pulsations of the cardiomyocytes, the number of pulsations per unit time (rate) be stabilized as an appropriate value. Here, the number of pulsations evaluation unit 1142 calculates an evaluation value to have a greater value in a case where the number of pulsations per unit time is stabilized as an appropriate value.

In this case, the number of pulsations evaluation unit 1142 first calculates the number R of pulsations per unit time (for example, for 1 minute) from the pulsation intervals D (average pulsation interval Dav) as in the following Expression (14).

[Math. 16]

$$R[bps] = \frac{60}{D[sec]} \quad (14)$$

That is, the number R of pulsations per unit time is the average value of the numbers of pulsations per unit time in the evaluation section (for example, (T+1) frames). The number of pulsations evaluation unit 1142 calculates the number R of pulsations per unit time for each of the blocks. In addition, the number of pulsations evaluation unit 1142 calculates the number R of pulsations per unit time for each of evaluation durations. That is, when it is assumed that the number of blocks in a single frame image is M×N and the evaluation duration is repeated S times, the number of pulsations evaluation unit 1142 calculates (M×N×S) numbers R of pulsations per unit time.

Figure 19:
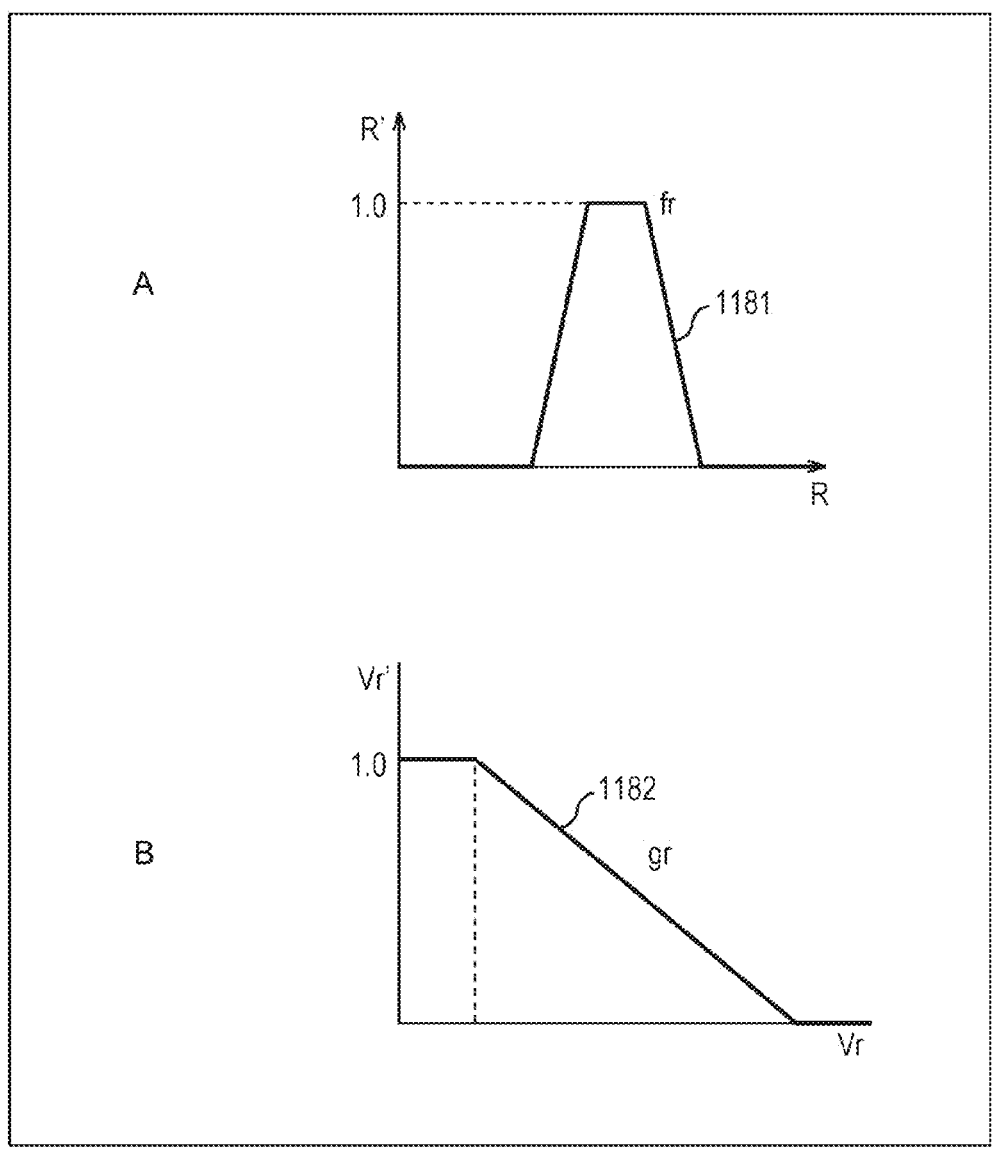
FIG. 19 is a diagram for explaining an example of pulsation evaluation.

Next, the number of pulsations evaluation unit 1142 normalizes the numbers R of pulsations per unit time using such a function fr as a curve 1181 of the graph shown A of in FIG. 19 as in the following Expression (15) (obtains the number R' of pulsations per unit time normalized by the function fr).

[Math. 17]

$$R' = f_r(R) \quad (15)$$

For example, when it is assumed that the number of blocks in the entire frame image is M×N and the calculation of the pulsation interval Dav is repeated S times, the number of pulsations evaluation unit 1142 normalizes each of the M×N×S numbers R of pulsations per unit time using the function fr. The function fr may be any function as long as the function produces a greater value as the value of the number R of pulsations per unit time is closer to an appropriate value and produces a smaller value as the value thereof is further from the appropriate value. That is, the normalized number R' of the pulsations per unit time takes a greater value as is closer to an appropriate number of pulsations per unit time determined in advance and takes a smaller value as is further from the appropriate number of pulsations per unit time determined in advance.

Next, the number of pulsations evaluation unit 1142 obtains a dispersion Vr per unit time the past N times for each of the blocks as in the following Expression (16).

[Math. 18]

$$V_r = \frac{1}{N} \sum_{k=0}^{N-1} (\overline{R} - R(t-k))^2 \quad (16)$$

In addition, in Expression (16), the overlined R is the average value of the numbers R of pulsations per unit time. In addition, as described above, in the case where the calculation of the number R of pulsations per unit time is repeated S times, N=S is achieved. That is, for example, when it is assumed that the number of blocks in the entire frame image is M×N and the calculation of the number R of pulsations per unit time is repeated S times, the number of pulsations evaluation unit 1142 calculates M×N dispersions Vr from the M×N×S numbers R of pulsations per unit time.

Next, the number of pulsations evaluation unit 1142 normalizes the dispersion Vr of the amplitudes as in the following Expression (17) using such a function gr as a curve 1182 of the graph shown in FIG. 19B (obtains a dispersion Vr' of the number of pulsations per unit time normalized by the function gr).

[Math. 19]

$$V'_r = g_r(V_r) \quad (17)$$

For example, when it is assumed that the number of blocks in the entire frame image is M×N, the number of pulsations evaluation unit 1142 normalizes each of the M×N dispersions Vr using the function gr.

The function gr may be any function as long as the function produces a smaller value as the value of the dispersion Vr is greater and produces a greater value as the value thereof is smaller. That is, the normalized dispersion Vr' of the numbers of pulsations per unit time takes a greater value with smaller variations and takes a smaller value with greater variations.

Next, the number of pulsations evaluation unit 1142 calculates the average value (M×N average values) over the entire screen of the products of the normalized number R' of pulsations per unit time and the normalized dispersion Vr' of the numbers of pulsations per unit time as an evaluation value Er as in the following Expression (18).

[Math. 20]

$$E_r = \frac{1}{MN} \sum_{k=0}^{M-1} \sum_{l=0}^{N-1} R'_{k,l} V'_{k,l} \quad (18)$$

In this case, the evaluation value Er has a greater value as the normalized number of pulsations per unit time and the normalized dispersion in the entire frame image are greater. That is, a case where the normalized number R of pulsations per unit time of each of the blocks is more stabilized (the number of pulsations per unit time is closer to an appropriate value and variations in the time direction thereof are smaller) is evaluated at a higher degree.

In addition, the number of pulsations evaluation unit 1142 may also calculate the proportion of the number Nr1 of blocks in which the value of the product of the normalized number R' of pulsations per unit time and the normalized dispersion Vr' of the numbers of pulsations per unit time is greater than or equal to a predetermined threshold Tr1 with respect to the entire frame image as an evaluation value Er as in the following Expression (19).

[Math. 21]

$$E_r = \frac{N_{r1}}{MN} \quad (19)$$

The threshold Tr1 is an arbitrary value set in advance. When the value is set to be greater, the evaluation reference is increased (evaluation conditions become strict), and the value of the evaluation value Er is reduced. In this case, the evaluation value Er takes a higher value as the number of blocks in which the number of pulsations per unit time in the entire frame image is closer to an appropriate value than a predetermined reference and is stabilized in the time direction is greater.

That is, in this case, it is preferable that variations between blocks be smaller compared to a case where the evaluation value Er is calculated using the average value as described above. For example, in the case of evaluating the average value, there may be cases where evaluation is enhanced although variations between blocks are large. Contrary to this, in a case where evaluation is performed using a threshold, even though the value of a partial block is excessively high, a high degree of evaluation is not achieved when the number Nr1 of blocks is not great.

[Operation Example 2 of Number of Pulsations Evaluation Unit]

In addition, the method of evaluating the number of pulsations per unit time is not limited to the above-described example. For example, the pulsations of the cultured cardiomyocytes may be compared to those in a case of ideal and normal culture and the comparison results may be evaluated. In this case, a transition pattern of the pulsations during ideal and normal culture (ideal transition pattern) is determined in advance.

Figure 20:
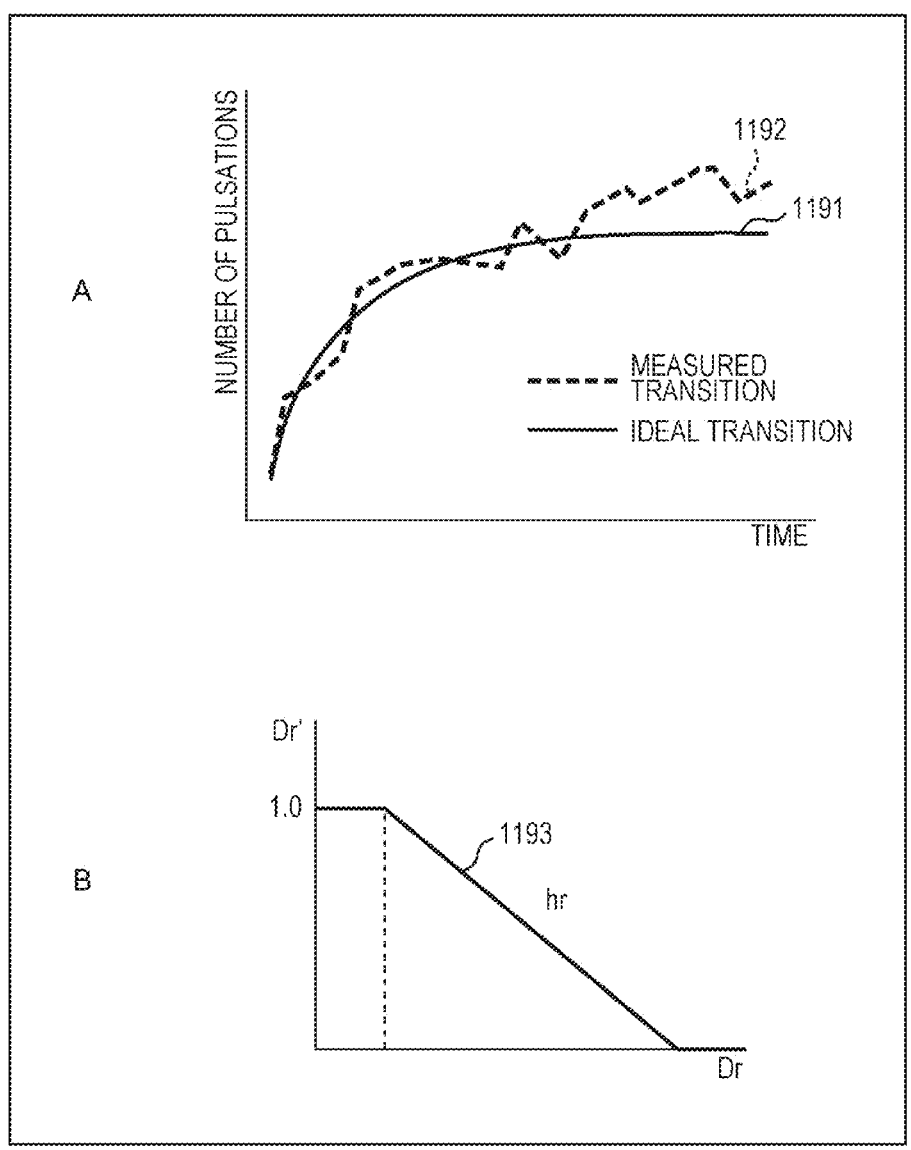
FIG. 20 is a diagram for explaining an example of pulsation evaluation.

As shown in the graph A of FIG. 20, the number of pulsations evaluation unit 1142 compares a transition pattern of the pulsations of the cultured cardiomyocytes (measured transition pattern) to the ideal transition pattern and evaluates the similarity therebetween. In A of FIG. 20, a full line 1191 represents the ideal transition pattern of the numbers of pulsations per unit time, and a dotted line 1192 represents the measured transition pattern of the numbers of pulsations per unit time. As the difference between the two is smaller, the evaluation value is greater.

First, the number of pulsations evaluation unit 1142 calculates the sum Dr of the distances between the two transition patterns at each elapsed time for each of the blocks as in the following Expression (20).

[Math. 22]

$$D_r = \sum_{k=0}^{S-1} W_r(k)\sqrt{(R(k)-R_I(k))^2} \tag{20}$$

In Expression (20), R(k) is the number R of pulsations per unit time in the measured transition pattern, and $R_I(k)$ is the number of pulsations per unit time in the ideal transition pattern. k represents which number of times is the measurement value (elapsed time) (in a case where the measurement is repeated S times, $0 \leq k \leq S-1$). In addition, $W_r(k)$ is a weight coefficient, and the value thereof is arbitrary. For example, the difference between the two transition patterns is not important immediately after the start of the measurement. However, in a case where the two transition patterns are required to approximate each other as the elapsed time is increased, the value of the weight coefficient $W_r$ is set to be greater as the value of k is greater.

As described above, when the sum Dr of the distances between the two transition patterns at each elapsed time is obtained, the number of pulsations evaluation unit 1142 then normalizes the sum Dr of the distances using such a function hr as a full line 1193 of the graph shown in FIG. 20B as in the following Expression (21) (calculates a normalized sum Dr' of the distances).

[Math. 23]

$$D'_r = h_r(D_r) \tag{21}$$

The function hr may be any function as long as the function produces a smaller value as the value of the sum Dr of the distances is greater and produces a greater value as the value thereof is smaller. That is, the normalized sum Dr' of the distances takes a greater value as the difference between the ideal transition pattern and the measured transition pattern is smaller and takes a smaller value as the difference between the ideal transition pattern and the measured transition pattern is greater.

Next, the number of pulsations evaluation unit 1142 calculates the average value (M×N average values) over the entire screen of the normalized sums Dr' of the distances as an evaluation value Er as in the following Expression (22).

[Math. 24]

$$E_r = \frac{1}{MN}\sum_{k=0}^{M-1}\sum_{l=0}^{N-1} D'_{k,l} \tag{22}$$

In this case, the evaluation value Er has a greater value as the difference between the measured transition and the ideal transition in the entire frame image is smaller.

In addition, the number of pulsations evaluation unit 1142 may also calculate the proportion of the number Nr2 of blocks in which the value of the normalized sum Dr' of the distances is greater than or equal to a predetermined threshold Tr2 with respect to the entire frame image as an evaluation value Er as in the following Expression (23).

[Math. 25]

$$E_r = \frac{N_{r2}}{MN} \tag{23}$$

In Expression (23), the threshold Tr2 is an arbitrary value set in advance. When the value is set to be greater, the evaluation reference is increased (evaluation conditions become strict), and the value of the evaluation value Er is reduced. In this case, the evaluation value Er takes a higher value as the number of blocks, in which the difference between the measured transition and the ideal transition in the entire frame image is stabilized to be smaller than a predetermined reference, is greater.

In this manner, the number of pulsations evaluation unit 1142 calculates the evaluation value Er that evaluates the number of pulsations per unit time on the basis of the index data regarding the number of pulsations per unit time of the pulsations of the cardiomyocytes. That is, the number of pulsations evaluation unit 1142 may quantitatively perform evaluation on the number of pulsations per unit time of the pulsations of the cardiomyocytes.

[Evaluation Example of Classification Result Evaluation Unit]

Next, a specific example of evaluation of cluster classification results by the classification result evaluation unit 1143 will be described. In general, it is desirable that, regarding the pulsations of the cardiomyocytes, the proportion of blocks classified into desirable clusters be increased. Here, the classification result evaluation unit 1143 calculates a greater evaluation value in a case where the proportion of blocks classified into a predetermined cluster (desirable cluster) of which feature amounts are in a desirable state is greater.

For example, it is assumed that the desirable cluster is C. The classification result evaluation unit 1143 first counts the number of times at which classification into C is made during the classification performed the past n times for each of the blocks, compares the number N of times to a predetermined threshold Tc1 determined in advance, and obtains the number Nc of blocks that satisfy the following conditional expression (24).

[Math. 26]

$$n > T_{c1} \tag{24}$$

The classification result evaluation unit 1143 calculates an evaluation value Ec that evaluates the classification results using the number Nc of blocks obtained in this manner as in the following Expression (25) (the number of blocks of a single frame image is assumed to be N×N).

[Math. 27]

$$E_c = \frac{N_c}{MN} \tag{25}$$

As described above, the classification result evaluation unit 1143 calculates the evaluation value Ec that evaluates the classification results of the feature amounts of the pulsations of the cardiomyocytes. That is, the classification result evaluation unit 1143 may quantitatively perform evaluation on the classification results of the feature amounts of the pulsations of the cardiomyocytes.

[Evaluation Integrating Unit]

Returning to FIG. 16, the evaluation unit 1104 further includes an evaluation integrating unit 1144. Each of the evaluation units for the respective indexes of the evaluation unit 1104 supplies the evaluation value for the corresponding calculated index to the evaluation integrating unit 1144.

The evaluation integrating unit 1144 integrates the evaluation values supplied from the evaluation units for the respective indexes through a predetermined operations and generates an evaluation value E of the object of evaluation (cultured cardiomyocytes 500). For example, the evaluation integrating unit 1144 calculates the sum of the evaluation values for the respective indexes as an evaluation value E as shown in the following Expression (26).

[Math. 28]

$$E = w_a E_a + w_r E_r + \ldots + w_c E_c \qquad (26)$$

In Expression (26), the evaluation value Ea is the evaluation value of the average amplitude Aav supplied from the amplitude evaluation unit 1141, the evaluation value Er is the evaluation value of the average pulsation interval Dav supplied from the number of pulsations evaluation unit 1142, and the evaluation value Ec is the evaluation value of the classification process results supplied from the classification result evaluation unit 1143. In addition, weight coefficients Wa, Wr, and We are coefficients that weight the evaluation values Ea, Er, and Ec.

As described above, the evaluation integrating unit 1144 may arbitrarily weight and integrate the evaluation values for the respective indexes and thus may quantitatively evaluate the object of evaluation with more various references.

The evaluation integrating unit 1144 outputs the evaluation value E calculated as above to the outside of the evaluation unit 1104 as an evaluation value 1150 of the object of evaluation.

The evaluation value 1150 output from the evaluation unit 1104 is displayed on a monitor as, for example, text information or image information for a user and the like, or is output to another device (not shown) which performs an arbitrary process using the evaluation value 1150. In addition, the evaluation value 1150 may also be recorded on a recording medium (not shown).

In this manner, the evaluation unit 1104 may quantitatively evaluate more various indexes using more various methods. Accordingly, the evaluation unit 1104 may evaluate the object of evaluation (cardiomyocytes) more accurately.

[Flow of Evaluation Process]

Next, an example of the flow of an evaluation process performed by the cultured cardiomyocyte evaluation apparatus 1100 will be described with reference to the flowchart of FIG. 21.

When the evaluation process is started, the imaging unit 1101 of the cultured cardiomyocyte evaluation apparatus 1100 images an object of evaluation in Step S1001. In Step S1002, the evaluation object image data generating and recording unit 1102 generates evaluation object image data from an image signal obtained through the imaging in Step S1001.

In Step S1003, the evaluation index data generating unit 1103 generates evaluation index data which is data of various indexes for evaluating the motions of the object of evaluation from the evaluation object image data generated in Step S1002. In Step S1004, the evaluation unit 1104 evaluates the motions of the object of evaluation using the evaluation index data generated in Step S1003 and calculates an evaluation value.

In Step S1005, the evaluation unit 1104 outputs the evaluation value calculated in Step S1004 and ends the evaluation process.

[Flow of Evaluation Index Data Generation Process]

Next, an example of the flow of the evaluation index data generation process performed in Step S1003 of FIG. 21 will be described with reference to the flowchart of FIG. 22.

When the evaluation index data generation process is started, the motion detecting unit 310 of the evaluation index data generating unit 1103 detects the motions of the object of evaluation for each of blocks in Step S1021 and generates motion vectors. In Step S1022, the motion detection data storage unit 320 stores the motion vector of each of the blocks generated in Step S1021.

In Step S1023, the motion detecting unit 310 determines whether or not motion detection is performed for a predetermined evaluation duration determined in advance. In a case where it is determined that a frame image which is not subjected to motion detection is present in the predetermined evaluation duration, the motion detecting unit 310 returns the process to Step S1021 and repeats motion detection for a frame image as a new object of the process.

In addition, in Step S1023, in a case where it is determined that motion detection is performed on all the frame images as the object of the process in the predetermined evaluation duration, the motion detecting unit 310 moves the process to Step S1024.

In Step S1024, the feature amount calculating unit 1123 calculates feature amounts regarding the motions of the object of evaluation such as the average amplitude Aav and the average pulsation interval Dav from the motion vectors stored in Step S1022. In Step S1025, the motion feature amount data history storage memory 1125 stores the feature amounts calculated in Step S1024 as motion feature amount data.

In Step S1026, the classification processing unit 1124 classifies the blocks on the basis of the feature amounts calculated in Step S1024. In Step S1027, the motion feature amount data history storage memory 1125 stores the classification results obtained in Step S1026 as motion feature amount data.

In Step S1028, the feature amount calculating unit 1123 determines whether or not calculation of the feature amounts is repeated a predetermined number of times (for example, S times) determined in advance, and in a case where it is determined that the predetermined number of times has not been reached, returns the process to Step S1021 and repeats the subsequent process. In addition, in Step S1028, in a case where it is determined that calculation of feature amounts is repeated the predetermined number of times, the feature amount calculating unit 1123 moves the process to Step S1029.

In Step S1029, the motion feature amount data history storage memory 1125 outputs the motion feature amount data held therein to the evaluation unit 1104 as the evaluation index data. When the process of Step S1029 is ended, the motion feature amount data history storage memory 1125 ends the evaluation index data generation process, returns the process to Step S1003 of FIG. 21, and performs the process after Step S1004.

[Flow of Motion Evaluation Process]

Figure 23:
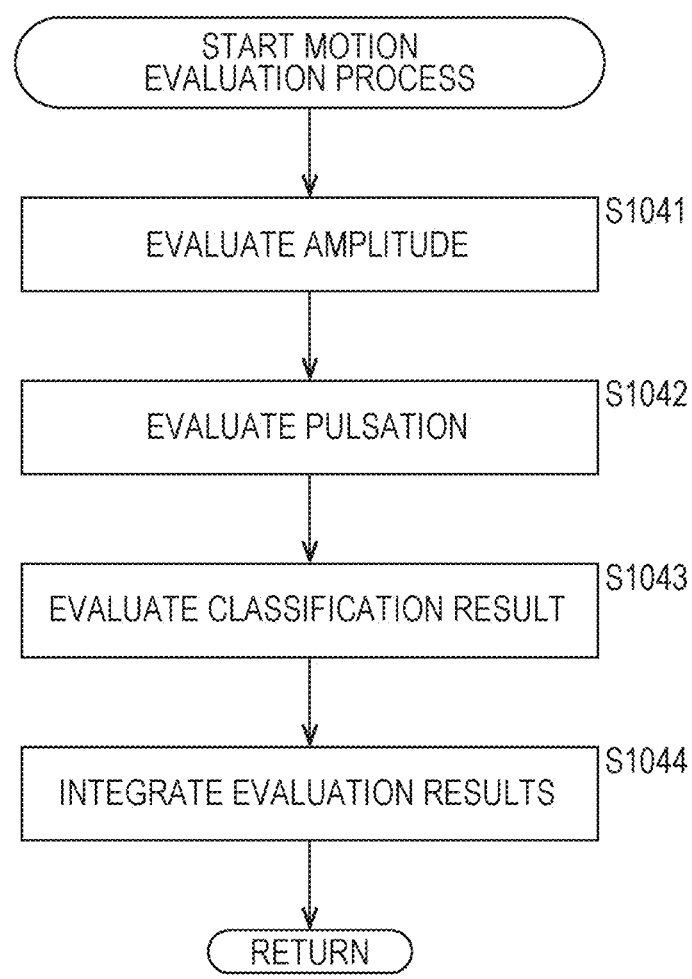
FIG. 23 is a flowchart for explaining an example of the flow of a motion evaluation process.

Next, an example of the flow of the motion evaluation process performed in Step S1004 of FIG. 21 will be described with reference to the flowchart of FIG. 23.

When the motion evaluation process is started, the amplitude evaluation unit 1141 of the evaluation unit 1104 evaluates the amplitude of the motions of the object of evaluation on the basis of the evaluation index data regarding amplitudes in Step S1041, and calculates an evaluation value Ea thereof.

In Step S1042, the number of pulsations evaluation unit 1142 evaluates the number of pulsations per unit time of the motions of the object of evaluation on the basis of the evaluation index data regarding the number of pulsations per unit time, and calculates an evaluation value Er thereof.

In Step S1043, the classification result evaluation unit 1143 evaluates the result of the classification of each of the blocks performed according to the motions of the object of evaluation, on the basis of the evaluation index data regarding classification results, and calculates an evaluation value Ec thereof.

In Step S1044, the evaluation integrating unit 1144 integrates the evaluation values of the respective indexes and calculates an evaluation value E of the object of evaluation.

Figure 21:
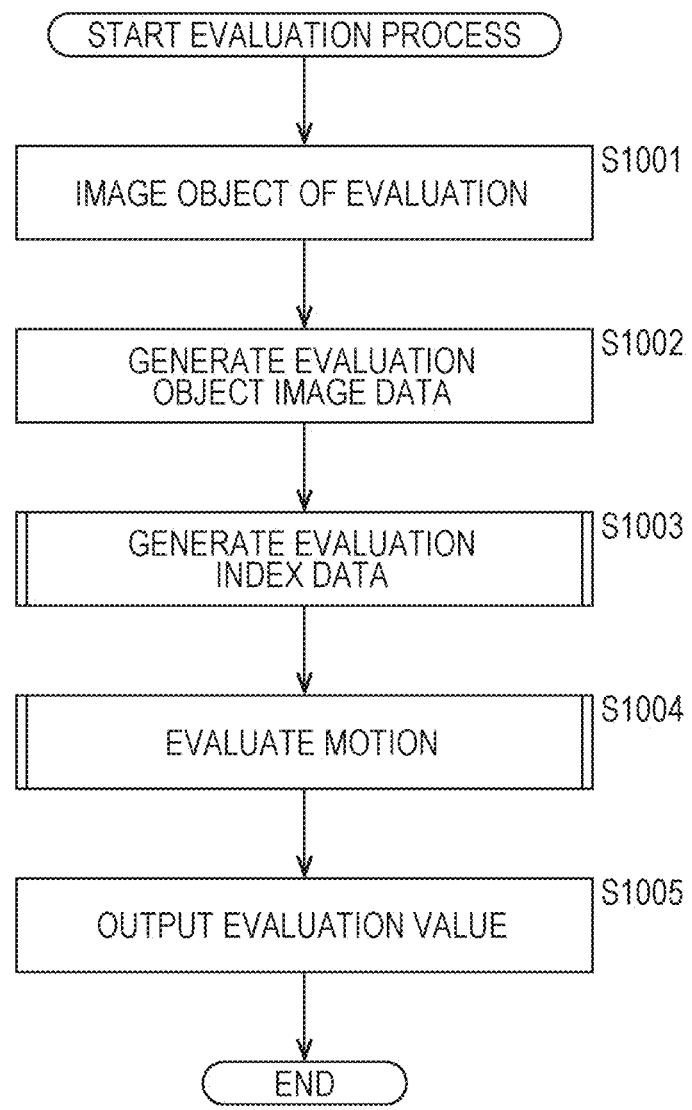
FIG. 21 is a flowchart for explaining an example of the flow of an evaluation process.
Figure 22:
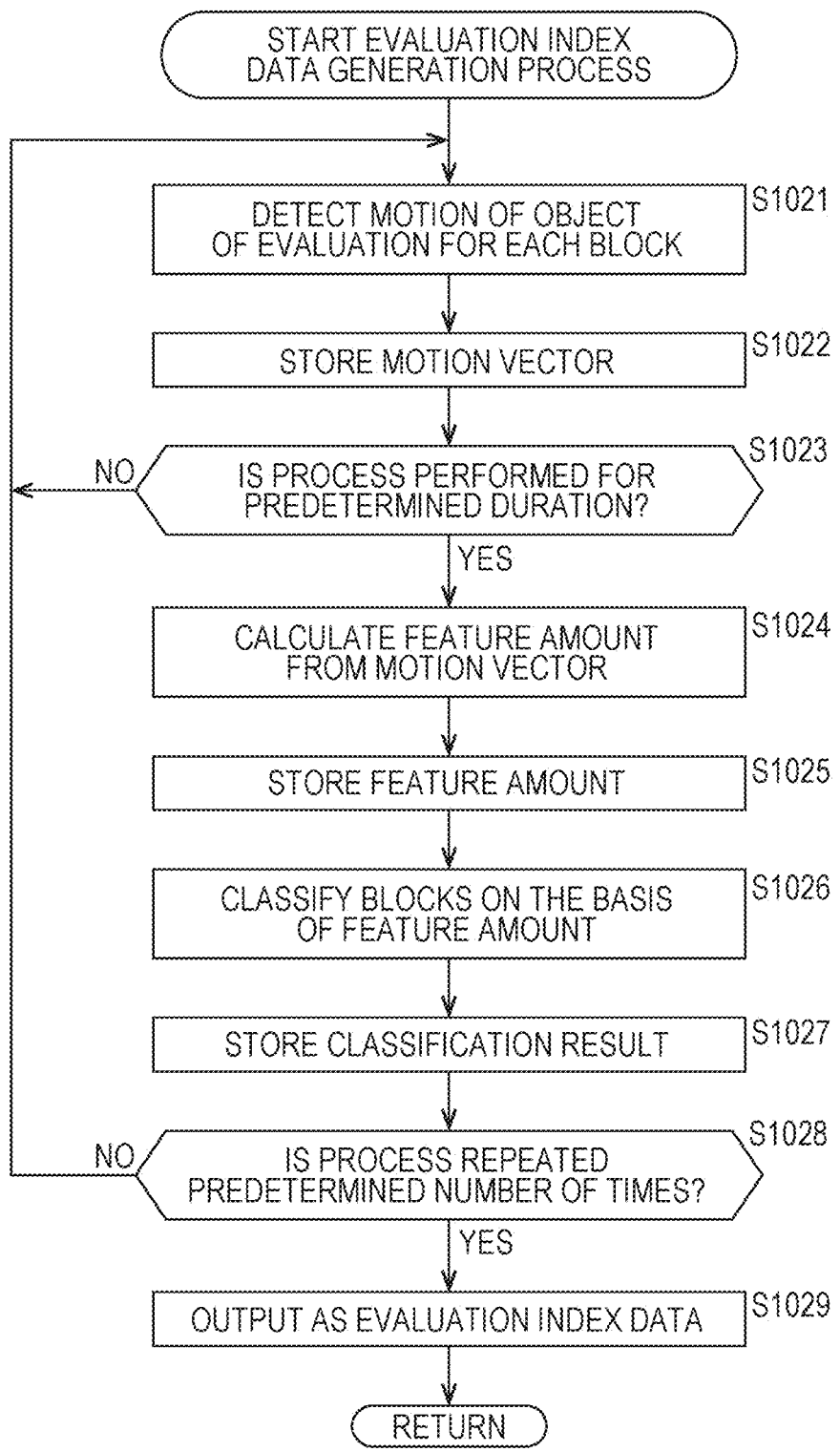
FIG. 22 is a flowchart for explaining an example of the flow of a evaluation index data generation process.

When the evaluation value of the object of evaluation is calculated, the evaluation integrating unit 1144 ends the motion evaluation process, returns the process to Step S1004 of FIG. 21, and performs the process after Step S1005.

In this manner, by performing various processes, the cultured cardiomyocyte evaluation apparatus 1100 may evaluate the object of evaluation (for example, the motions of cells) more quantitatively. In addition, since the motion vector is used to generate the indexes, more various indexes may be obtained easily and in a noninvasive manner. That is, the object of evaluation (for example, the motions of cells) may be more correctly evaluated.

<4. Fourth Embodiment>

[Application to Another Evaluation]

In addition, by evaluating the cooperativity of the motions of the object of evaluation, evaluation of other objects that have an impact on the motions of the object of evaluation (for example, administration of gas, liquids, or solids and the like), arbitrary environmental conditions (for example, temperature, humidity, pressure, brightness, vibration, magnetic field, and the like), and the like may be performed.

Pulsations of various regions obtained by analyzing a phase difference observation moving image of cultured cardiomyocytes show cooperative pulsations depending on the number of days of culture and show variations according to the administration of various drugs. By detecting such variations according to certain methods, it becomes possible to evaluate the toxicity, the effects, and the like of drugs in advance when the drugs are discovered, which has been receiving attention in recent years.

According to the related art, for example, there is a method of detecting the external field potential of cells using an electrode disposed on the bottom of a culture dish and ascertaining the pulsation behavior of the cells according to the membrane potential change in the cells. In addition, there is also a method of inputting a fluorescent pigment that emits light by combining with calcium in cells and detecting the calcium concentration that varies with cell excitability (action potential), thereby detecting the pulsation rhythm of the cells and evaluating the information propagation pattern of the cells.

In such methods, specific culture dishes are needed, the fluorescent pigment is expensive, and inputting the fluorescent pigment is complicated and takes time. Therefore, there are many problems with simple and noninvasive monitoring of cells.

Here, as described above, using the method of detecting and evaluating the motions of cells, evaluation of contraction and relaxation elongation in cell pulsations due to drug administration is performed, and the toxicity and the like of the drugs are evaluated using the evaluation results. The pulsations of cardiomyocytes include contractions and relaxations. For example, when the passage of ions to a calcium channel of cells is impeded, the time of the relaxation is elongated (it becomes difficult to return from a contracted state).

By evaluating the elongation of the relaxation of the cells, an impact on the cardiomyocytes by the administered drug may be evaluated. By performing the evaluation of the motions of cells through image analysis as described above, changes in the pulsation behavior of the cells may be ascertained without adding a reagent such as a certain fluorescent pigment to cells and without using special culture dishes, and thus the toxicity and the like of drugs may be easily and accurately evaluated.

[Drug Evaluation Apparatus]

Figure 24:
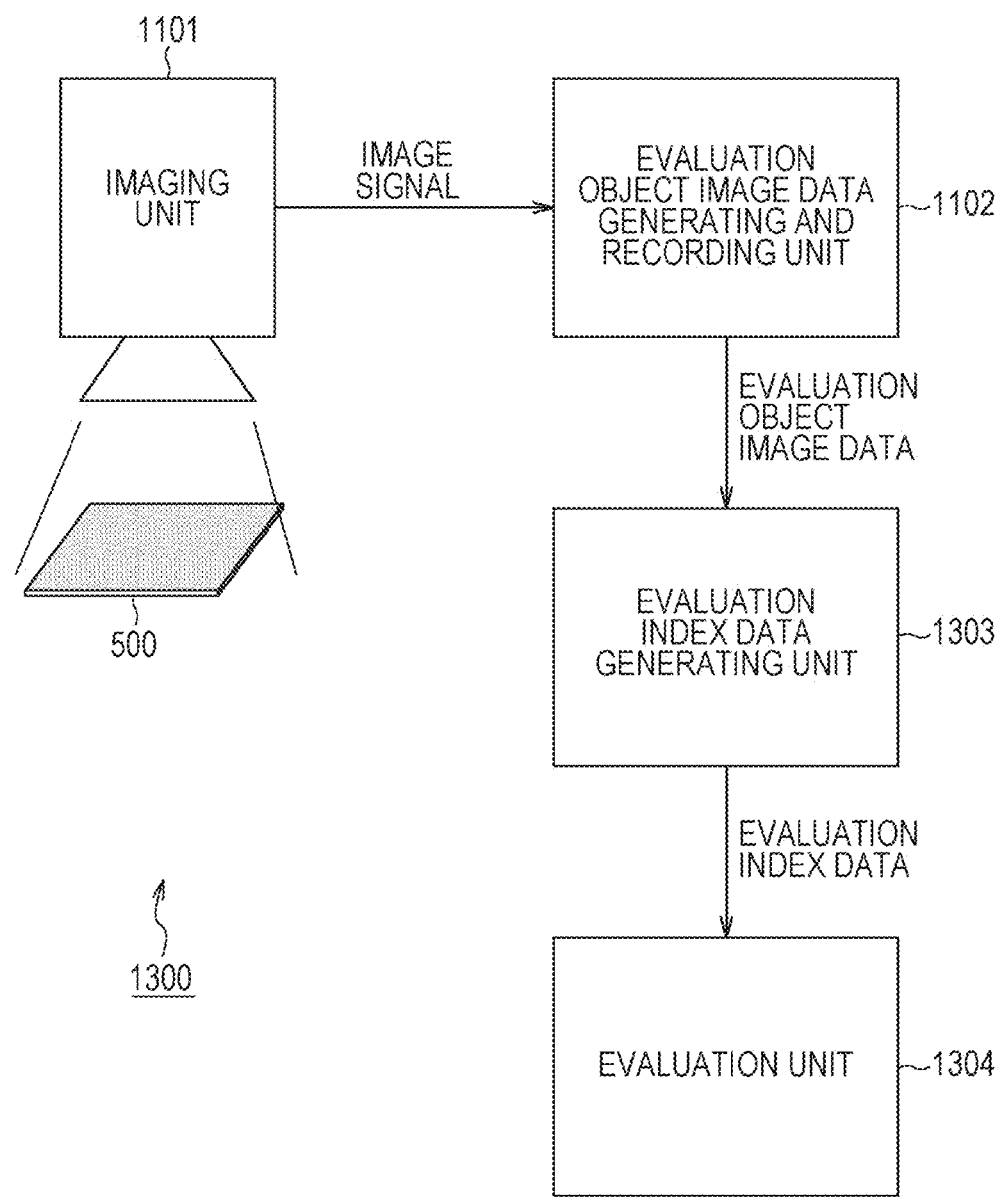
FIG. 24 is a block diagram illustrating a main configuration example of a drug evaluation apparatus.

FIG. 24 is a block diagram illustrating a main configuration example of a drug evaluation apparatus. The drug evaluation apparatus 1300 illustrated in FIG. 24 is an apparatus that evaluates the impact (effects, side effects, and the like) of a drug using the motions of the cultured cardiomyocytes 500 to which the drug is administered.

As illustrated in FIG. 24, the drug evaluation apparatus 1300 has the imaging unit 1101 and the evaluation object image data generating and recording unit 1102 as in the cultured cardiomyocyte evaluation apparatus 1100 of FIG. 13. The imaging unit 1101 images the cultured cardiomyocytes 500 before drug administration and after drug administration.

The evaluation object image data generating and recording unit 1102 generates evaluation object image data on the basis of an image signal supplied from the imaging unit 1101, records and saves the generated evaluation object image data in, for example, a recording medium therein. That is, the evaluation object image data regarding each of moving images of the cultured cardiomyocytes 500 before and after drug administration is generated.

In addition, the drug evaluation apparatus 1300 has an evaluation index data generating unit 1303 instead of the evaluation index data generating unit 1103 of the cultured cardiomyocyte evaluation apparatus 1100 and further has an evaluation unit 1304 instead of the evaluation unit 1104.

The evaluation index data generating unit 1303 acquires the evaluation object image data from the evaluation object image data generating and recording unit 1102. The evaluation index data generating unit 1303 generates the evaluation index data using the acquired evaluation object image data and supplies this to the evaluation unit 1304.

More specifically, the evaluation index data generating unit 1303 performs, for example, between frame images of the evaluation object image data which are the moving images of the cultured cardiomyocytes 500, motion detection (generation of motion vectors) of the cultured cardiomyocytes 500 for each of the blocks which are partial regions into which the entire region of the frame image is divided. That is, the evaluation index data generating unit 1303 performs the motion detection of each of the blocks for a predetermined duration (for a predetermined number of frames). This duration may be a time of the moving images imaged by the imaging unit 1101 or may be shorter than the time.

The evaluation index data generating unit 1303 further obtains a motion amount (the length of the motion vector) of each of the generated motion vectors. That is, the evaluation index data generating unit 1303 generates the motion amounts of each of the frames of each of the blocks for a predetermined duration.

Figure 25:
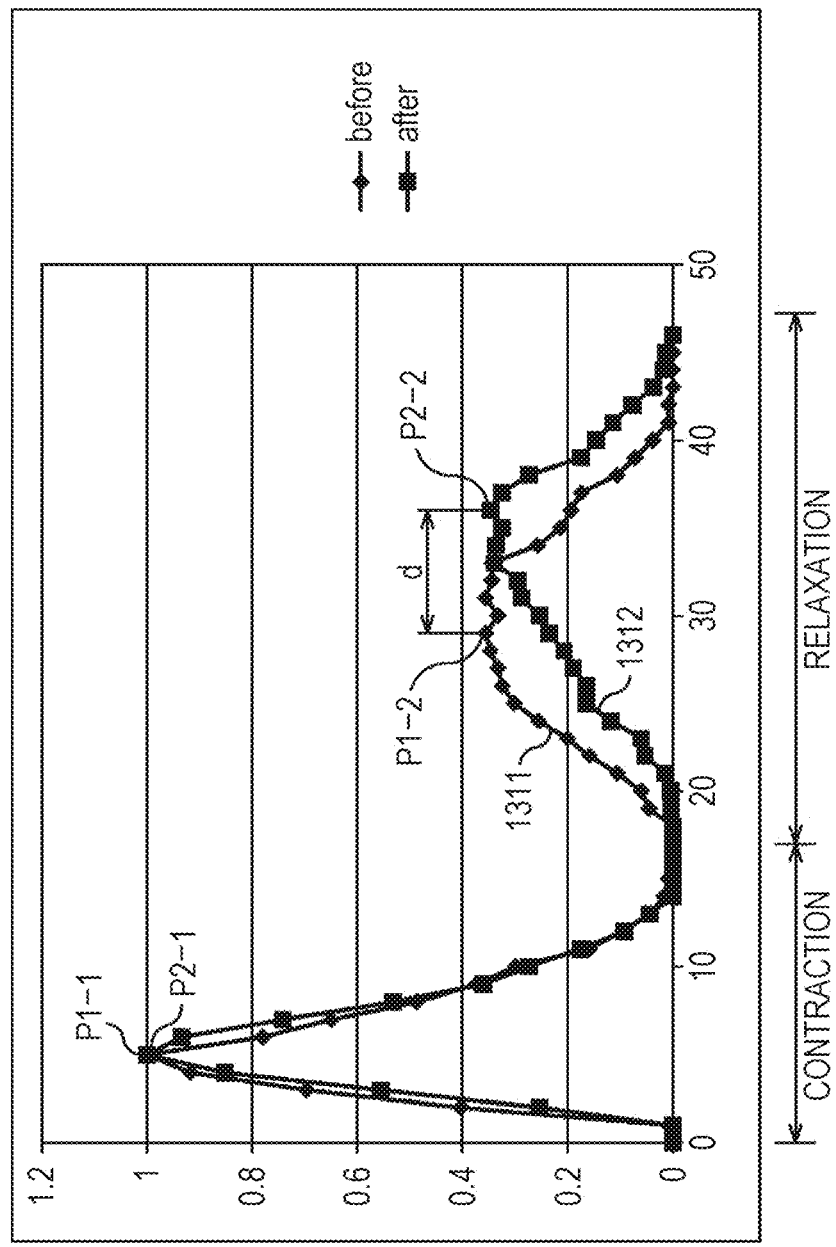
FIG. 25 is a diagram for explaining an example of a form of a change in motion amount due to a pulsation with respect to time.

When the motion amounts of the frames of a certain block obtained by the evaluation index data generating unit 1303 are arranged in time series, for example, the graph shown in FIG. 25 is obtained. FIG. 25 is a diagram showing a form of a change in the motion amount of a certain block with respect to time obtained by the evaluation index data generating unit 1303, that is, an example of a form of the pulsations of cells.

In the graph of FIG. 25, the horizontal axis represents the elapsed time (the number of frames), and the vertical axis represents the motion amount (pixels/frame). A curve 1311 (before) represents the pulsations of the cultured cardiomyocytes 500 before drug administration, and a curve 1312 (after) represents the pulsations of the cultured cardiomyocytes 500 after drug administration. In addition, in the graph of FIG. 25, a waveform of a single pulsation (a contraction and a relaxation) is shown.

The pulsations of cardiomyocytes include contractions and relaxations, and in the curve 1311 and the curve 1312, the crest formed on the left means a "contraction" operation, and the crest formed on the right means a "relaxation" operation. A point P1-1 represents the peak of the contraction of the curve 1311 (before), and a point P1-2 represents the peak of the relaxation of the curve 1311 (before). A point P2-1 represents the peak of the contraction of the curve 1313 (after), and a point P2-2 represents the peak of the relaxation of the curve 1312 (after).

In general, the relaxation of a cardiac muscle corresponds to a T wave referred in an electrocardiogram, and corresponds to repolarization of a cardiac muscle cell membrane. Elongation of the T wave is elongation of a time between a Q wave and the T wave and is generally called QT elongation. In a case where this symptom appears, a possibility of arrhythmia is pointed out. For example, when the passage of ions to a calcium channel is impeded by a drug administered to the cultured cardiomyocytes 500, such QT elongation occurs. For example, it is known that DL-sotalol (dl-sotalol) impedes the calcium channel. That is, when DL-sotalol is administered to the cultured cardiomyocytes 500, due to a change in the calcium channel function that operates during the relaxation process, the relaxation process changes.

As shown in FIG. 25, the peak of the relaxation is shifted before and after drug administration. More specifically, the time of the point P2-2 is delayed (shifted) by a time d from the time of the point P1-2. That is, occurrence of QT elongation due to the drug administration (for example, a change in the calcium channel function due to the administration of DL-sotalol) may be confirmed.

In this manner, by comparing changes in the motion vectors (or the motion amounts thereof) of the pulsations (contractions and relaxations) of the cells with respect to time before and after drug administration, the effect, the toxicity, and the like of drugs may be evaluated.

In addition, observation of the QT elongation is achieved by potential measurement according to the related art. However, a dedicated culture dish having an electrode is needed. In addition, in pulsation imaging using calcium, basically, the peaks only on the left are observed, and it is difficult to observe the peaks on the right. Therefore, this is not suitable for the evaluation of the elongation. Contrary to this, in the case of the method of the present technique described above, a change in the cell pulsation behavior may be ascertained without adding a reagent such as a fluorescent pigment to cells and without using special culture dishes. That is, easy, noninvasive, and low-cost evaluation may be performed.

In order to perform the evaluation of the QT elongation, the evaluation index data generating unit 1303 further calculates feature amounts for waveform comparison such as a motion amount group arranged in time series, the coordinates of the point P2-1 and the point P2-2, and the time d, from the generated motion amount (the length of the motion vector) of each of the motion vectors, and supplies the feature amounts to the evaluation unit 1304 as the evaluation index data.

The evaluation unit 1304 generates an image of the supplied evaluation index data, performs quantitative evaluation thereon, or calculates and outputs an evaluation value for the motions of the cultured cardiomyocytes 500.

More specifically, the evaluation unit 1304 displays a graph image showing a pulsation pattern as shown in, for example, FIG. 25 or performs threshold determination of the time d that represents the degree of QT elongation, thereby determining present or absence of the QT elongation.

In addition, as a matter of course, the graph shown in FIG. 25 is an example of generation of an image, and besides, the cell pulsation pattern may be expressed by arbitrary images such as a bar chart, a distribution chart, and a schematic diagraph. In addition, the evaluated drug is arbitrary.

Hereinafter, details of each unit will be described.

[Evaluation Index Data Generating Unit]

Figure 26:
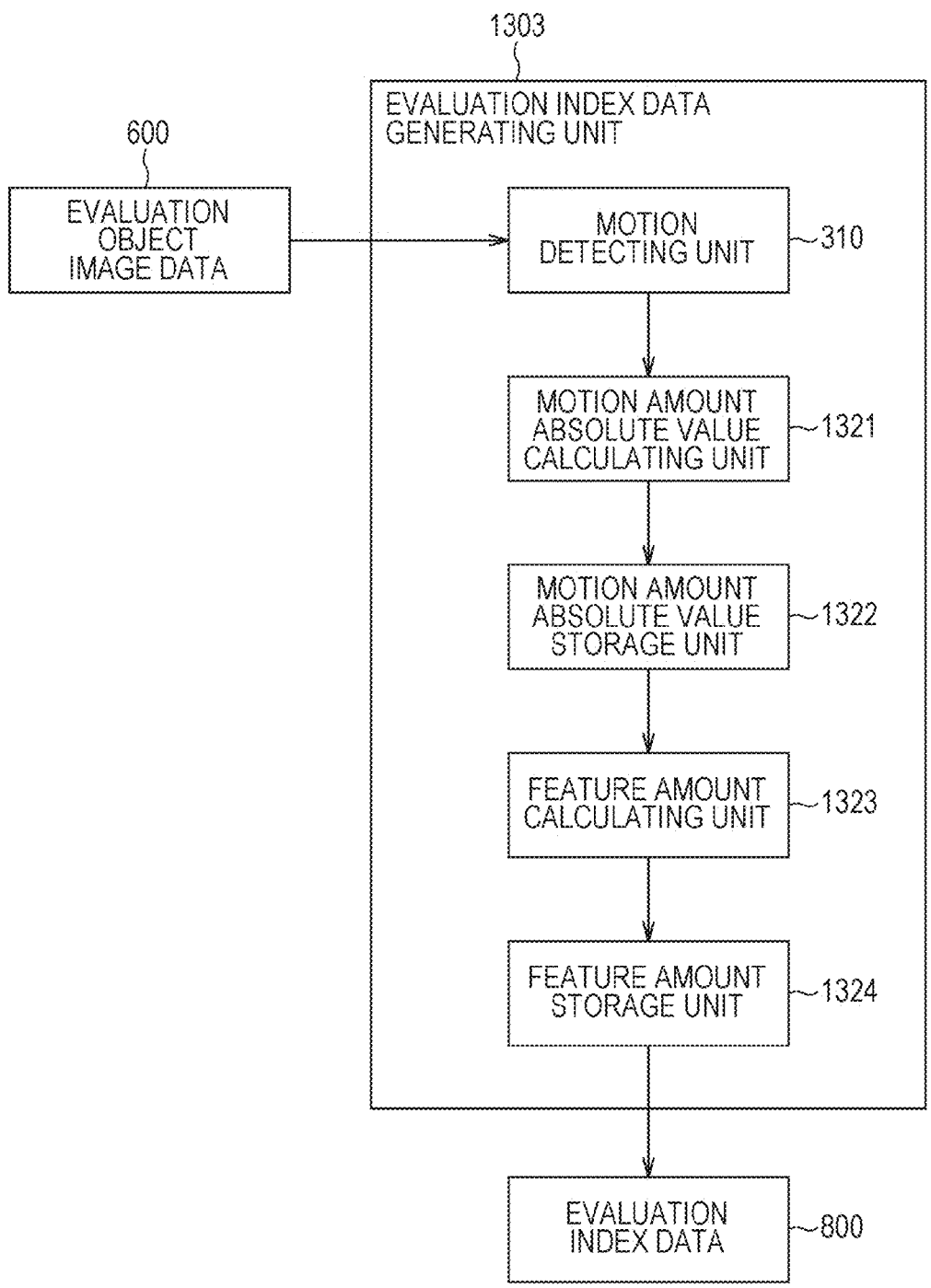
FIG. 26 is a block diagram illustrating a main configuration example of an evaluation index data generating unit.

FIG. 26 is a block diagram illustrating a main configuration example of the evaluation index data generating unit 1303. As illustrated in FIG. 26, the evaluation index data generating unit 1303 has the motion detecting unit 310 and generates a motion vector for each of the blocks by performing motion detection between frame images of the evaluation object image data 600 (moving images).

In addition, the evaluation index data generating unit 1303 has a motion amount absolute value calculating unit 1321, a motion amount absolute value storage unit 1322, a feature amount calculating unit 1323, and a feature amount storage unit 1324.

The motion amount absolute value calculating unit 1321 calculates the motion amount (the absolute value of the length of a motion vector) (hereinafter, also called a motion amount absolute value) for each of the motion vectors detected by the motion detecting unit 310. The motion amount absolute value calculating unit 1321 stores the calculated motion amount absolute values in the motion amount absolute value storage unit 1322.

The motion amount absolute value storage unit 1322 stores the motion amount absolute value of each of blocks between the entire frames of the evaluation object image data 600. For example, in a case where a plurality of evaluation object image data are preset like before and after drug administration, the motion amount absolute value storage unit 1322 stores the motion amount absolute value for each of the evaluation object image data.

The feature amount calculating unit 1323 calculates predetermined feature amounts used for evaluation using the motion amount absolute values stored in the motion amount absolute value storage unit 1322. The feature amount storage unit 1324 stores the feature amounts calculated by the feature amount calculating unit 1323. The feature amounts are supplied to the evaluation unit 1304 as evaluation index data 800 at a predetermined timing or in response to the request of the evaluation unit 1304 and the like.

[Evaluation Unit]

Figure 27:
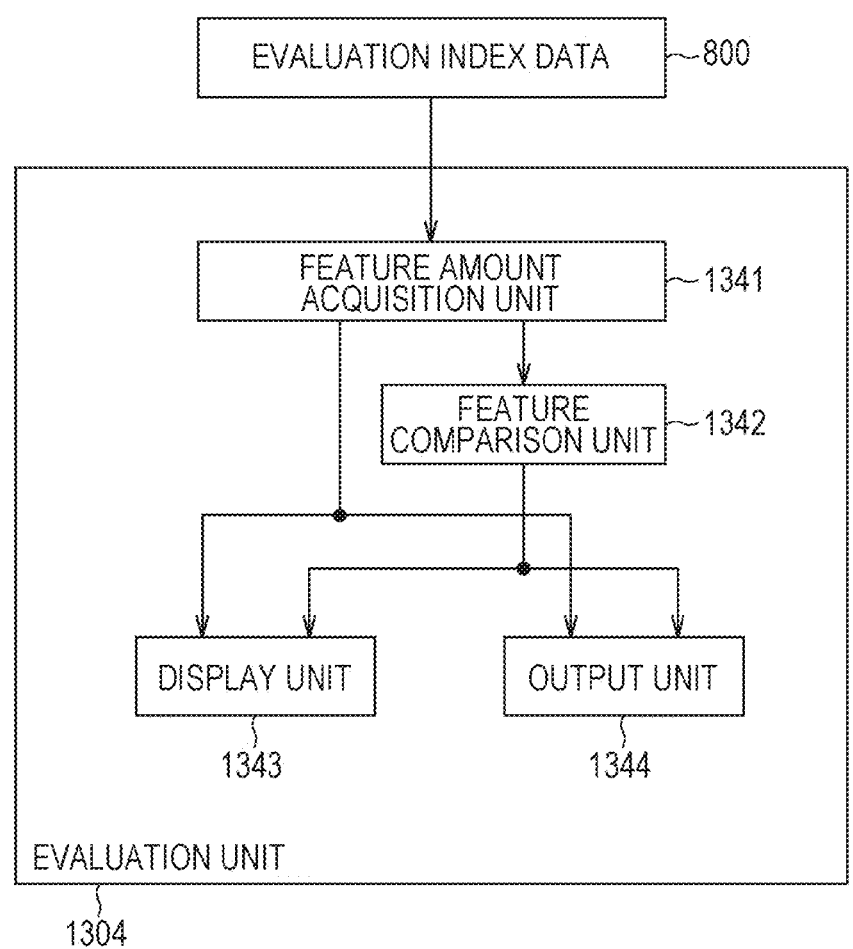
FIG. 27 is a block diagram illustrating a main configuration example of an evaluation unit.

FIG. 27 is a block diagram illustrating a main configuration example of the evaluation unit 1304. As illustrated in FIG. 27, the evaluation unit 1304 has a feature amount acquisition unit 1341, a feature comparison unit 1342, a display unit 1343, and an output unit 1344.

The feature amount acquisition unit 1341 acquires predetermined feature amounts (for example, feature amounts of an object of evaluation (cultured cardiomyocytes 500) designated by a user) from the evaluation index data generating unit 1303 (feature amount storage unit 1324) as the evaluation index data 800. The feature amount acquisition unit 1341 supplies the acquired feature amounts to the display unit 1343 so as to be displayed or supplies the feature amounts to the output unit 1344 so as to be supplied to another device. In addition, the feature amount acquisition unit 1341 supplies the acquired feature amounts to the feature comparison unit 1342.

The feature comparison unit 1342 quantitatively evaluates the supplied feature amounts. For example, the feature comparison unit 1342 compares the feature amounts of a plurality of cultured cardiomyocytes 500 to each other, for example, before and after drug administration or compares the feature amounts to a predetermined threshold, thereby performing quantitative evaluation. The feature comparison unit 1342 supplies the comparison results to the display unit 1343 to be displayed or supplies the comparison results to the output unit 1344 to be supplied to another device.

The display unit 1343 has a display device such as a monitor and generates an image of the data supplied from the feature amount acquisition unit 1341 or the feature comparison unit 1342 so as to display the image on the display device. For example, using the motion amounts acquired by the feature amount acquisition unit 1341, the display unit 1343 generates and displays a graph as shown in, for example, FIG. 25. In addition, for example, the display unit 1343 generates an image of the evaluation results supplied from the feature comparison unit 1342 so as to be displayed.

The output unit 1344 has an interface such as an external terminal and outputs the data supplied from the feature amount acquisition unit 1341 or the feature comparison unit 1342 to an external device, a network, and the like.

As described above, as the evaluation unit 1304 evaluates the pulsation pattern, the drug evaluation apparatus 1300 may evaluate the impact of drug administration on the pulsations of cardiomyocytes easily and in a noninvasive manner.

In addition, it is described above that the evaluation unit evaluates the occurrence of QT elongation. However, parameters to be evaluated may be something other than that. That is, the calculated feature amounts are arbitrary. For example, in the graph of FIG. 25, a difference in the motion amount between the point P1-2 and the point P2-2 may be a feature amount. In addition, a difference in the time or motion amount between the point P1-1 and the point P2-1 may be a feature amount. Furthermore, for example, the width of the crest of contraction or the width of the crest of relaxation may be a feature amount. As a matter of course, parameters other than those may also be feature amounts.

In addition, the evaluation unit 1304 may perform such evaluation on the entire blocks in an objection region or on a part of the blocks. Moreover, the evaluation unit 1304 may perform such evaluation on all pulsations in an observation duration or on a part of the pulsations.

[Flow of Evaluation Process]

Figure 28:
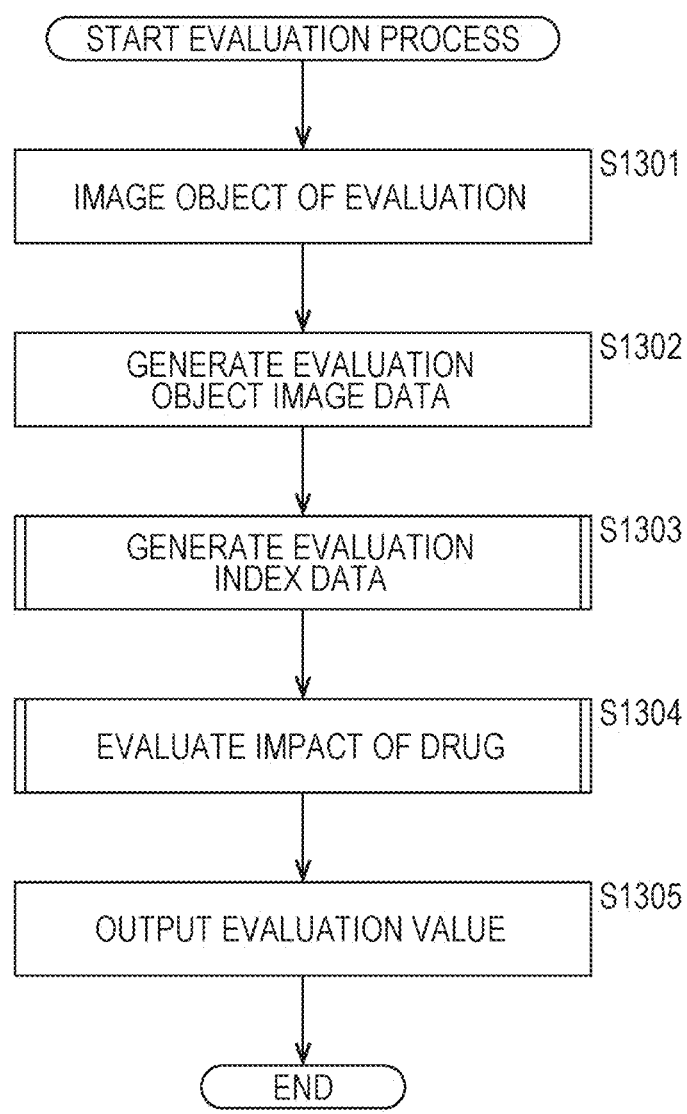
FIG. 28 is a flowchart for explaining an example of the flow of an evaluation process.

Next, an example of the flow of the evaluation process performed by the drug evaluation apparatus 1300 will be described with reference to the flowchart of FIG. 28.

When the evaluation process is started, the imaging unit 1101 of the drug evaluation apparatus 1300 images the object of evaluation in Step S1301. In Step S1302, the evaluation object image data generating and recording unit 1102 generates the evaluation object image data from an image signal obtained through the imaging in Step S1301.

In Step S1303, the evaluation index data generating unit 1303 generates the evaluation index data using the evaluation object image data generated in Step S1302. In Step S1304, the evaluation unit 1304 observes the pulsation pattern (for example, QT elongation) of the cultured cardiomyocytes 500 before and after drug administration using the evaluation index data generated in Step S1303, thereby evaluating the impact of the drug.

In Step S1305, the output unit 1344 of the evaluation unit 1304 outputs the evaluation value calculated in Step S1304 to the outside of the drug evaluation apparatus 1300 and ends the evaluation process. In addition, in Step S1305, instead of the outputting of the output unit 1344, as described above, the display unit 1343 may generate an image of the evaluation value and display the image on the display device. In addition, as described above, the display unit 1343 may generate an image of various feature amounts calculated by the process in Step S1303 so as to be displayed on the display device, or the output unit 1344 may output the various feature amounts to the outside of the drug evaluation apparatus 1300.

[Flow of Evaluation Index Data Generation Process]

Figure 29:
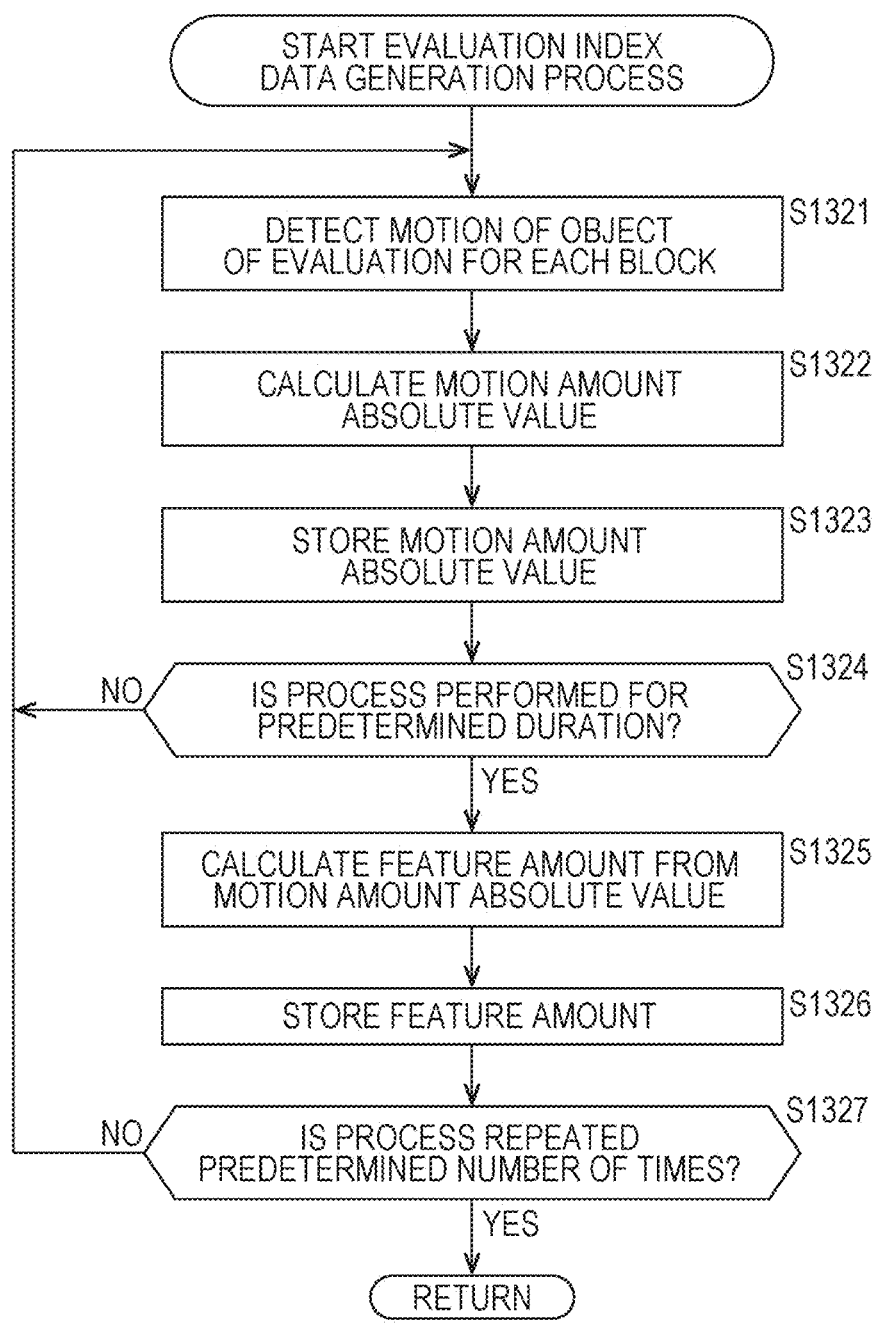
FIG. 29 is a flowchart for explaining an example of the flow of an evaluation index data generation process.

Next, an example of the flow of the evaluation index data generation process performed in Step S1303 of FIG. 28 will be described with reference to the flowchart of FIG. 29.

When the evaluation index data generation process is started, the motion detecting unit 310 of the evaluation index data generating unit 1303 detects the motion of the object of evaluation for each of the blocks in Step S1321 and generates the motion vector. In Step S1322, the motion amount absolute value calculating unit 1321 calculates the motion amount absolute value of the motion vector generated in Step S1321.

In Step S1323, the motion amount absolute value storage unit 1322 stores the motion amount absolute value calculated in Step S1322.

In Step S1324, the motion detecting unit 310 determines whether or not motion detection is performed for a predetermined duration (evaluation section) determined in advance. In a case where it is determined that a frame image that is not subjected to motion detection is present in the predetermined evaluation section, the motion detecting unit 310 returns the process to Step S1321 and repeats motion detection for a frame image as new object of the process.

In addition, in Step S1324, in a case where it is determined that motion detection is performed on all the frame images as the object of the process in the predetermined evaluation section, the motion detecting unit 310 moves the process to Step S1325.

In Step S1325, the feature amount calculating unit 1323 calculates feature amounts using the motion amount absolute values stored in Step S1323. In Step S1326, the feature amount storage unit 1324 stores the feature amounts calculated in Step S1325.

In Step S1327, the feature amount calculating unit 1323 determines whether or not calculation of the feature amounts is repeated a predetermined number of times (for example, S times) determined in advance, and in a case where it is determined that the predetermined number of times has not been reached, returns the process to Step S1321 and repeats the subsequent process. In addition, in Step S1327, in a case where it is determined that calculation of feature amounts is repeated the predetermined number of times, the feature amount calculating unit 1323 ends the evaluation index data generation process, returns the process to FIG. 28, and performs the process after Step S1304.

[Flow of Impact Evaluation Process]

Figure 30:
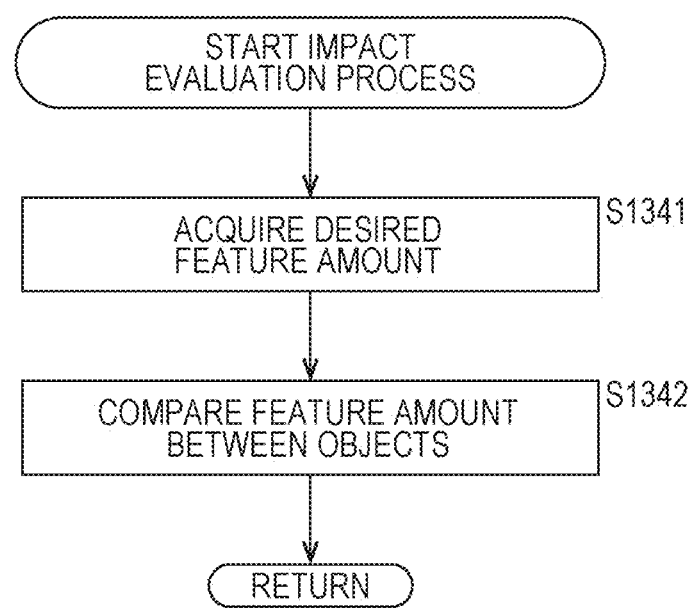
FIG. 30 is a flowchart for explaining an example of the flow of an impact evaluation process.

Next, an example of the flow of the impact evaluation process performed in Step S1304 of FIG. 28 will be described with reference to the flowchart of FIG. 30.

When the impact evaluation process is started, the feature amount acquisition unit 1341 of the evaluation unit 1304 acquires desired motion vectors from the feature amount storage unit 1324 in Step S1341.

In Step S1342, the feature comparison unit 1342 compares the acquired feature amounts between objects in Step S1341. When the process of Step S1342 is ended, the feature comparison unit 1342 ends the impact evaluation process, returns the process to FIG. 28, and performs the process of Step S1305.

As described above, by obtaining the feature amounts regarding changes in the motion amounts of the objects of observation subjected to the motion detection with respect to time by the evaluation unit 1304, the drug evaluation apparatus 1300 may easily evaluate the impact of the drug administration on the pulsations of cardiomyocytes. Since this method does not use special culture dishes or fluorescent reagents, simple, noninvasive, and low-cost evaluation is possible, and the method is appropriate for automation. In addition, in the case of this method, an observation region may be a relatively narrow range of about, for example, 0.6 square millimeters, and tests are possible with a small number of cells and a small amount of reagent. In addition, evaluation may be sufficiently achieved with a high-density culture plate (1536-hole plate (1.7 mm-diameter/1-well) or a 384-hole plate (3.6 mm-diameter/1-well) which is generally commercialized, and the method is appropriate for initial screening when drugs are discovered. Moreover, the present technique may also be applied to a case of evaluating anything that is able to be evaluated by observing the cultured cardiomyocytes 500.

[Example of Pulsation Change Due to Drug Administration]

Figure 31:
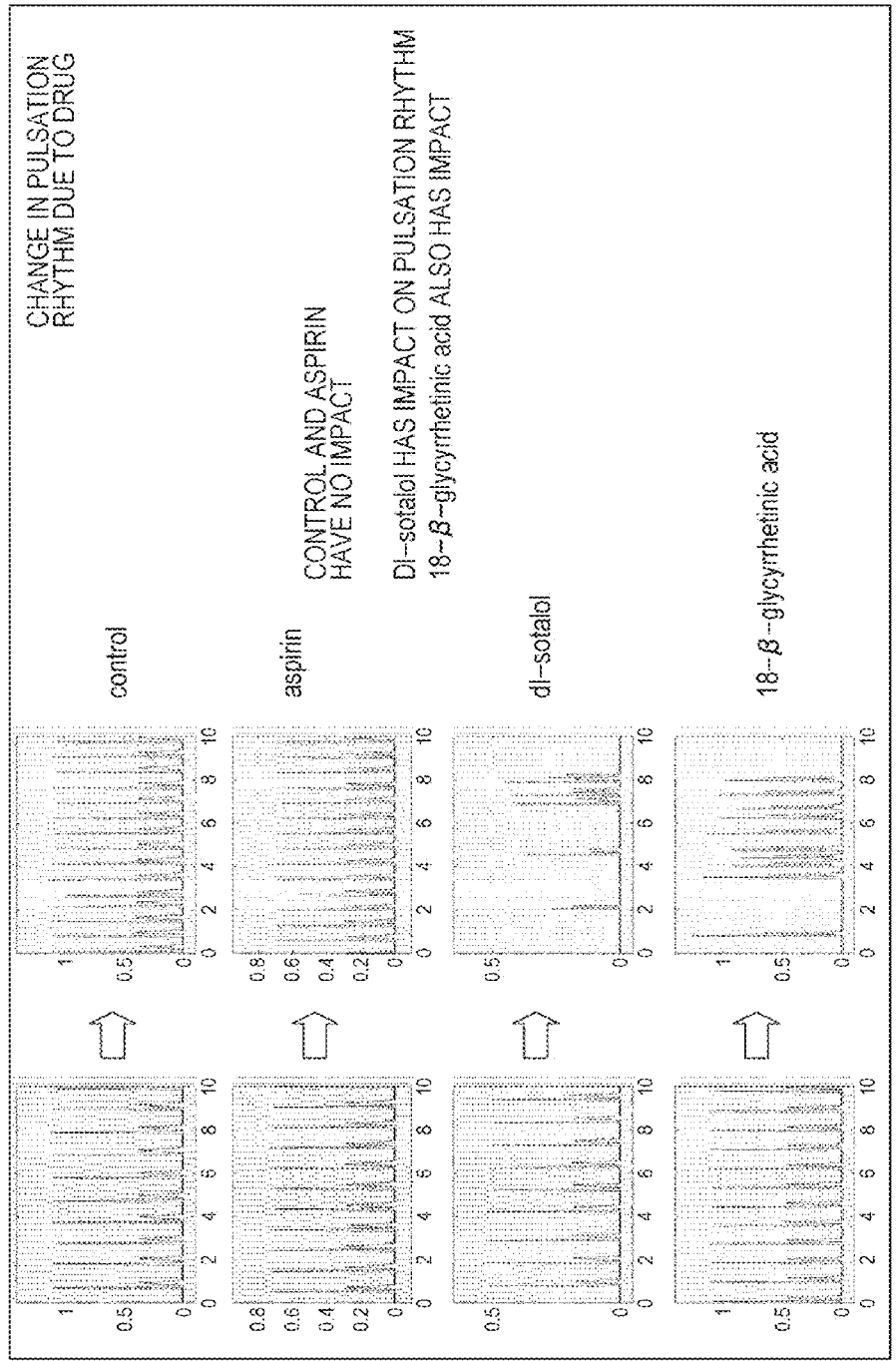
FIG. 31 is a diagram showing an example of forms of changes in pulsation rhythm due to drug administration.

FIG. 31 is a diagram showing an example of forms of pulsations before and after drug administration. All the 8 graphs shown in FIG. 31 are observation results of forms (changes in the motion amount absolute value with respect to time) of pulsations of a predetermined part in an observation region of the cultured cardiomyocytes 500. The horizontal axis represents the time (sec), and the vertical axis represents the motion amount absolute value (pixcel/frame) between frames. That is, the amplitudes shown in each of the graphs represents the pulsations of the cultured cardiomyocytes 500.

The graphs on the left of FIG. 31 represent forms of the pulsations before drug administration, and the graphs on the right represent forms of the pulsations after drug administration (after a predetermined time elapses after the administration).

In the case of the example of FIG. 31, the uppermost graphs show the form of the pulsations before and after the administration of an organic solvent (control) (for example, dimethyl sulfoxide). In addition, the second graphs from the top show the form of the pulsations before and after the administration of aspirin (acetylsalicylic acid). Moreover, the third graphs from the top show the form of the pulsations before and after the administration of DL-sotalol (dl-sotalol). In addition, the lowermost 3D plots show the form of the pulsations before and after the administration of 18-β-glycyrrhetinic acid (18-β-Glycyrrhetinic acid).

As shown in the graphs of FIG. 31, the organic solvent or the aspirin does not have a significant impact on the interval of the pulsations of the cardiomyocytes. That is, as shown in the graphs on the left of FIG. 31, before the drug administration, pulsations are repeated at a substantially constant interval (the peak interval is substantially constant), and even when the organic solvent or the aspirin is administered to the cardiomyocytes, as shown in the first and second graphs from the top on the right of FIG. 31, pulsations are repeated at substantially the same interval as that of the drug administration and at a constant interval. That is, in this case, the rhythm of the pulsations is not substantially changed (the peak interval is not changed).

Contrary to this, when DL-sotalol is administered, the function of the calcium channel is degraded, and not only the waveform of the relaxation (the width of the pulsation) changes (becomes unstable), but also the timing of the pulsation becomes unstable (the peak interval has variations) as shown in the third graph from the top on the right of FIG. 31. In addition, the motion amount absolute value at the peaks also becomes unstable (has variations).

In addition, it is known that 18-β-glycyrrhetinic acid impedes a gap junction. Even in a case where the 18-β-glycyrrhetinic acid is administered, as shown in the fourth graph from the top on the right of FIG. 31, the timing of the pulsation and the motion amount absolute value at the peaks become unstable (have variations).

Figure 32:
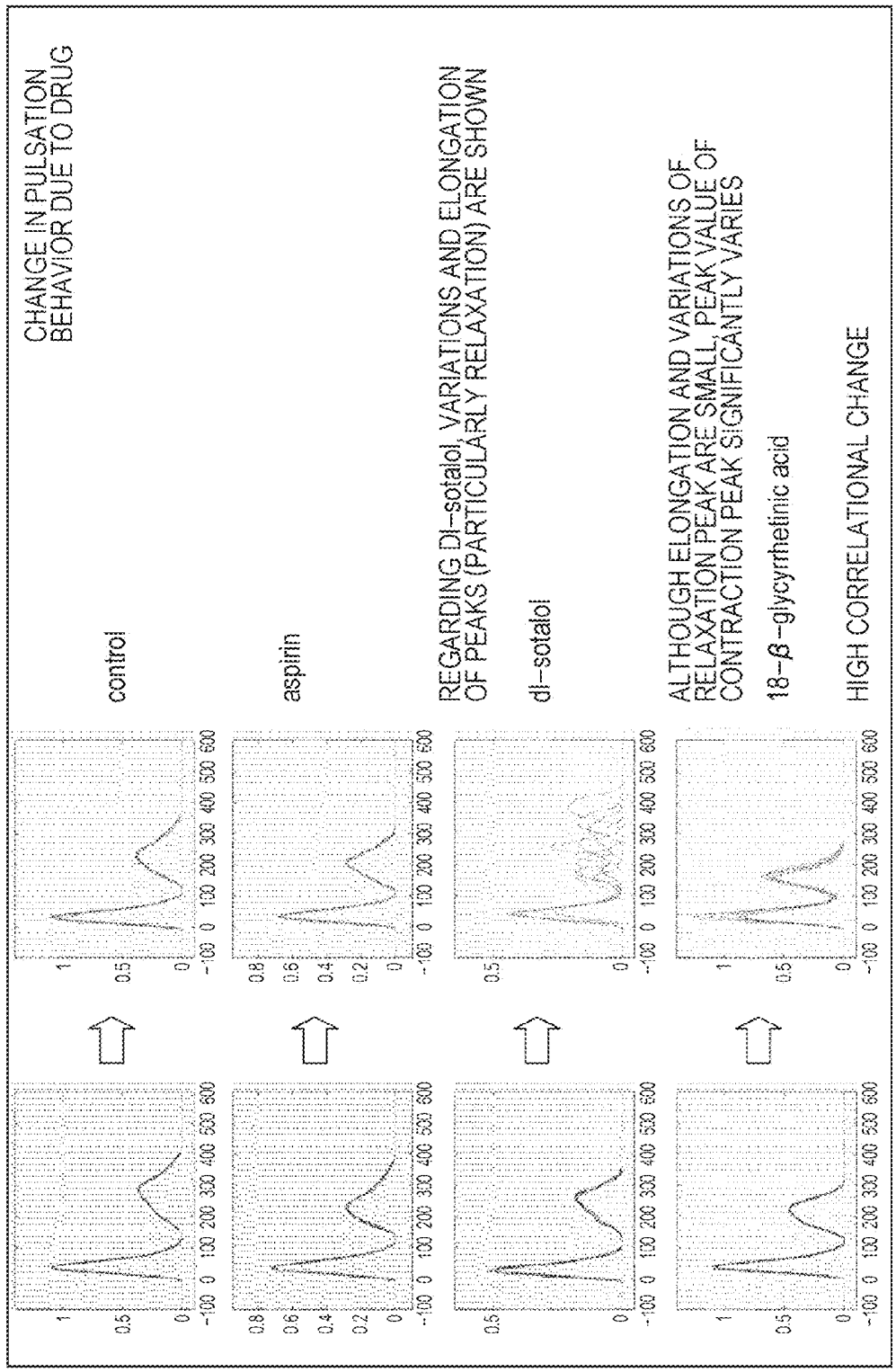
FIG. 32 is a diagram for explaining forms of variations of pulsation behaviors due to drug administration.

In addition, FIG. 32 is a diagram showing an example of forms of variations of the pulsations before and after drug administration. In all the 8 graphs shown in FIG. 32, waveforms (a plurality of pulsations) of pulsations repeated in a predetermined part in an observation region of the cultured cardiomyocytes 500 overlap.

As in the case of FIG. 31, the horizontal axis in each of the graphs represents the time (sec), and the vertical axis represents the motion amount absolute value (pixcel/frame) between frames. In addition, the graphs on the left represent the pulsations before the drug administration, and the graphs on the right represent the pulsations after the drug administration (after a predetermined time elapses after the administration).

In addition, as in the case of FIG. 31, the administered drugs are, in order from the top, an organic solvent (control), aspirin (acetylsalicylic acid), DL-sotalol, and 18-β-glycyrrhetinic acid (18-β-Glycyrrhetinic acid).

As shown in the graphs of FIG. 32, even though the organic solvent or the aspirin is administered, the pulsations of the cardiomyocytes do not have significant variations like before the administration.

Contrary to this, when DL-sotalol is administered, the function of the calcium channel is degraded, and as shown in the third graph from the top on the right of FIG. 31, the waveform (the magnitude of the peak, the time of appearance of the peak, the number of times of appearance of the peak, the width (QT elongation), and the like) of the relaxation mainly has significant variations. In addition, the height of the peaks in the waveform of the contraction also has significant variations.

In addition, 18-β-glycyrrhetinic acid impedes the function of a gap junction, and as shown in the fourth graph from the top on the right of FIG. 31, the height of the peak in the waveform of the contraction has significant variations.

Using the drug evaluation apparatus 1300, the impact of the drug administration on the pulsations may be perceived easily and in a noninvasive manner.

As described above, by observing the changes in the forms of the pulsations due to the drug administration for specific cells (a specific partial region) in the observation region of the cultured cardiomyocytes 500, information that is obtained only by observing the correlation in the pulsations between the cells may be obtained. Therefore, drug evaluation may be performed with different indexes from those of a case of observing the correlation in the pulsations between cells.

<5. Fifth Embodiment>
[Personal Computer]

A series of the processes described above may be performed in hardware or performed in software. In this case, for example, a personal computer as illustrated in FIG. 33 may be configured.

Figure 33:
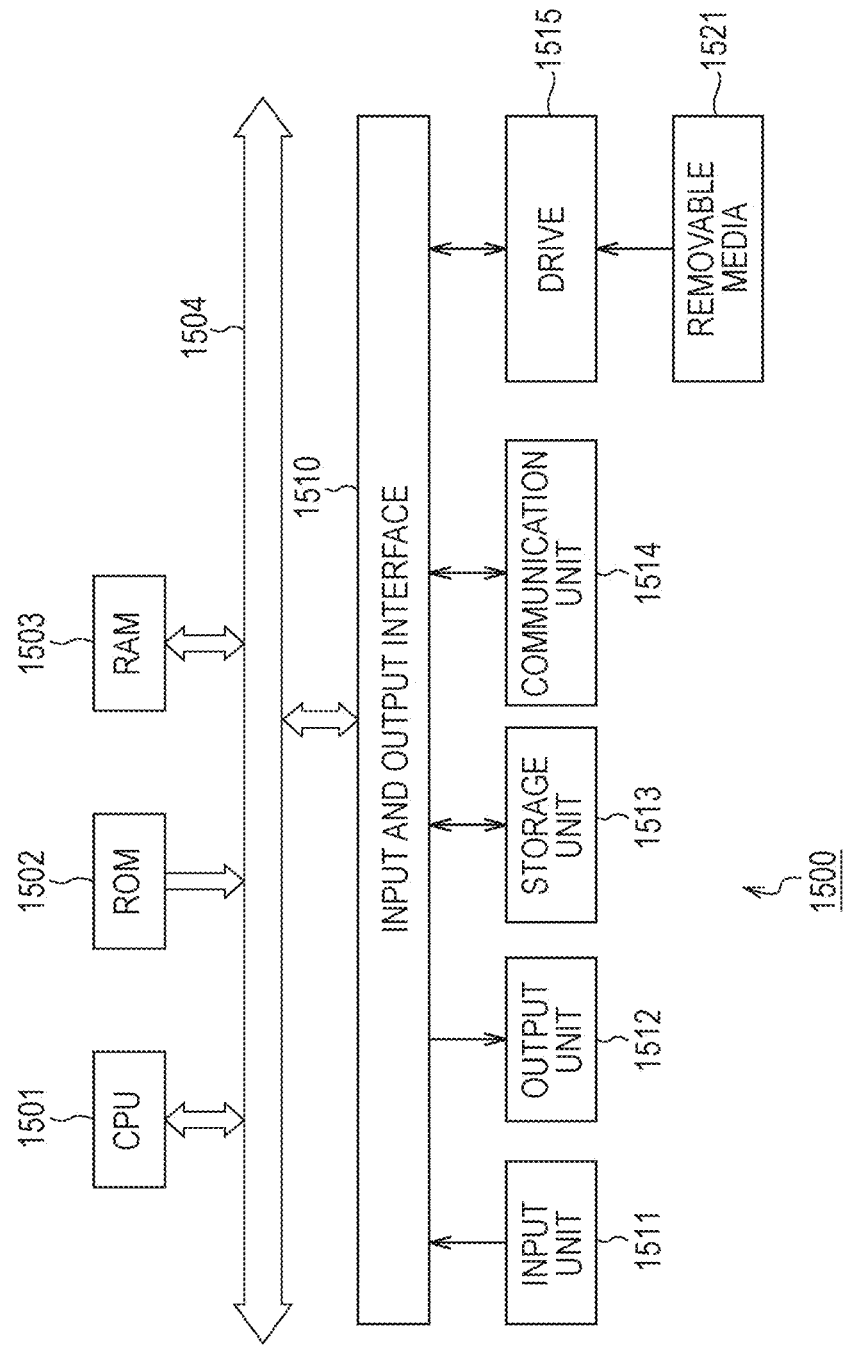
FIG. 33 is a block diagram illustrating a main configuration example of a personal computer.

In FIG. 33, a CPU (Central Processing Unit) 1501 of the personal computer 1500 performs various processes according to programs stored in a ROM (Read Only Memory) 1502 or programs loaded on a RAM (Random Access Memory) 1503 from a storage unit 1513. The RAM 1503 appropriately stores data and the like needed for the CPU 1501 to perform the various processes.

The CPU 1501, the ROM 1502, and the RAM 1503 are connected to each other via a bus 1504. An input and output interface 1510 is also connected to the bus 1504.

To the input and output interface 1510, an input unit 1511 made of a keyboard, a mouse, or the like, an output unit 1512 made of a display such as a CRT (Cathode Ray Tube) or an LCD (Liquid Crystal Display), a speaker, or the like, the storage unit 1513 configured of a hard disk or the like, and a communication unit 1514 configured of a modem or the like are connected. The communication unit 1514 performs a communication process over a network including the Internet.

A drive 1515 is also connected to the input and output interface 1510 as necessary, a removable medium 1521 such as a magnetic disk, an optical disc, a magneto-optical disc, or a semiconductor memory is appropriately mounted, and computer programs read therefrom are installed on the storage unit 1513 as necessary.

In the case where the series of processes described above is performed in software, programs that constitute the software are installed from the network or a recording medium.

The recording medium is, for example, as illustrated in FIG. 33, separately from the apparatus main body, configured not only as the removable medium 1521 which is distributed to deliver programs to a user and is made of a magnetic disk (including a flexible disk) having programs recorded, an optical disc (including a CD-ROM (Compact Disc-Read Only Memory) and a DVD (Digital Versatile Disc)), a magneto-optical disc (including an MD (Mini Disc)), a semiconductor memory, or the like, but also the ROM 1502 which records programs that are delivered to a user in a state of being assembled to the apparatus main body, the hard disk included in the storage unit 1513, and the like.

In addition, the programs performed by the computer may be programs that are processed in time series according to the order described in the specification, or may be programs that are processed in parallel or at a necessary timing such as when a call is made.

In addition, in the specification, the steps that describe the programs recorded on a recording medium include not only processes performed in time series according to the described order, but also processes that are not necessarily performed in time series but are performed in parallel or individually.

In addition, in the specification, the system represents the entire apparatus constituted by a plurality of devices (devices).

In addition, in the above description, the configuration described as a single device (or a processing unit) may be divided to be configured as a plurality of devices (or processing units). Contrary to this, the configuration described as a plurality of devices (or processing units) in the above description may be summed to be configured as a single device (or processing unit). In addition, configurations other than those described above may also be added to the configuration of each of the devices (or each of the processing units). Moreover, when the configuration or the operation of the entire system is substantially the same, a part of the configuration of a certain device (or processing unit) may be included in the configuration of another device (or another processing unit). That is, the present technique is not limited to the above-described embodiments, and various modifications can be made in a range without departing from the gist of the present technique.

In addition, the present technique may employ the following configurations.

(1) A data processing apparatus including: a motion detecting unit which divides a plurality of frame image data that form moving image data having an image content of an object that performs a periodic motion into blocks according to an arrangement of a predetermined pixel count and detects time-series data of motions for each of the corresponding blocks;

a feature amount calculating unit which calculates at least one kind of feature amount for each of the blocks on the basis of the time-series data of the motions for each of the detected blocks;

and a classification processing unit which generates classification data that represents a result of classifying each of the blocks that form any one of the plurality of frame image data into any one of a predetermined number of classification categories on the basis of the calculated feature amount.

(2) The data processing apparatus described in (1), wherein the feature amount calculating unit calculates a plurality of kinds of the feature amounts for each of the blocks, and the classification unit generates the classification data on the basis of the plurality of kinds of the feature amounts calculated.

(3) The data processing apparatus described in (1) or (2), wherein the feature amount calculating unit calculates an average motion direction which is an average value of motion directions per unit time within a predetermined time as one kind of the feature amounts.

(4) The data processing apparatus described in any one of (1) to (3), wherein the feature amount calculating unit calculates an average motion amount which is an average value of motion amounts per unit time within a predetermined time as one kind of the feature amounts.

(5) The data processing apparatus described in any one of (1) to (4), wherein the feature amount calculating unit calculates an average amplitude which is an average value of amplitudes with a predetermined or higher motion amount obtained within a predetermined time as one kind of the feature amounts.

(6) The data processing apparatus described in any one of (1) to (5), wherein the feature amount calculating unit calculates an average acceleration which is an average value of accelerations of motions per unit time within a predetermined time as one kind of the feature amounts.

(7) The data processing apparatus described in any one of (1) to (6),
wherein the feature amount calculating unit calculates an average motion interval which is an average value of time intervals at which an amplitude with a predetermined or higher motion amount is obtained within a predetermined time as one kind of the feature amounts.

(8) The data processing apparatus described in any one of (1) to (7),
wherein the feature amount calculating unit calculates a motion starting time which is a time from a predetermined timing to a timing at which an amplitude with a predetermined or higher motion amount is obtained as one kind of the feature amounts.

(9) The data processing apparatus described in any one of (1) to (8),
wherein the classification unit performs a process of calculating a distance between each of the plurality of templates having a combination of other feature amounts and the block in correspondence to a plurality of the classification categories, and classifying the block into any one of the plurality of the classification categories on the basis of the calculated distance, on each of the blocks.

(10) The data processing apparatus described in any one of (1) to (9),
wherein the classification unit classifies each of the blocks into any one of a predetermined number of classification categories by performing clustering according to a k-means method on the basis of the feature amounts calculated corresponding to each of the blocks.

(11) A data processing method including:
a motion detecting step of dividing plurality of frame image data that form moving image data having an image content of an object that performs a periodic motion into blocks according to an arrangement of a predetermined pixel count and detecting time-series data of motions for each of the corresponding blocks;
a feature amount calculating step of calculating at least one kind of feature amount for each of the blocks on the basis of the time-series data of the motions for each of the detected blocks; and
a classification processing step of generating classification data that represents a result of classifying each of the blocks that form any one of the plurality of frame image data into any one of a predetermined number of classification categories on the basis of the calculated feature amount.

(12) An image processing apparatus including:
a motion detecting unit which detects a motion of an object of evaluation using an image of the object of evaluation;
an index data generating unit which, by using a motion vector that represents the motion of the object of evaluation detected by the motion detecting unit, generates index data that represents a feature of the motion of the object of evaluation and is used as an index for evaluating the object of evaluation; and
an evaluation value calculating unit which evaluates the index data generated by the index data generating unit and calculates an evaluation value.

(13) The image processing apparatus described in (12),
wherein the index data generating unit generates index data regarding a magnitude of an amplitude of the motion of the object of evaluation, and index data regarding a frequency per unit time of a peak of the motion of the object of evaluation, and the evaluation value calculating unit calculates an evaluation value that evaluates the magnitude of the amplitude of the motion of the object of evaluation using the index data regarding the magnitude of the amplitude of the motion of the object of evaluation generated by the index data generating unit, and further calculates an evaluation value that evaluates the frequency per unit time of the peak of the motion of the object of evaluation using the index data regarding the frequency per unit time of the peak of the motion of the object of evaluation generated by the index data generating unit.

(14) The image processing apparatus described in (13),
wherein the index data regarding the magnitude of the amplitude of the motion of the object of evaluation is an average value of products of a normalized amplitude and a normalized dispersion of the amplitudes over an entire image of the object of evaluation.

(15) The image processing apparatus described in (13) or (14),
wherein the index data regarding the magnitude of the amplitude of the motion of the object of evaluation is a proportion of a region in which a value of a product of a normalized amplitude and a normalized dispersion of the amplitudes is higher than or equal to a predetermined threshold with respect to an entire image of the object of evaluation.

(16) The image processing apparatus described in any one of (13) to (15),
wherein the index data regarding the frequency per unit time of the peak of the motion of the object of evaluation is an average value of products of a normalized number of the peaks per unit time and a normalized dispersion of the numbers of the peaks per unit time over an entire screen.

(17) The image processing apparatus described in any one of (13) to (16),
wherein the index data regarding the frequency per unit time of the peak of the motion of the object of evaluation is a proportion of a region in which a value of a product of a normalized number of the peaks per unit time and a normalized dispersion of the numbers of the peaks per unit time is higher than or equal to a predetermined threshold with respect to an entire image of the object of evaluation.

(18) The image processing apparatus described in any one of (13) to (17),
wherein the index data generating unit further generates index data regarding a classification result of classifying each of partial regions of the image of the object of evaluation on the basis of the feature amount of the motion of the object of evaluation, and
the evaluation value calculating unit further calculates an evaluation value that evaluates the classification result of the feature amount of the motion of the object of evaluation using the index data regarding the classification result generated by the index data generating unit.

(19) The image processing apparatus described in any one of (12) to (18),
wherein the index data generating unit calculates a motion amount of the object of evaluation detected by the motion detecting unit, and
the evaluation value calculating unit generates an image of a change in the motion amount calculated by the index data generating unit with respect to time so as to be displayed.

(20) The image processing apparatus described in (19),
wherein the index data generating unit generates index data that represents a change due to administration of a drug to a cardiomyocyte in a peak of a waveform representing a relaxation of the cardiomyocyte which is the object of evaluation, in the change in the calculated motion amount with respect to time, and the evaluation value calculating unit evaluates the index data calculated by the index data generating unit and calculates an evaluation value.

(21) The image processing apparatus described in any one of (12) to (20), which further includes an imaging unit which images the object of evaluation and obtains an image of the object of evaluation, wherein the motion detecting unit detects the motion of the object of evaluation using the image of the object of evaluation obtained by the imaging unit.

(22) The image processing apparatus described in any one of (12) to (21), wherein the motion detecting unit detects the motion of the object of evaluation between frame images in an evaluation duration with a predetermined length in the image of the object of evaluation which is a moving image.

(23) The image processing apparatus described in (22), wherein the motion detecting unit repeats detection of the motion of the object of evaluation in the evaluation duration a predetermined number of times.

(24) The image processing apparatus described in any one of (12) to (23), wherein the evaluation value calculating unit evaluates each of a plurality of kinds of the index data generated by the index data generating unit to calculate the evaluation value, and integrates the calculated evaluation values, thereby calculating an evaluation value that evaluates the object of evaluation.

(25) The image processing apparatus described in any one of (12) to (24), wherein the object of evaluation is a cell that moves spontaneously.

(26) The image processing apparatus described in any one of (12) to (25), wherein the object of evaluation is a cultured cell generated by culturing a cell collected from a living body.

(27) An image processing method including:

detecting a motion of an object of evaluation using an image of the object of evaluation by a motion detecting unit of an image processing apparatus;

by using a motion vector that represents the detected motion of the object of evaluation, generating index data that represents a feature of the motion of the object of evaluation and is used as an index for evaluating the object of evaluation by an index data generating unit of the image processing apparatus; and evaluating the generated index data and calculating an evaluation value by an evaluation value calculating unit of the image processing apparatus.

(28) A program which causes a computer to function as:

a motion detecting unit which detects a motion of an object of evaluation using an image of the object of evaluation; an index data generating unit which, by using a motion vector that represents the detected motion of the object of evaluation, generates index data that represents a feature of the motion of the object of evaluation and is used as an index for evaluating the object of evaluation; and an evaluation value calculating unit which evaluates the generated index data and calculates an evaluation value.

REFERENCE SIGNS LIST 100 cultured cardiomyocyte evaluation system
110 imaging device
200 evaluation object image data generating and recording device
300 evaluation index data generating device
310 motion detecting unit
311 frame memory
312 motion vector calculating unit
320 motion detection data storage unit
330 feature amount calculating unit
340 classification processing unit
400 evaluation device
500 cultured cardiomyocyte
600 evaluation object image data
610 frame image data
611 block
700 motion detection data
710 frame unit motion detection data
800 evaluation index data
801 individual classification result data
1100 cultured cardiomyocyte evaluation apparatus
1101 imaging unit
1102 evaluation object image data generating and recording unit
1103 evaluation index data generating unit
1104 evaluation unit
1123 feature amount calculating unit
1124 classification processing unit
1125 motion feature amount data history storage memory
1141 amplitude evaluation unit
1142 number of pulsations evaluation unit
1143 classification result evaluation unit
1144 evaluation integrating unit
1300 drug evaluation apparatus
1303 evaluation index data generating unit
1304 evaluation unit
1341 feature amount acquisition unit
1342 feature comparison unit
1343 display unit
1344 output unit

The invention claimed is:

1. A data processing apparatus comprising:
a processor configured to:
receive an image of biological cells having a plurality of blocks, wherein a block of the plurality of blocks includes a group of pixels in the image;
determine an average motion amount of at least one biological cell in a first block of the plurality of blocks;
determine an average motion direction of at least on biological cell in the first block;
assign a category to the first block based on the determined average motion amount and the determined average motion direction, wherein the category is one of a plurality of categories individually associated with different combinations of numerical ranges for average motion amounts and average motion directions;
determine a distribution of the plurality of blocks among the plurality of categories, wherein the distribution provides an indication of a quality level of the biological cells and the quality level is based on a number of blocks of the plurality of blocks assigned to individual categories of the plurality of categories; and
control display of an image representing which category of the plurality of categories is assigned to individual blocks of the plurality of blocks, wherein the image illustrates a degree of uniformity of the motion amount and motion direction of the biological cells in the image.

2. The data processing apparatus according to claim 1, wherein determining the average motion amount of at least one biological cell in the first block is based on analyzing motion of the at least one biological cell in the first block for two or more images.

3. The data processing apparatus according to claim 1, wherein the average motion direction is an average value of motion directions per unit time within a predetermined time.

4. The data processing apparatus according to claim 1, wherein the average motion amount of the at least one biological cell in the first block is an average value of motion amounts per unit time within a predetermined time.

5. The data processing apparatus according to claim 1, wherein the processor is further configured to determine an average amplitude of the at least one biological cell in the first block, wherein the average amplitude is an average value of amplitudes with a predetermined motion amount or higher motion amount obtained within a predetermined time.

6. The data processing apparatus according to claim 1, wherein the processor is further configured to determine an average acceleration of the at least one biological cell in the first block, wherein the average acceleration is an average value of accelerations of motions per unit time within a predetermined time.

7. The data processing apparatus according to claim 1, wherein the processor is further configured to determine an average motion interval of the at least one biological cell in the first block, wherein the average motion interval is an average value of time intervals at which an amplitude with a predetermined motion amount or higher motion amount is obtained within a predetermined time.

8. The data processing apparatus according to claim 1, wherein the processor is further configured to determine a motion starting time of the at least one biological cell in the first block, wherein the motion starting time is a time from a predetermined timing to a timing at which an amplitude with a predetermined motion amount or higher motion amount is obtained.

9. The data processing apparatus according to claim 1, wherein the average motion amount of at least one biological cell in the first block is calculated based on a motion vector for the first block.

10. The data processing apparatus according to claim 1, wherein the image is a frame image obtained from a moving image.

11. The data processing apparatus according to claim 1, wherein the at least one biological cell comprises a cell that moves spontaneously.

12. The data processing apparatus according to claim 11, wherein the at least one biological cell comprises a cultured cell generated by culturing the cell collected from a living body.

13. The data processing apparatus according to claim 12, wherein the at least one biological cell comprises at least one cardiomyocyte.

14. The data processing apparatus according to claim 1, wherein controlling display of the image includes displaying classification data for the first block.

15. A data processing method comprising:
receiving an image of biological cells having a plurality of blocks, wherein a block of the plurality of blocks includes a group of pixels in the image;
determining an average motion amount of at least one biological cell in a first block of the plurality of blocks;
determining an average motion direction of at least one biological cell in the first block;
assigning a category to the first block based on the determined average motion amount and the determined average motion direction, wherein the category is one of a plurality of categories individually associated with different combinations of numerical ranges for average motion amounts and average motion directions;
determining a distribution of the plurality of blocks among the plurality of categories, wherein the distribution provides an indication of a quality level of the biological cells and the quality level is based on a number of blocks of the plurality of blocks assigned to individual categories of the plurality of categories; and
controlling display of an image representing which category of the plurality of categories is assigned to individual blocks of the plurality of blocks, wherein the image illustrates a degree of uniformity of the motion amount and motion direction of the biological cells in the image.

16. A data processing system comprising:
an imager that images an image of biological cells;
a processor configured to:
receive the image of biological cells having a plurality of blocks, wherein a block of the plurality of blocks includes a group of pixels in the image;
determine an average motion amount of at least one biological cell in a first block of the plurality of blocks;
determine an average motion direction of at least one biological cell in the first block;
assign a category to the first block based on the determined average motion amount and the determined average motion direction, wherein the category is one of a plurality of categories individually associated with different combinations of numerical ranges for average motion amounts and average motion direction;
determine a distribution of the plurality of blocks among the plurality of categories, wherein the distribution provides an indication of a quality level of the biological cells and the quality level is based on a number of blocks of the plurality of blocks assigned to individual categories of the plurality of categories; and
control display of an image representing which category of the plurality of categories is assigned to individual blocks of the plurality of blocks, wherein the image illustrates a degree of uniformity of the motion amount and motion direction of the biological cells in the image.

* * * * *